(12) United States Patent
Brinkmann et al.

(10) Patent No.: US 11,936,273 B2
(45) Date of Patent: Mar. 19, 2024

(54) STATOR AND CONDUCTOR CONNECTIONS FOR A PLANAR MOTOR

(71) Applicant: Beckhoff Automation GmbH, Verl (DE)

(72) Inventors: Rolf Brinkmann, Bad Salzuflen (DE); Uwe Prüssmeier, Lemgo (DE); Lukas Bentfeld, Delbrück (DE)

(73) Assignee: Beckhoff Automation GmbH, Verl (DE)

( * ) Notice: Subject to any disclaimer, the term of this patent is extended or adjusted under 35 U.S.C. 154(b) by 763 days.

(21) Appl. No.: 17/121,219

(22) Filed: Dec. 14, 2020

(65) Prior Publication Data

US 2021/0099068 A1 Apr. 1, 2021

Related U.S. Application Data

(63) Continuation of application No. PCT/EP2019/068144, filed on Jul. 5, 2019.

(30) Foreign Application Priority Data

Jul. 25, 2018 (DE) ...................... 10 2018 118 004.7

(51) Int. Cl.
*H02K 3/28* (2006.01)
*H01F 27/28* (2006.01)
(Continued)

(52) U.S. Cl.
CPC ........... *H02K 41/031* (2013.01); *H01F 27/28* (2013.01); *H02K 3/28* (2013.01); *H02K 3/47* (2013.01);
(Continued)

(58) Field of Classification Search
CPC .......... H02K 41/031; H02K 3/28; H02K 3/47; H02K 2201/18; H02P 25/06
See application file for complete search history.

(56) References Cited

U.S. PATENT DOCUMENTS 7,898,120 B2 * 3/2011 Sheahan, Jr. ........ H02K 41/031
310/112
9,793,775 B2 * 10/2017 Sullivan ................... H02K 3/28
(Continued)

FOREIGN PATENT DOCUMENTS

CN 101107571 A 1/2008
CN 103891114 A 6/2014
(Continued)

OTHER PUBLICATIONS

Office Action dated Sep. 1, 2021 in connection with Chinese patent application No. 201980049616.9, 113 pages including English translation.
(Continued)

*Primary Examiner* — Muhammad S Islam
(74) *Attorney, Agent, or Firm* — Dorsey & Whitney LLP

(57) ABSTRACT

A stator assembly for a planar electrical motor includes coil conductors arranged in a stator layer, elongated in a first direction and arranged side by side in a second direction perpendicular to the first direction. The coil conductors are connected to form a three-phase system, with a first forward conductor and first return conductor of the first phase connected in series to the first forward conductor, a second forward conductor and second return conductor of the second phase connected in series with the second forward conductor, and a third forward conductor and third return conductor of the third phase connected in series with the third forward conductor. The three-phase system has first and second opposite sides. The first forward conductor and the first return conductor are electroconductively connected in series by first and second horizontal connecting conductors arranged in the stator layer on the second and first side, respectively.

20 Claims, 23 Drawing Sheets

(51) Int. Cl.
  *H02K 3/47* (2006.01)
  *H02K 41/03* (2006.01)
  *H02P 25/06* (2016.01)

(52) U.S. Cl.
  CPC .......... *H02P 25/06* (2013.01); *H02K 2201/18* (2013.01)

(56) References Cited

U.S. PATENT DOCUMENTS

| | | | |
|---|---|---|---|
| 2014/0183979 | A1 | 7/2014 | Pelrine et al. |
| 2020/0389080 | A1* | 12/2020 | Haase ................ H02K 3/26 |

FOREIGN PATENT DOCUMENTS

| | | |
|---|---|---|
| CN | 107949809 A | 4/2018 |
| DE | 102015221710 A1 | 5/2017 |
| DE | 102017131304 A1 | 6/2019 |
| DE | 102017131314 A1 | 6/2019 |
| DE | 102017131320 A1 | 6/2019 |
| DE | 102017131324 A1 | 6/2019 |
| DE | 102017131326 A1 | 6/2019 |
| DE | 102018117953.7 B3 | 11/2019 |
| DE | 102018117981 A1 | 1/2020 |
| DE | 102017131321.4 B4 | 3/2020 |
| WO | 2013059934 A1 | 5/2013 |
| WO | 2015017933 A1 | 2/2015 |
| WO | 2015179962 A1 | 12/2015 |
| WO | 2015184553 A1 | 12/2015 |
| WO | 2015188281 A1 | 12/2015 |
| WO | 2017004716 A1 | 1/2017 |
| WO | 2017025137 A1 | 2/2017 |

OTHER PUBLICATIONS

International Search Report and Written Opinion dated Oct. 7, 2019 for PCT/EP2019/068144, 39 pages including English translation.
International Preliminary Report on Patentability dated Nov. 23, 2020 for PCT/EP2019/068144, 29 pages including English translation.
Examination Report dated May 10, 2019 for German patent application DE102018118004.7, 14 pages including English translation.

* cited by examiner

STATOR AND CONDUCTOR CONNECTIONS FOR A PLANAR MOTOR

CROSS-REFERENCE TO RELATED APPLICATION

The present patent application is a continuation of International Patent Application PCT/EP2019/068144, filed Jul. 5, 2019, entitled CONNECTIONS OF STATOR CONDUCTORS FOR A PLANAR MOTOR, and claims the priority of German patent application DE 10 2018 118 004.7, filed Jul. 25, 2018, entitled STATOREINHEIT, each of which is incorporated by reference herein, in the entirety and for all purposes.

FIELD

The present invention relates to a stator assembly for driving a rotor of an electrical planar motor.

BACKGROUND

Planar-drive systems with electrical planar motors may be used in automation technology, particularly in manufacturing technology, handling technology and process engineering. By means of planar-drive systems, a moving element of a plant or machine may be moved or positioned in at least two linearly independent directions. Planar-drive systems may comprise a permanently energized electromagnetic planar motor having a planar stator and a rotor moving on the stator in at least two directions.

In a permanently energized electromagnetic planar motor, a driving force is exerted on the rotor by the of current-carrying coil conductors magnetically interacting with driving magnets of a magnet arrangement. The invention relates in particular to embodiments of planar-drive systems in which the drive magnets of an electrical planar motor are arranged on the rotor and the current-carrying coil conductors of the planar motor are arranged in a stationary planar stator.

In such a drive system, the rotor comprises at least a first magnetic unit and a second magnetic unit and the stator comprises at least a group of energizable first coil conductors and a group of energizable second coil conductors. In order to drive the rotor, the first coil conductors interact with the first drive magnets and the second coil conductors interact with the second drive magnets. In this context, the first coil conductors may extend in an elongated manner in a first direction and be embodied to drive the rotor in a direction perpendicular to the first direction in interaction with the first drive magnets. The second coil conductors may extend in an elongated manner in a second direction differing from the first direction and be embodied to drive the rotor in a direction perpendicular to the second direction in interaction with the second drive magnets.

In such planar-drive systems, the coil conductors which may be energized with the drive current may be arranged in a stator assembly of the stator. The coil conductors may be arranged in a plurality of stator layers, wherein the stator layers are arranged on top of one another in a third direction perpendicular to the first and second direction.

In a stator assembly with a plurality of stator layers, both coil conductors of one stator layer and coil conductors of different stator layers may be electroconductively connected to each other. The connecting structures that connect the coil conductors to one another require space that is no longer available for an arrangement of the coil conductors. In addition, the drive currents on the connecting structures do not usually contribute to driving the rotor.

The published documents WO 2013/059934 A1, WO 2015/017933 A1, WO 2015/179962 A1, WO 2015/184553 A1, WO 2015/188281 A1 and WO 2017/004716 A1 describe planar-drive systems (displacement devices), which comprise an electromagnetic planar motor with a permanently energized rotor and a stator comprising a plurality of energizable conductors.

SUMMARY

The object of the present invention is to provide an improved stator assembly.

According to a first aspect, a stator assembly for driving a rotor of an electrical planar motor comprises coil conductors arranged in a stator layer of the stator assembly, wherein the coil conductors extend in an elongated manner a first direction and are arranged side by side in a second direction oriented perpendicularly with regard to the first direction, wherein the coil conductors are connected on the stator assembly to form a three-phase system having a first phase U, a second phase V and a third phase W, wherein the coil conductors are embodied as a first forward conductor and as a first return conductor of the first phase U connected in series with the first forward conductor, as a second forward conductor and as a second return conductor of the second phase V connected in series with the second forward conductor and as a third forward conductor and as a third return conductor of the third phase W connected in series with the third forward conductor, wherein the three-phase system has a first side and a second side opposite to the first side, wherein the first forward conductor and the first return conductor are electroconductively connected in series by a first horizontal connecting conductor arranged in the stator layer and at the second side of the three-phase system, and wherein the second forward conductor and the second return conductor are electroconductively connected in series by a second horizontal connecting conductor arranged in the stator layer and at the first side of the three-phase system.

According to a second aspect, a stator assembly for driving a rotor of an electrical planar motor comprises coil conductors arranged in a stator layer of the stator assembly, wherein the coil conductors extend in an elongated manner a first direction and are arranged side by side in a second direction oriented perpendicularly with regard to the first direction, wherein the coil conductors are connected on the stator assembly to form a three-phase system having a first phase U, a second phase V and a third phase W, wherein the coil conductors are embodied as a first forward conductor and as a first return conductor of the first phase U connected in series with the first forward conductor, as a second forward conductor and as a second return conductor of the second phase V connected in series with the second forward conductor and as a third forward conductor and as a third return conductor of the third phase W connected in series with the third forward conductor, wherein the first forward conductor and the first return conductor are electroconductively connected in series by a first horizontal connecting conductor arranged in the stator layer, wherein the second forward conductor and the second return conductor are electroconductively connected in series by a second horizontal connecting conductor arranged in the stator layer, wherein the three-phase system comprises a first side and a second side opposite to the first side which extend along the second direction, wherein the first horizontal connecting conductor connects the ends located at the second side of the three-phase system of the first forward conductor and of the first return conductor and the second horizontal connecting conductor connects the ends located at the first side of the three-phase system of the second forward conductor and of the second return conductor, and wherein the first horizontal connecting conductor and the second horizontal connecting conductor are in the stator layer each embodied as transverse connector in the form of conductor paths.

According to a third aspect, a stator assembly for driving a rotor of an electrical planar motor comprises a two-layer carrier plate, wherein a stator layer is arranged on a first side of the carrier plate and a neighboring stator layer is arranged on a second side of the carrier plate, wherein the stator layer and the neighboring stator layer comprise coil conductors, the coil conductors extending in an elongated manner a first direction and being arranged side by side in a second direction oriented perpendicularly with regard to the first direction, and wherein a first connecting conductor and a second vertical connecting conductor each extends from the first side of the carrier plate to the second side of the carrier plate to connect coil conductors of the stator layer and of the neighboring stator layer.

EXAMPLES

A stator assembly for driving a rotor of an electrical planar motor comprises coil conductors arranged in a stator layer of the stator assembly, the coil conductors extending in an elongated manner in a first direction and being arranged side by side in a second direction perpendicular to the first direction. On the stator assembly, the coil conductors are connected to form a three-phase system with a first phase, a second phase and a third phase. The coil conductors are embodied as a first forward conductor and a first return conductor of the first phase connected in series with the first forward conductor, a second forward conductor and a second return conductor of the second phase connected in series with the second forward conductor, and a third forward conductor and a third return conductor of the third phase connected in series with the third forward conductor. The three-phase system has a first side and a second side opposite to the first side. The first forward conductor and the first return conductor are electroconductively connected in series by a first horizontal connecting conductor arranged in the stator layer and on the second side of the three-phase system and the second forward conductor and the second return conductor are electroconductively connected in series by a second horizontal connecting conductor arranged in the stator layer and on the first side of the three-phase system.

Thus, the first forward and return conductor and the second forward and return conductor are connected in series in the stator layer on opposite sides of the three-phase system. This allows for the horizontal connecting conductors to be arranged in a particularly space-saving manner. By connecting the first and second phase forward and return conductors in series in the stator layer, no vertical interconnecting structure through the stator assembly is required for series connection of the first and second phase forward and return conductors. This means that a particularly large area is available in the stator layer for the arrangement of the coil conductors.

In a further embodiment of the stator assembly, the third forward conductor and the third return conductor are electroconductively connected to each other by a third horizontal connecting conductor arranged on the second side of the three-phase system, the third horizontal connecting conductor being arranged in a neighboring stator layer adjacent to the stator layer. The third forward conductor is electroconductively connected to the third horizontal connecting conductor via a first vertical connecting conductor and the third return conductor is electroconductively connected to the third horizontal connecting conductor via a second vertical connecting conductor.

An arrangement of the third horizontal interconnecting conductor in a neighboring stator layer of the stator assembly allows the first and second vertical interconnection conductor to be made particularly short, so that space is available in the remaining stator layers of the stator assembly for the arrangement of further vertical interconnecting conductors.

In a further embodiment of the stator assembly, the stator assembly comprises a two-layer carrier plate, with the stator layer being arranged on a first side of the carrier plate and the neighboring stator layer being arranged on a second side of the carrier plate. Thus, the stator layer and the neighboring stator layer may easily be arranged next to each other and electroconductively connected to each other via through-contacts in the carrier plate.

In a further embodiment of the stator assembly, the first vertical connecting conductor and the second vertical connecting conductor each extend from the first side of the carrier plate to the second side of the carrier plate. In particular, the first and second vertical connecting conductor end on the first and second side of the carrier plate respectively. Thus, further vertical connecting conductors may be arranged below or above the first or second vertical connecting conductor, so that a lot of space is available for the arrangement of the coil conductors. In particular, the vertical connecting conductors may be embodied as buried vias or blind vias of a circuit board of the stator assembly.

In a further embodiment of the stator assembly, the stator assembly comprises a first connection structure for feeding in the first phase and a second connection structure for feeding in the second phase. In the stator layer, the first forward conductor is electroconductively connected to a third vertical connecting conductor arranged on the first side, wherein the first forward conductor is electroconductively connected to the first connection structure via the third vertical connecting conductor. The first return conductor is in the stator layer electroconductively connected to a fourth vertical connecting conductor arranged on the first side, the first return conductor being electroconductively connected to a neutral point of the three-phase system via the fourth vertical connecting conductor. The second forward conductor is in the stator layer electroconductively connected to a fifth vertical connecting conductor arranged on the second side, the second forward conductor being electroconductively connected to the neutral point via the fifth vertical connecting conductor. The second return conductor is in the stator layer electroconductively connected to a sixth vertical connecting conductor arranged on the second side, the second return conductor being electroconductively connected to the second connection structure via the sixth vertical connecting conductor.

The third and sixth vertical connecting structure allows the first forward conductor and the second return conductor to be connected to the connection structure in a space-saving manner. In particular, the first forward conductor and the first return conductor do not contact the connection structure in the stator layer, so that a lot of space is available for the arrangement of the coil conductors in the stator layer. By connecting the second return conductor and not the second forward conductor to the sixth vertical connecting structure for connecting to the second connection structure, the second return conductor and the second forward conductor may be connected to each other particularly easily on the first side opposite to the second side in the stator layer.

In a further embodiment of the stator assembly, the first connection structure and the second connection structure are arranged on the first side of the three-phase system. This allows the stator assembly to be contacted in a particularly space-saving manner and a lot of space is available on the remaining sides of the three-phase system for arranging of the coil conductors.

In a further embodiment of the stator assembly, the stator assembly comprises a connecting stator layer, wherein the connecting stator layer comprises a further first forward conductor of the first phase, a further first return conductor of the first phase and a further second forward conductor of the second phase. The first connection structure is electroconductively connected to the further first forward conductor in the connecting stator layer and the second connecting structure is electroconductively connected to the further second forward conductor in the connecting stator layer. The further first forward conductor is electroconductively connected to the further first return conductor by a further first horizontal connecting conductor arranged in the connecting stator layer and on the second side of the three-phase system and the further second forward conductor is electroconductively connected to the sixth vertical connecting conductor on the second side of the three-phase system.

By electrically connecting the further forward conductor in the connecting stator layer to the vertical connecting structure on the second side of the three-phase system opposite to the second connection structure, the second forward and return conductors in the remaining stator layers of the stator assembly may be connected to each other in an electrically conductive manner on the first side of the three-phase system particularly easily.

In a further embodiment of the stator assembly, the stator assembly comprises a further second return conductor of the second phase, wherein the further second return conductor is electroconductively connected to the fifth vertical connecting conductor on the second side of the three-phase system. The further second return conductor is electroconductively connected to the neutral point of the three-phase system on the first side of the three-phase system via a seventh vertical connecting conductor.

Via the further second return conductor, the second phase of the drive current may be very easily conducted from a second end of a forward conductor arranged on the second side of the three-phase system to the neutral point arranged on the first side of the three-phase system.

In a further embodiment of the stator assembly, the further second return conductor is arranged in the connecting stator layer and is electroconductively connected to the seventh vertical connecting conductor in the connecting stator layer. Except in the connecting stator layer, all second forward and return conductors may then be electroconductively connected to one another in their respective stator layer, thus providing a particularly large amount of space in the remaining stator layers for arranging the coil conductors. In the case of the stator assembly, the connecting stator layer may, in particular, form a topmost stator layer in a third direction oriented perpendicularly with regard to the first and second direction, and the stator layer may form a lowermost stator layer of the stator assembly in the third direction.

In a further embodiment of the stator assembly, the neutral point of the three-phase system is located in the neighboring stator layer. This allows for the first and third return conductors of the stator layer to be connected to the neutral point in the neighboring stator layer via particularly short conductor structures.

As far as two conductor structures are electroconductively connected within one stator layer of the stator assembly, this means that all conductors by which the two conductor structures are electroconductively connected to one another are arranged in the respective stator layer. If two conductor structures are electroconductively connected on one side of the three-phase system, this means that all the conductors via which the two conductor structures are electroconductively connected to each other are arranged on the relevant side of the three-phase system.

The stator assembly may comprise a first stator layer, a second stator layer, a third stator layer and a fourth stator layer, which are arranged on top of one another in a third direction perpendicular to the first and second direction. The connecting stator layer of the stator assembly may be formed by the first stator layer of the stator assembly, the neighboring stator layer may be formed by the third stator layer of the stator assembly, and the stator layer may be formed by the fourth stator layer of the stator assembly. The coil conductors may be formed by first coil conductors of the stator assembly and the stator assembly may include second coil conductors in addition to the first coil conductors. The three-phase system may be formed by a first three-phase system of the stator assembly. The carrier plate may be formed by a second carrier plate and the stator assembly may comprise at least one first carrier plate in addition to the second carrier plate.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

The present invention relates to further developments of the planar-drive systems disclosed in publications WO 2013/059934 A1, WO 2015/017933 A1, WO 2015/179962 A1, WO 2015/184553 A1, WO 2015/188281 A1 and WO 2017/004716 A1. The entire disclosure and content of the six above-mentioned publications is made subject matter of the present description, and each is incorporated by reference herein, in the entirety and for all purposes.

Furthermore, the present invention also relates to further developments of the planar-drive systems disclosed in German patent applications DE 10 2017 131 304.4, DE 10 2017 131 314.1, DE 10 2017 131 320.6, DE 10 2017 131 321.4, DE 10 2017 131 324.9, DE 10 2017 131 326.5, filed on Dec. 27, 2017, and DE 10 2018 117 953.7 and DE 10 2018 117 981.2, filed on Jul. 25, 2018. The entire disclosure and content of all eight aforementioned German patent applications is made subject matter of the present description, and each is incorporated by reference herein, in the entirety and for all purposes.

Figure 1:
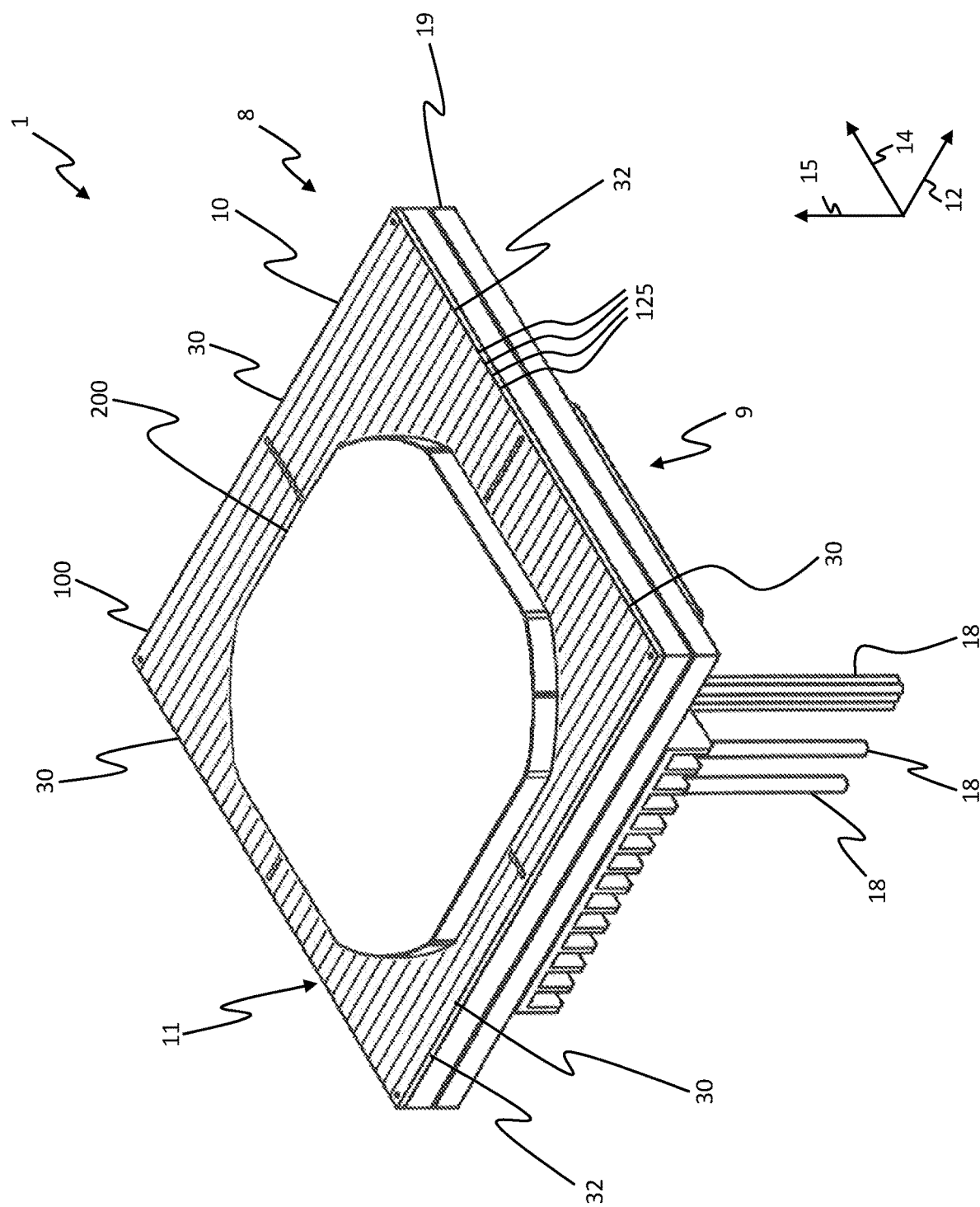
FIG. 1 show a perspective top view of a planar-drive system having a stator module and a rotor.

FIG. 1 shows a top perspective top view of a planar-drive system 1 having a stator module 10 and a rotor 200. The stator module 10 comprises a module housing 19 and a stator assembly 100. The stator module 10 has a top side 8 and a bottom side 9 opposite to the top side 8. The stator assembly 100 is arranged above the module housing 19 and on the top side 8 of the stator module 10 in a third or vertical direction 15 oriented from the bottom side 9 to the top side 8. The stator assembly 100 is embodied as a planar stator and has a flat, i.e. planar, stator surface 11 on the top side 8 of the stator module 10. The stator surface 11 also forms a surface of the stator module 10.

The stator surface 11 is oriented perpendicular with regard to the third direction 15 and extends over the entire top side 8 of the stator assembly 100 and the stator module 10. On the stator surface 11, the stator assembly 100 comprises at least one first coil conductor 125 that may be supplied with a drive current. As shown, the stator assembly 100 may comprise a majority of the first coil conductors 125 on the stator surface 11. The first coil conductors 125 may each be supplied with a drive current. With the drive currents in the first coil conductors 125, a magnetic field may be generated which drives the rotor 200 in interaction with drive magnets of the rotor 200. The rotor 200 and the stator assembly 100 with the current-carrying first coil conductors 125 form an electromagnetic planar motor.

The rotor 200 is movably arranged above the stator surface 11 of the stator module 10 during operation and may be driven in a first direction 12 as well as in a second direction 14 during operation. The first direction 12 and the second direction 14 are different from each other and linearly independent. In particular, the first direction 12 and the second direction 14 may be aligned perpendicularly with regard to each other, as shown in FIG. 1. The first direction 12 and the second direction 14 are each oriented in parallel to the stator surface 11 and perpendicular to the third direction 15. By simultaneously driving the rotor 200 in the first direction 12 and in the second direction 14, the rotor 200 may be driven above the stator surface 11 in any direction. The rotor 200 may be kept floating above the stator surface 11 during operation in the third direction 15, for example by a magnetic interaction between the drive magnets and suitable drive currents in the first coil conductors 125. In addition to driving the rotor 200 in the first and second direction 12, 14, it is also possible to drive it in the third, vertical direction 15.

The stator surface 11 is rectangular. In particular, the stator surface 11 may be square, as shown. The stator surface 11 is limited by four straight outer edges 30. Two opposite outer edges 30 are in parallel to the first direction 12 and two opposite other outer edges 30 are in parallel to the second direction 14.

An extension of the stator assembly 100 in the third direction 15 is smaller than an extension of the stator assembly 100 in the first and second direction 12, 14. The stator assembly 100 therefore forms a flat cuboid extending in the first and second direction 12, 14 or a plate extending in the first and second direction 12, 14. Between the stator surface 11 and a bottom side of the stator assembly 100 opposite to the stator surface 11, the stator assembly 100 has four flat side surfaces 32 which are flush with the outer edges 30 of the stator surface 11. The side faces 32 of the stator assembly 100 are oriented perpendicularly with regard to the stator face 11.

In the first direction 12, the stator surface 11 may have an extension between 100 mm and 500 mm particularly between 120 mm and 350 mm, particularly 240 mm. In the second direction 14, the stator surface 11 may have an extension between 100 mm and 500 mm in particular between 120 mm and 350 mm, in particular 240 mm. In the third direction 15, the stator module 10 may have an extension between 10 mm and 100 mm, particularly between 15 mm and 60 mm, particularly 30 mm. In the third direction 15, the module housing 19 may have an extension between 8 mm and 80 mm, in particular between 13 mm and 55 mm, in particular 26.6 mm. In the first and/or second direction 12, 14, the module housing 19 may have the same extension as the stator surface 11. In the third direction 15, the stator assembly 100 may have an extension of 1 mm to 10 mm, particularly 2 mm to 5 mm, particularly 3.5 mm to 4.5 mm, in particular 3.7 mm to 4 mm.

Several examples of the stator module 10 may be arranged next to each other in such a way that the outer edges 30 of adjacent stator modules 10 adjoin one another and the stator surfaces 11 of the stator modules 10 form a continuous working surface over which the rotor 200 may be moved without interruption.

Figure 2:
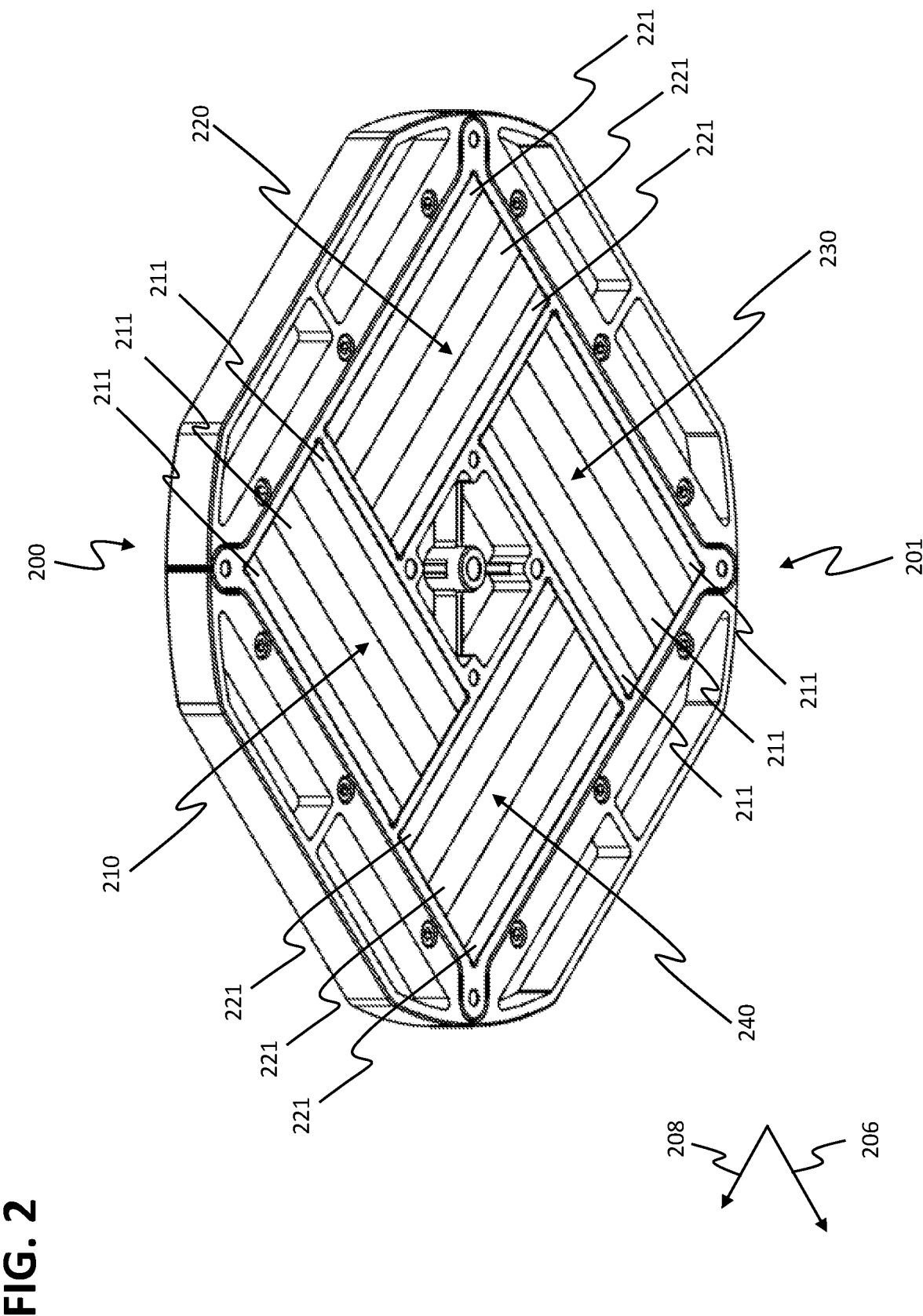
FIG. 2 show a perspective bottom view of the rotor of the planar-drive system having a magnet arrangement.

FIG. 2 shows the rotor 200 of the planar-drive system 1 in a perspective view from below on a bottom side of the rotor 200. During operation of the planar-drive system 1, the bottom side of the rotor 200 is arranged facing the stator surface 11 of the stator module 10. The rotor 200 has a magnet arrangement 201 on the bottom side. The magnet arrangement 201 is rectangular, particularly square, and comprises a plurality of magnets. The bottom side of the rotor 200 is flat or planar, particularly in the area of the magnets of magnet arrangement 201. During operation, the bottom side of the rotor 200 comprising the magnet arrangement 201 is oriented essentially in parallel to the stator surface 11 and is arranged facing the stator surface 11.

The magnet arrangement 201 comprises a first magnet unit 210, a second magnet unit 220, a third magnet unit 230, and a fourth magnet unit 240. The first magnet unit 210 and the third magnet unit 230 each have first drive magnets 211 extending in an elongated manner in a first rotor direction and arranged next to one another along a second rotor direction 208 perpendicular to the first rotor direction 206. In particular, the first and third magnet units 210, 230 may each have three first drive magnets 211. The second magnet unit 220 and the fourth magnet unit 240 each have second drive magnets 221 arranged side by side in the first rotor direction and extending in an elongated manner along the second rotor direction 208. In particular, the second and fourth magnet units 220, 240 may each have three second drive magnets 221.

During operation, the first and third magnet units 210, 230 are used to drive the rotor 200 in the second rotor direction 208 and the second and fourth magnet units 220, 240 are used to drive the rotor 200 in the first rotor direction 206. The first drive magnets 211 of the first and third magnet units 210, 230 and the second drive magnets 221 of the second and fourth magnet units 220, 240 are magnetized perpendicularly with regard to the first and second rotor direction 206, 208, respectively. In this context, neighboring drive magnets 211, 221 of the magnet units 210, 220, 230, 240 have opposite magnetizations.

Figure 3:
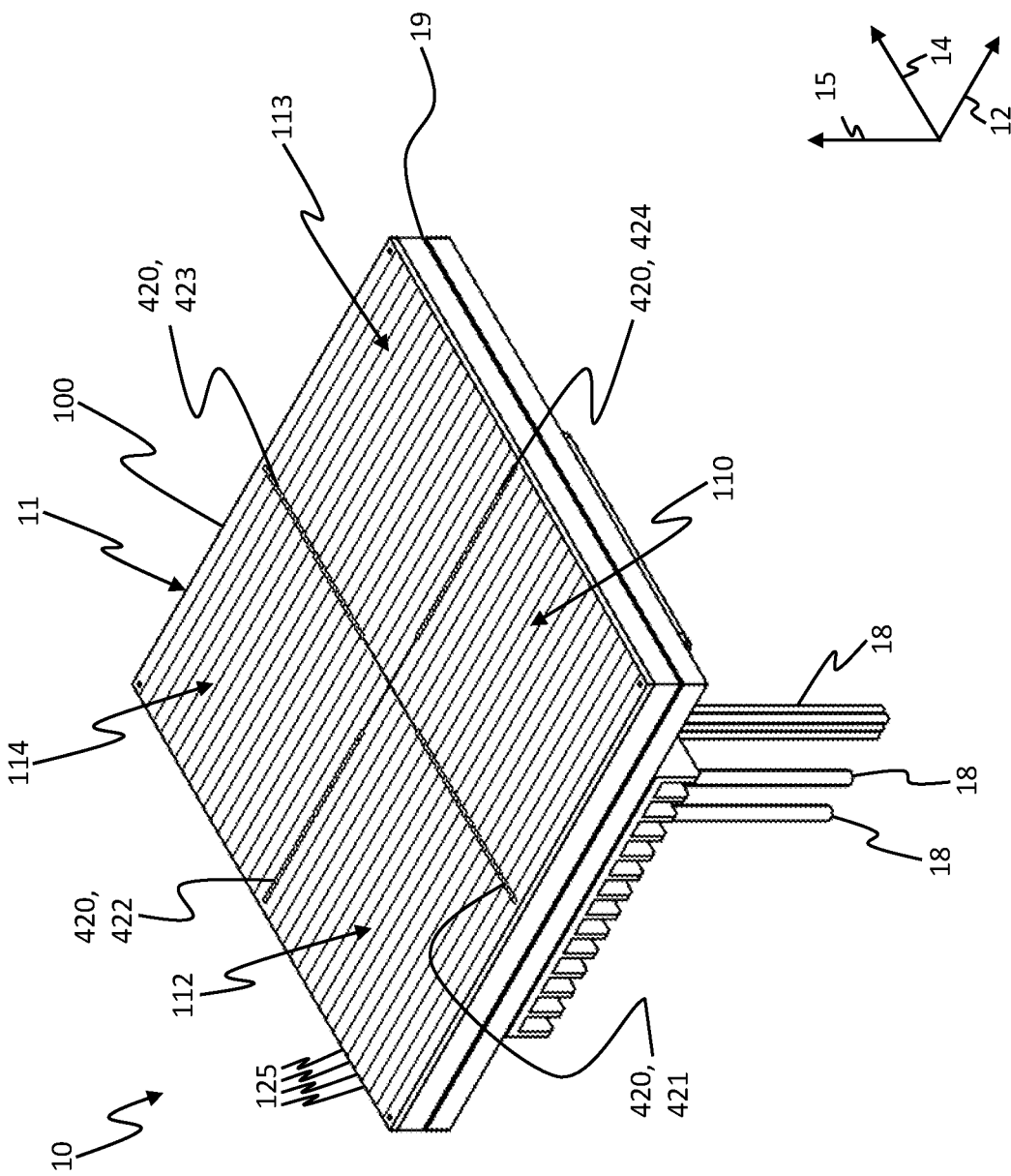
FIG. 3 show a perspective top view of the stator module of the planar-drive system.

FIG. 3 shows the stator module 10 of the planar-drive system 1 in a perspective top view without the rotor 200. The stator assembly 100 of the stator module 10 comprises a first stator sector 110, a second stator sector 112, a third stator sector 113 and a fourth stator sector 114. The stator sectors 110, 112, 113, 114 each comprise a part of the first coil conductors 125 arranged at the stator surface 11 of the stator assembly 100. Each of the first coil conductors 125 at the stator surface 11 is completely arranged in one of the stator sectors 110, 112, 113, 114. The stator sectors 110, 112, 113, 114 are rectangular. In particular, the stator sectors 110, 112, 113, 114 may be square so that an extension of the stator sectors 110, 112, 113, 114 in the first direction 12 corresponds to an extension of the stator sectors 110, 112, 113, 114 in the second direction 14.

The stator sectors 110, 112, 113, 114 are arranged in the first direction 12 in two rows arranged side by side and in the second direction 14, too, in two rows arranged side by side, the rows being adjacent to one another. The stator sectors 110, 112, 113, 114 of adjacent rows are also arranged adjacent to each other. In the first direction 12, the stator assembly 100 comprises a row with the second stator sector 112 and the first stator sector 110 and another row with the fourth stator sector 114 and the third stator sector 113. In the second direction 14, the stator assembly 100 comprises a row with the first stator sector 110 and the third stator sector 113 and another row with the second stator sector 112 and the fourth stator sector 114.

The stator sectors 110, 112, 113, 114 each have an extension in the first direction 12 and in the second direction 14 which is half the extension of the stator assembly 100 or the extension of the stator module 10 in the corresponding direction 12, 14. The boundaries of the stator sectors 110, 112, 113, 114 thus run in the first and in the second direction 12, 14 in each case in the center of the stator assembly 100 and intersect in the center of the stator assembly 100. The stator sectors 110, 112, 113, 114 each cover a quarter of the area, i.e. one quadrant, of the stator assembly 100.

In the stator assembly 100 of the stator module 10 shown in FIG. 3, the stator layer at the stator surface 11 only comprises first coil conductors 125, which extend in an elongated manner along the first direction 12 and are arranged next to and adjacent to each other along a direction perpendicular to the first direction 12. If the first direction 12 and the second direction 14 are oriented perpendicularly with regard to each other as shown in FIG. 3, the first coil conductors 125 are arranged side by side and adjacent to each other along the second direction 14.

In addition to the first coil conductors 125 shown in FIG. 3, the stator assembly 100 includes second coil conductors. The second coil conductors extend in an elongated manner along the second direction 14 and are arranged side by side and adjoining one another in a direction perpendicular to the second direction 14. If the second direction 14 and the first direction 12 are oriented perpendicularly with regard to each other, the second coil conductors are arranged along the first direction 12 next to each other and adjacent to each other.

Within the stator sectors 110, 112, 113, 114, the first coil conductors 125 and the second coil conductors are arranged in a plurality of stator layers or stator planes arranged on top of one another, each of the stator layers comprising either first coil conductors 125 or second coil conductors, but not both first coil conductors 125 and second coil conductors 126. Apart from the extension of the first coil conductors 125 and the second coil conductors and unless differences are described in the following, the stator sectors 110, 112, 113, 114 are identically embodied on the different stator layers.

The stator layer visible in FIG. 3 on the stator surface 11 forms a first stator layer of the stator assembly 100. In the third direction 15 below the first stator layer, the stator assembly 100 comprises at least a second stator layer, a third stator layer and a fourth stator layer.

Figure 4:
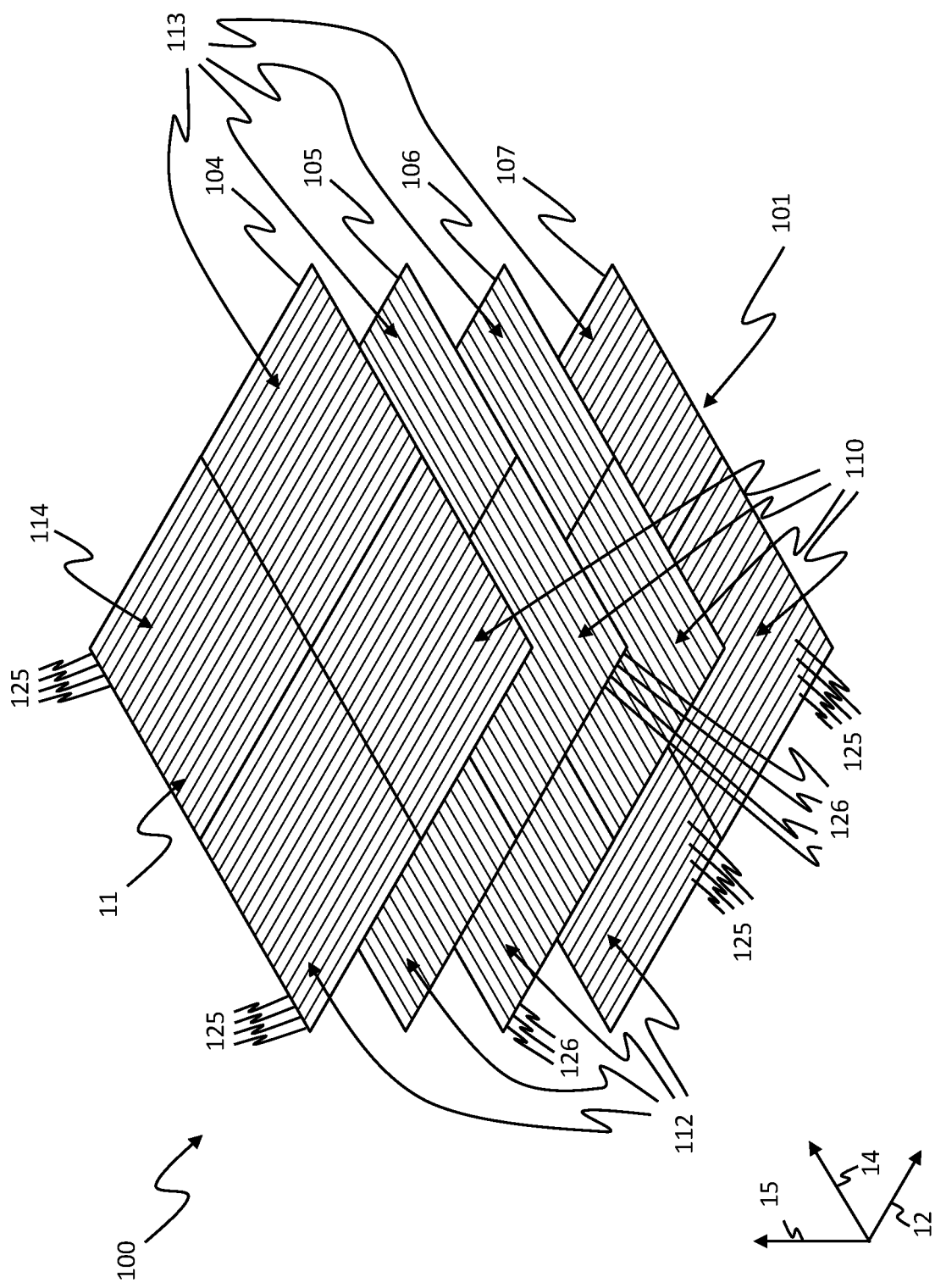
FIG. 4 show an exploded view of a stator assembly of the stator module having a first, second, third and fourth stator layer.

FIG. 4 shows a schematic perspective depiction of an exploded view of the stator assembly 100 with the individual stator layers.

In the third direction 15, the stator assembly 100 comprises a second stator layer 105 under the first stator layer 104 arranged at the stator surface 11, a third stator layer 106 under the second stator layer 105, and a fourth stator layer 107 under the third stator layer 106. Unless differences are described in the following, the second, third, and fourth stator layers 105, 106, 107 are embodied as described for the first stator layer 104 at the stator surface 11 of the stator assembly 100 shown in FIG. 3.

In the fourth stator layer 107 as in the first stator layer 104, the stator sectors 110, 112, 113, 114 comprise first coil conductors 125 extending in an elongated manner along the first direction 12, and are arranged side by side and adjoining one another in the direction perpendicular to the first direction 12. In the second stator layer 105 and in the third stator layer 106, the stator sectors 110, 112, 113, 114 comprise second coil conductors 126. Unless differences are described in the following, the second coil conductors 126 are formed as described for the first coil conductors 125 in the first stator layer 104 and in the fourth stator layer 107. In contrast to the first coil conductors 125 of the first and fourth stator layers 104, 107, the second coil conductors 126 of the second and third stator layers 105, 106 extend in an elongated manner along the second direction 14 and are arranged next to and adjoining one another in the direction perpendicular to the second direction 14.

In the first and fourth stator layers 104, 107, the stator sectors 110, 112, 113, 114 only comprise the first coil conductors 125 extending in the first direction 12 and not additionally the second coil conductors 126 extending in an elongated manner in the second direction 14, and in the second and third stator layers 105, 106 the stator sectors 110, 112, 113, 114 only comprise the second coil conductors 126 extending in the second direction 14 and not additionally the first coil conductors 125 extending in an elongated manner in the first direction 12.

The stator sectors 110, 112, 113, 114 have the same dimensions in all stator layers 104, 105, 106, 107. In particular, the stator sectors 110, 112, 113, 114 have the same dimensions in all stator layers 104, 105, 106, 107 in the first direction 12 and in the second direction 14.

The number and arrangement of the first coil conductors 125 is identical in the individual stacked stator layers 104, 107 comprising first coil conductors 125, particularly in the first and fourth stator layers 104, 107. In particular, the first coil conductors 125 are arranged on top of one another in the third direction 15. Furthermore, the number and arrangement of the second coil conductors 126 is identical in the individual stacked stator layers 105, 106 to second coil conductors 126, particularly in the second and third stator layers 105, 106. In particular, the second coil conductors 126 are arranged on top of one another in the third direction 15.

The stator sectors 110, 112, 113, 114 are embodied to be independently energized. In particular, the first coil conductors 125 and the second coil conductors 126 of the individual stator sectors 110, 112, 113, 114 on the stator assembly 100 are electrically insulated from each other. This means in particular that the coil conductors 125, 126 of the first stator sector 110 are electrically insulated from the coil conductors 125, 126 of the second stator sector 112, from the coil conductors 125, 126 of the third stator sector 113 and from the coil conductors 125, 126 of the fourth stator sector 114. Furthermore, the coil conductors 125, 126 of the second stator sector 112 are electrically insulated from the coil conductors 125, 126 of the first stator sector 110, from the coil conductors 125, 126 of the third stator sector 113 and from the coil conductors 125, 126 of the fourth stator sector 114. Furthermore, the coil conductors 125, 126 of the third stator sector 113 are electrically insulated from the coil conductors 125, 126 of the first stator sector 110, from the coil conductors 125, 126 of the second stator sector 112 and from the coil conductors 125, 126 of the fourth stator sector 114. Finally, the coil conductors 125, 126 of the fourth stator sector 114 are electrically insulated from the coil conductors 125, 126 of the first stator sector 110, from the coil conductors 125, 126 of the second stator sector 112 and from the coil conductors 125, 126 of the third stator sector 113.

While the coil conductors 125, 126 of the individual stator sectors 110, 112, 113, 114 on the stator assembly 100 are each electrically insulated from the coil conductors 125, 126 of the remaining stator sectors 110, 112, 113, 114, the coil conductors 125, 126 within the individual stator sectors 110, 112, 113, 114 may each be electroconductively connected to each other. In particular, within the stator sectors 110, 112, 113, 114, all first coil conductors 125 arranged on top of one another in the third direction 15, in particular all first coil conductors 125 of the first stator layer 104 and of the fourth stator layer 107 arranged on top of one another in the third direction 15, may be electroconductively connected to one another. Thereby, all first coil conductors 125 disposed on top of one another in the third direction 15 may be electroconductively connected to one another in such a way that the same coil current flows in each of the first coil conductors 125 arranged one above the other. For example, all first coil conductors 125 of the stator sectors 110, 112, 113, 114 disposed on top of one another in the third direction 15 may be connected in series.

Likewise, within the stator sectors 110, 112, 113, 114, all second coil conductors 126 arranged on top of one another in the third direction 15, in particular all second coil conductors 126 of the second stator layer 105 and the third stator layer 106 arranged on top of one another in the third direction 15, may be electroconductively connected with each other. All second coil conductors 126 disposed on top of one another in the third direction 15 may in this context be electroconductively connected in such a way that the same coil current flows in each of the second coil conductors 126 arranged on top of one another. For example, within the individual stator sectors 110, 112, 113, 114 all second coil conductors 126 stacked on top of one another may be connected in series.

The coil conductors 125, 126 of the stator sectors 110, 112, 113, 114 are combined to form stator segments within the stator layers 104, 105, 106, 107.

Figure 5:
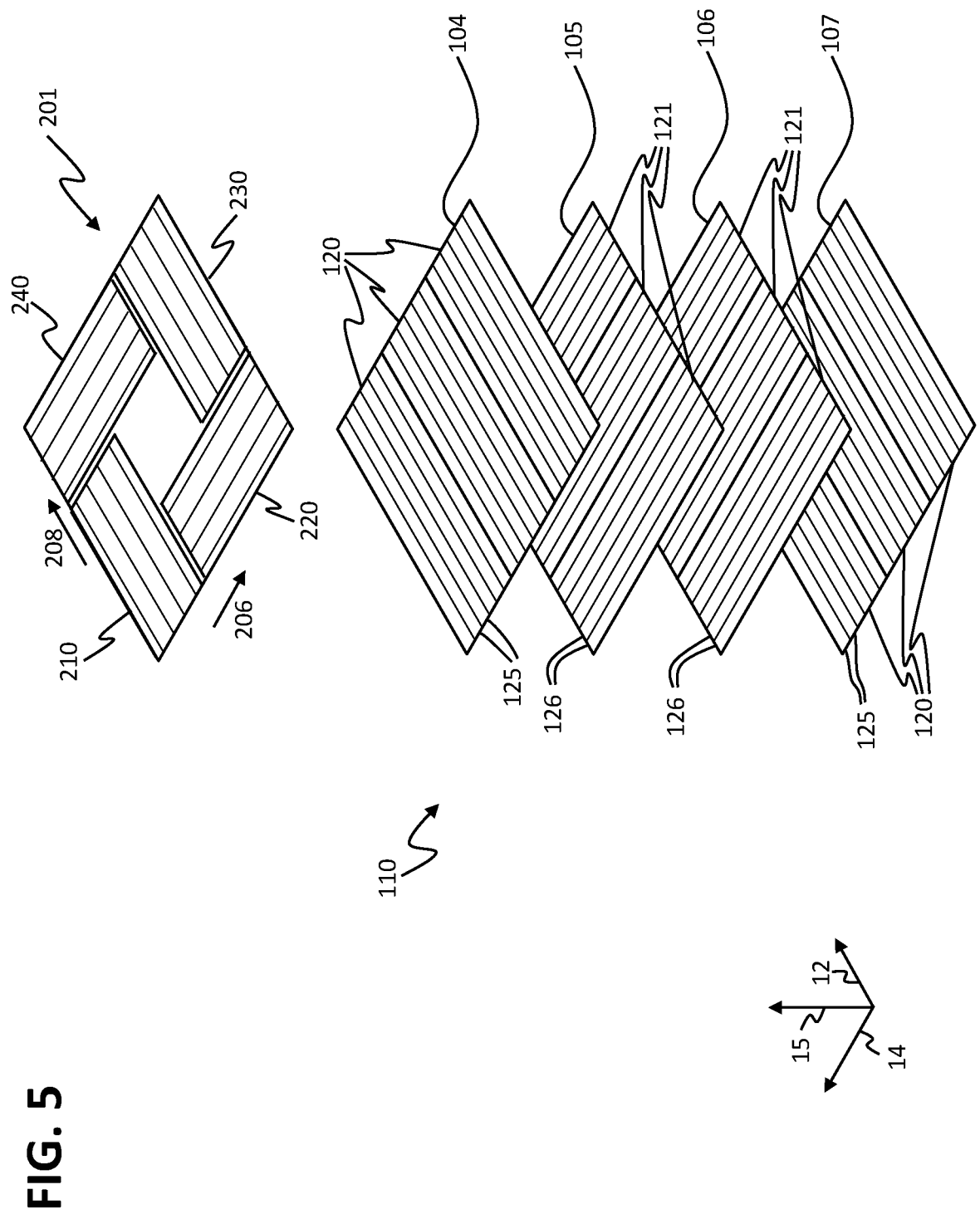
FIG. 5 show the stator layers of a first stator sector of the stator assembly with individual stator segments.

FIG. 5 shows a schematic depiction of the stator layers 104, 105, 106, 107 of the first stator sector 110 comprising the individual stator segments.

The coil conductors 125, 126 of the first stator sector 110 are combined within the stator layers 104, 105, 106, 107 to form stator segments 120, 121. In each stator layer 104, 105, 106, 107, the first stator sector 110 comprises three stator segments 120, 121 arranged side by side and adjoining one another. Each of the stator segments 120, 121 comprises six coil conductors 125, 126 arranged side by side. The first stator sector 110 comprises three first stator segments 120 in each of the first and fourth stator layers 104, 107 and three second stator segments 121 in the second and third stator layers 105, 106. The first stator segments 120 each comprise six adjacent ones of the first coil conductors 125 extending in an elongated manner in the second direction 14 and extending in an elongated manner in the first direction 12. The second stator segments 121 each comprise six adjacent ones of the second coil conductors 126 arranged side by side in the first direction 12 and extending in an elongated manner in the second direction 14.

In alternative embodiments of the stator assembly 100, the first stator segments 120 and/or the second stator segments 121 may also include a different number of coil conductors 125, 126 arranged side by side. In particular, the first stator segments 120 and/or the second stator segments 121 may comprise eight coil conductors 125, 126 arranged side by side. In alternative embodiments of the stator assembly 100, the first stator sector 110 may also comprise a different number of adjacent and adjoining stator segments 120, 121.

The first stator sector 110 of the stator assembly 100 thus exclusively comprises first coil conductors 125 in the first stator layer 104 and in the fourth stator layer 107, said first coil conductors 125 extending in an elongated manner along the first direction 12, and exclusively second coil conductors 126 in the second stator layer 105 and in the third stator layer 106, said second coil conductors 126 extending in an elongated manner along the second direction 14.

The first and second stator segments 120, 121 have identical dimensions, apart from their orientation. In particular, the dimensions of the first stator segments 120 in the first direction 12 correspond to the dimensions of the second stator segments 121 in the second direction 14 and the dimensions of the first stator segments 120 in the second direction 14 correspond to the dimensions of the second stator segments 121 in the first direction 12.

The stator segments 120, 121 are arranged on top of one another in such a way that each of the first stator segments 120 of the first and fourth stator layers 104, 107 of the first stator sector 110 in the first direction 12 extends over the three second stator segments 121 of the second and third stator layers 105, 106 of the first stator sector 110 arranged side by side in the first direction 12. In addition, the second stator segments 121 of the second and third stator layers 105, 106 of the first stator sector 110 in the second direction 14 extend over all first stator segments 120 of the first and fourth stator layers 104, 107 of the first stator sector 110 arranged side by side in the second direction 14.

The arrangement of the coil conductors 125, 126 in the stator layers 104, 105, 106, 107 of the second stator sector 112, the third stator sector 113 and the fourth stator sector 114 corresponds to the arrangement of the coil conductors 125, 126 in the stator layers 104, 105, 106, 107 of the first stator sector 110 as shown in FIG. 5.

In operation of the planar-drive system 1, the rotor 200 may be aligned above the stator assembly 100 in such a way that the first rotor direction 206 is oriented along the first direction 12 and the second rotor direction 208 along the second direction 14. The first magnet unit 210 and the third magnet unit 230 may in operation interact with the magnetic field generated by the first coil conductors 125 of the first stator segments 120 to drive the rotor 200 along the second direction 14. The second magnet unit 220 and the fourth magnet unit 240 may in operation interact with the magnetic field generated by the second coil conductors 126 of the second stator segments 121 to drive the rotor 200 along the first direction 12.

Alternatively, other than in FIG. 5, the rotor 200 may be oriented in such a way that the first rotor direction 206 is oriented along the second direction 14 and the second rotor direction 208 along the first direction 12. In this case, the first and third magnet units 210, 230 interact with the magnetic field of the second stator segments 121 to drive the rotor 200 in the first direction 12, and the second and fourth magnet units 220, 240 interact with the magnetic field of the first stator segments 120 to drive the rotor 200 in the second direction 14.

In the stator assembly 100, the first coil conductors 125 are thus embodied to interact with the first drive magnets 211 of the rotor 200 to drive the rotor 200 in the direction perpendicular to the first direction 12. The second coil conductors 126 are embodied to interact with the second drive magnets 221 of the rotor 200 to drive the rotor 200 in the direction perpendicular to the second direction 14.

The first coil conductors 125 are spatially offset in the direction perpendicular to the first direction 12, each by one third of an effective first wavelength of the first drive magnets 211 of the first and third magnet units 210, 230 interacting with the first coil conductors 125. The second coil conductors 126 are spatially offset in the direction perpendicular to the second direction 14, each by one third of an effective second wavelength of the second driving magnets 221 of the second and fourth magnet units 220, 240 interacting with the second coil conductors 126.

The coil conductors 125, 126 of the individual stator segments 120, 121 may be supplied with the drive currents independently of the coil conductors 125, 126 of the other stator segments 120, 121. In particular, the drive currents in one of the stator segments 120, 121 do not necessarily depend on drive currents in another of the stator segments 120, 121. In addition, the coil conductors 125, 126 of one of the stator segments 120, 121 may be supplied with drive currents while the coil conductors 125, 126 of another, for example an adjacent, stator segment 120, 121 are currentless. The coil conductors 125, 126 of the individual stator segments 120, 121 are electrically insulated on the stator assembly 100 from the coil conductors 125, 126 of the other stator segments 120, 121. The coil conductors 125, 126 of different stator segments 120, 121 may e.g. be supplied with the drive currents from separate power modules or from separate power-generating units, respectively, or output stages of a power module of the stator module 10.

The coil conductors 125, 126 in the individual stator sectors 110, 112, 113, 114 may each be interconnected to form multi-phase systems with a joint neutral point. The neutral point may be formed on the stator assembly 100. In particular, the coil conductors 125, 126 may be interconnected to form three-phase systems with a joint neutral point. The three-phase systems may each comprise six adjacent first coil conductors 125 or six adjacent second coil conductors 126. The number of adjacent coil conductors 125, 126 in one of the three-phase systems may also be three, twelve or other multiples of three.

The multi-phase systems may be contacted on the stator assembly 100 in such a way that each of the multi-phase systems may be supplied with a drive current independently of the other multi-phase systems. Alternatively, two or more of the multi-phase systems may be connected to each other on the stator assembly 100 in such a way that the connected multi-phase systems are each jointly supplied with a shared drive current. For example, the connected multi-phase systems on the stator assembly 100 may be connected in series or in parallel.

If the coil conductors 125, 126 are connected to form multi-phase systems, fewer contacts are required to energize the coil conductors 125, 126 than when the individual coil conductors 125, 126 are energized separately. This reduces the hardware effort required to energize the first coil conductor 125, 126, particularly the number of power generation units required for energizing.

As shown in FIGS. 4 and 5, the stator sectors 110, 112, 113, 114 may each comprise eighteen coil conductors 125, 126 in each stator layer 104, 105, 106, 107. Six adjacent coil conductors 125, 126 may be connected to form a three-phase system and the stator sectors 110, 112, 113, 114 may each comprise 12 adjacent three-phase systems in the first direction 12 and three adjacent three-phase systems in the second direction 14. Coil conductors 125, 126, which essentially extend in the same direction 12, 14 and are stacked on top of one another in the stator layers 104, 105, 106, 107, may be connected in series to form a shared three-phase system. The coil conductors 125, 126 may be connected in such a way that in the third direction 15, coil conductors 125, 126 stacked on top of one another are each supplied with the same drive current. The three-phase systems thus have three phases, which are interconnected from coil conductors 125, 126 disposed on top of one another in stator layers 104, 105, 106, 107.

For example, in the individual stator layers 104, 105, 106, 107, all coil conductors 125, 126, which lie on top of one another and are aligned in parallel may be connected in series. In particular, the first coil conductors 125 of the stacked three-phase systems, in particular of three-phase systems stacked on top of one another in the first stator layer 104 and in the fourth stator layer 107, and the second coil conductors 126 of the stacked three-phase systems, in particular of three-phase systems stacked on top of one another in the second stator layer 105 and in the third stator layer 106, may each be connected in series to form a shared three-phase system. Thereby, all coil conductors 125, 126 arranged on top of one another in the third direction may be connected in series.

In particular, in the stator assembly 100, the first coil conductors 125 extending in an elongated manner along the first direction 12 within the individual first stator segments 120, are each connected to multi-phase systems with a common neutral point. The individual multi-phase systems of different first stator segments 120 may be energized independently of each other. Likewise, all second coil conductors 126 of the individual second stator segments 121 are each connected to form further multi-phase systems. The individual additional multi-phase systems of the second stator segments 121 may be energized independently of each other and independently of the multi-phase systems of the first stator segments 120. In particular, the first coil conductors 125 of the first stator segments 120 and the second coil conductors 126 of the second stator segments 121 are each connected to form three-phase systems. The first coil conductor 125 and the second coil conductor 126 of a stator segment 120, 121 may each be supplied with a three-phase drive current. The drive currents comprise a first phase U, a second phase V and a third phase W, which have a phase offset of 120° with regard to one another.

Figure 6:
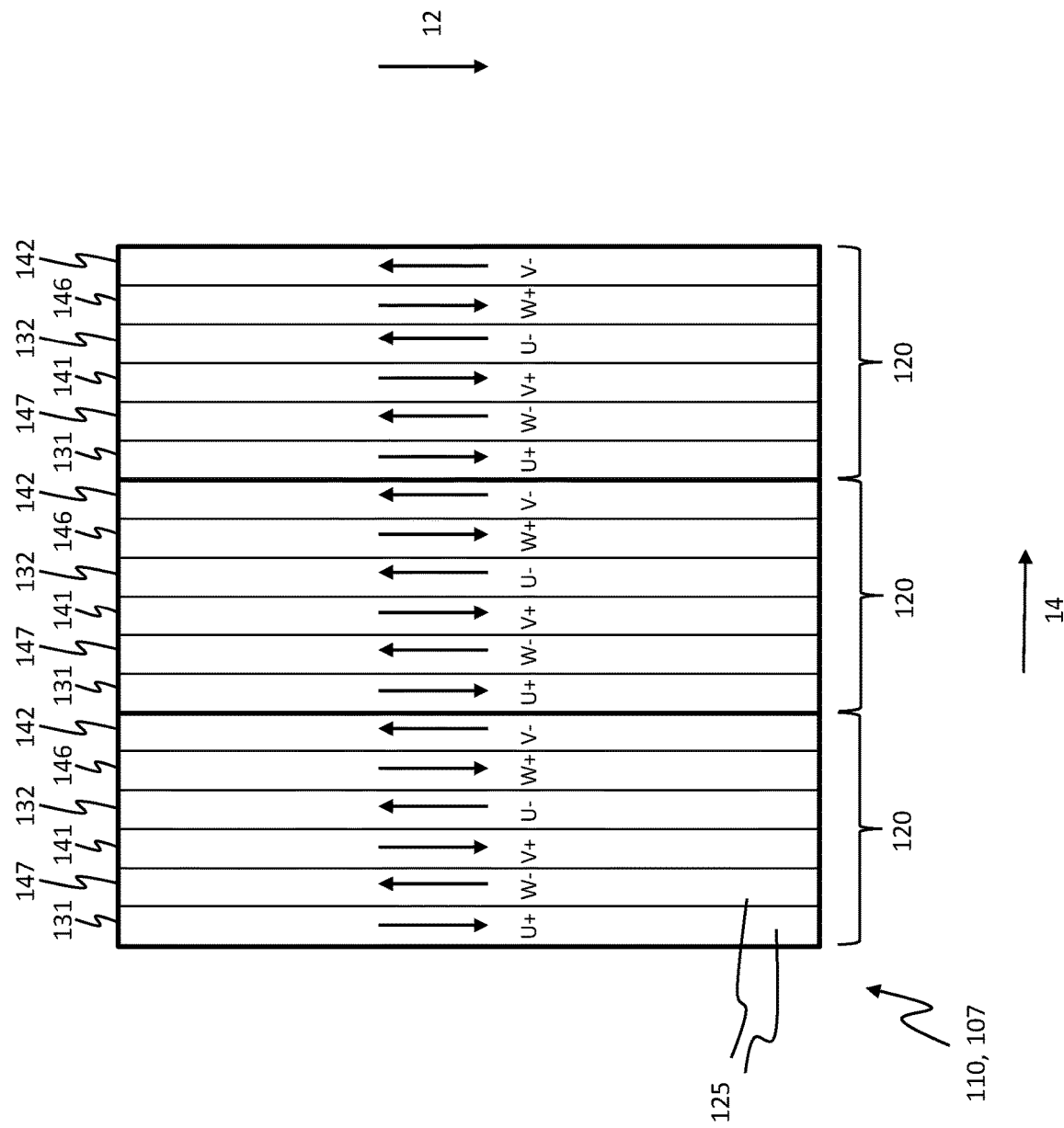
FIG. 6 show a schematic top view of the first stator layer of the first stator sector.
Figure 7:
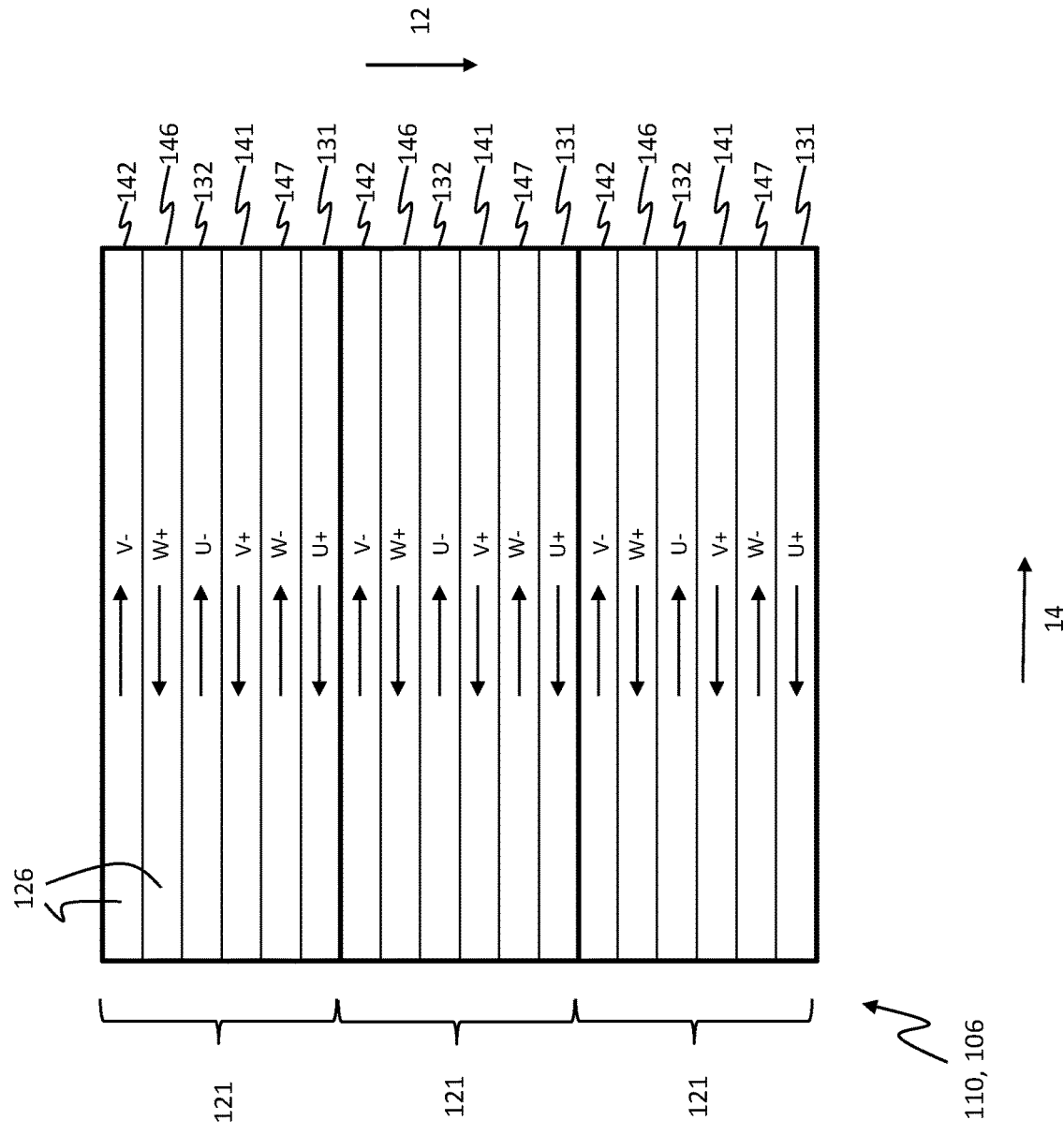
FIG. 7 show a schematic view of the second stator layer of the first stator sector.

FIG. 6 shows a schematic top view of the fourth stator layer 107 of the first stator sector 110. FIG. 7 shows a schematic top view of the third stator layer 106 of the first stator sector 110. FIG. 6 and FIG. 7 show the distribution of the phases U, V, W to the coil conductors 125, 126 of the first and second stator segments 120, 121 of the first stator sector 110. The stator segments 120, 121 each comprise a first forward conductor 131 and a first return conductor 132 for the first phases U of the drive currents, a second forward conductor 141 and a second return conductor 142 for the second phases V of the drive currents and a third forward conductor 146 and a third return conductor 147 for the third phases W of the drive currents. as the individual stator segments 120, 121 may each be supplied with current independently of one another, the drive currents applied to the individual stator segments 120, 121 may differ. In particular, the individual first phases U which are applied to the different stator segments 120, 121 may differ. In addition, the individual second phases V, with which the various stator segments 120, 121 are supplied, and the individual third phases W, with which the various stator segments 120, 121 are supplied, may differ.

The forward conductors 131, 141, 146 and the return conductors 132, 142, 147 of the individual stator segments 120, 121 are arranged next to each other along a width direction of the stator segments 120, 121. For the first stator segments 120 shown in FIG. 6, the width direction corresponds to the second direction 14. For the second stator segments 121 shown in FIG. 7, the width direction is in parallel and opposite to the first direction 12.

The first forward conductor 131 is respectively arranged on the first longitudinal side of each of the stator segments 120, 121. In the first stator segments 120, the first longitudinal side is oriented along the first direction 12 and in the second stator segments 121 along the second direction 14. Following the first forward conductor 131, the third return conductor 147, the second forward conductor 141, the first return conductor 132, the third forward conductor 146, and the second return conductor 142 are arranged next to each other in the width direction of the stator segments 120, 121.

The first phase U is routed on the first forward conductor 131 from a first side of the stator segments 120, 121 to a second side of the stator segments 120, 121 opposite to the first side and on the first return conductor 132 from the second side to the first side. The second phase V is routed on the second forward conductor 141 from the first side of the stator segments 120, 121 to the second side of the stator segments 120, 121 and on the second return conductor 142 from the second side to the first side. The third phase W is routed on the third forward conductor 146 from the first side of the stator segments 120, 121 to the second side of the stator segments 120, 121 and on the third return conductor 147 from the second side to the first side.

The phases U, V and W are thus fed in at the first side of the stator segments 120, 121 to the forward conductors 131, 141, 146 and at the second side of the stator segments 120, 121 to the return conductors 132, 142, 147. In addition, phases U, V and W are coupled out of the forward conductors 131, 141, 146 on the second side of the stator segments 120, 121 and out of the return conductors 132, 142, 147 on the first side of the stator segments 120, 121.

In the first stator segments 120, the first and second sides are each aligned in parallel to the second direction 14. In the second stator segments 121, the first and second sides are each aligned in parallel to the first direction 12.

The first forward and return conductors 131, 132 of first stator segments 120, which are stacked on top of one another on a plurality of stator layers 104, 107, may each be serially connected. In particular, the first forward conductor 131 arranged in the first stator layer 104 and the first return conductor 132 arranged in the first stator layer 104 may be connected in series with the first forward conductor 131 arranged in the fourth stator layer 107 and the first return conductor 132 arranged in the fourth stator layer 107. Similarly, the second forward and return conductors 141, 142 and the third forward and return conductors 146, 147 of second stator segments 121 stacked on top of one another in a plurality of stator layers 104, 105 may each be connected in series.

In particular, the phases U, V, W may each be injected into the forward conductors 131, 141, 146 of one of the first stator segments 120 on the first or fourth stator layers 104, 107, then pass through all forward and return conductors 131, 141, 146, 132, 142, 147 assigned to the respective phase U, V, W on all stator layers 104, 107 of the respective first stator segment 120 and finally be combined in a neutral point. In analogy to the first stator segments 120, the first forward and return conductors 131, 132, the second forward and return conductors 141, 142 and the third forward and return conductors 146, 147 of second stator segments 121, which are arranged on top of one another on a plurality of stator layers 105, 106, may also be connected in series and combined to form a neutral point.

Figure 8:
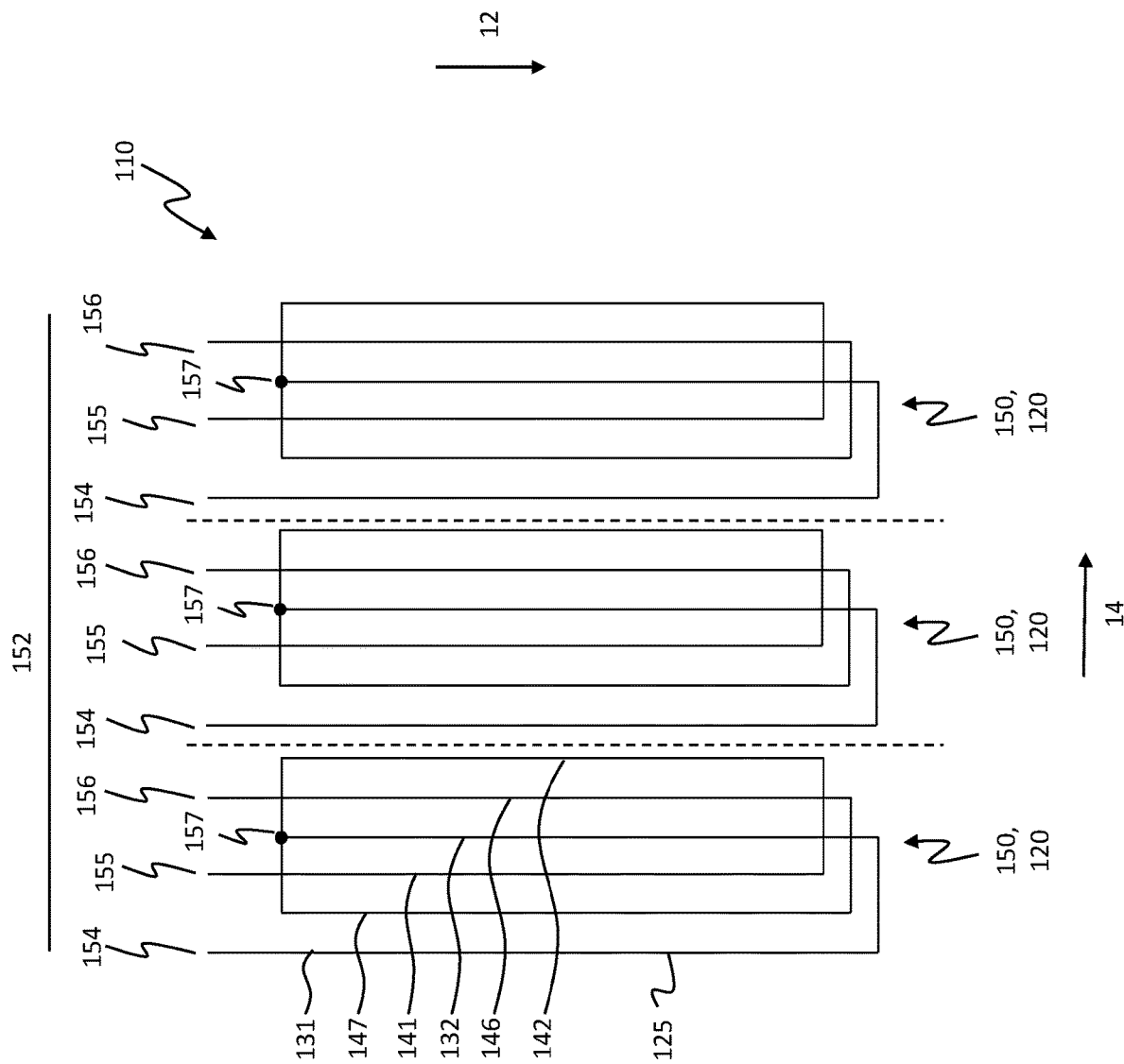
FIG. 8 show an equivalent circuit diagram of first stator segments of the first stator sector.

FIG. 8 shows an equivalent circuit diagram of the first stator segments 120 of the first stator sector 110. In the equivalent circuit diagram shown in FIG. 8, all coil conductors 125 of the first stator segments 120, which are arranged on top of one another and connected in series, are shown as a single conductor. In particular, the first forward conductor 131 shown comprises all forward conductors 131 of the first stator segments 120, which are connected in series and are arranged on top of one another in different stator layers 104, 107, and the first return conductor 132 shown comprises all first return conductors 132 of the first stator segments 120, which are disposed on top of one another in different stator layers 104, 107 and are connected in series. Similarly, the shown second forward conductor 141, second return conductor 142, third forward conductor 146, and third return conductor 147 each comprise all second forward conductors 141, second return conductor 142, third forward conductor 146, and third return conductor 147 of the first stator segments 120, respectively, which are stacked on top of one another and connected in series in different stator layers 104, 107.

The coil conductors 125 of the individual first stator segments 120 are each connected to first three-phase systems 150. At a first side 152 of the individual first stator segments 120, oriented along the second direction 14, a first connection point 154 for feeding in the first phases U, a second connection point 155 for feeding in the second phases V and a third connection point 156 for feeding in the third phases W are arranged. The first connection point 154 is connected to a first forward conductor 131 arranged in one of the stator layers 104, 107. The second connection point 155 is connected to a second forward conductor 141 located in one of the stator layers 104, 107. The third connection point 156 is connected to a third forward conductor 146 located in one of the stator layers 104, 107. In addition, a neutral point 157 is arranged on the first side 152 of each of the first stator segments 120. At each neutral point 157, a first return conductor 132 of one of the stator layers 104, 107, a second return conductor 142 of one of the stator layers 104, 107 and a third return conductor 147 of one of the stator layers 104, 107 are respectively connected to each other.

Figure 9:
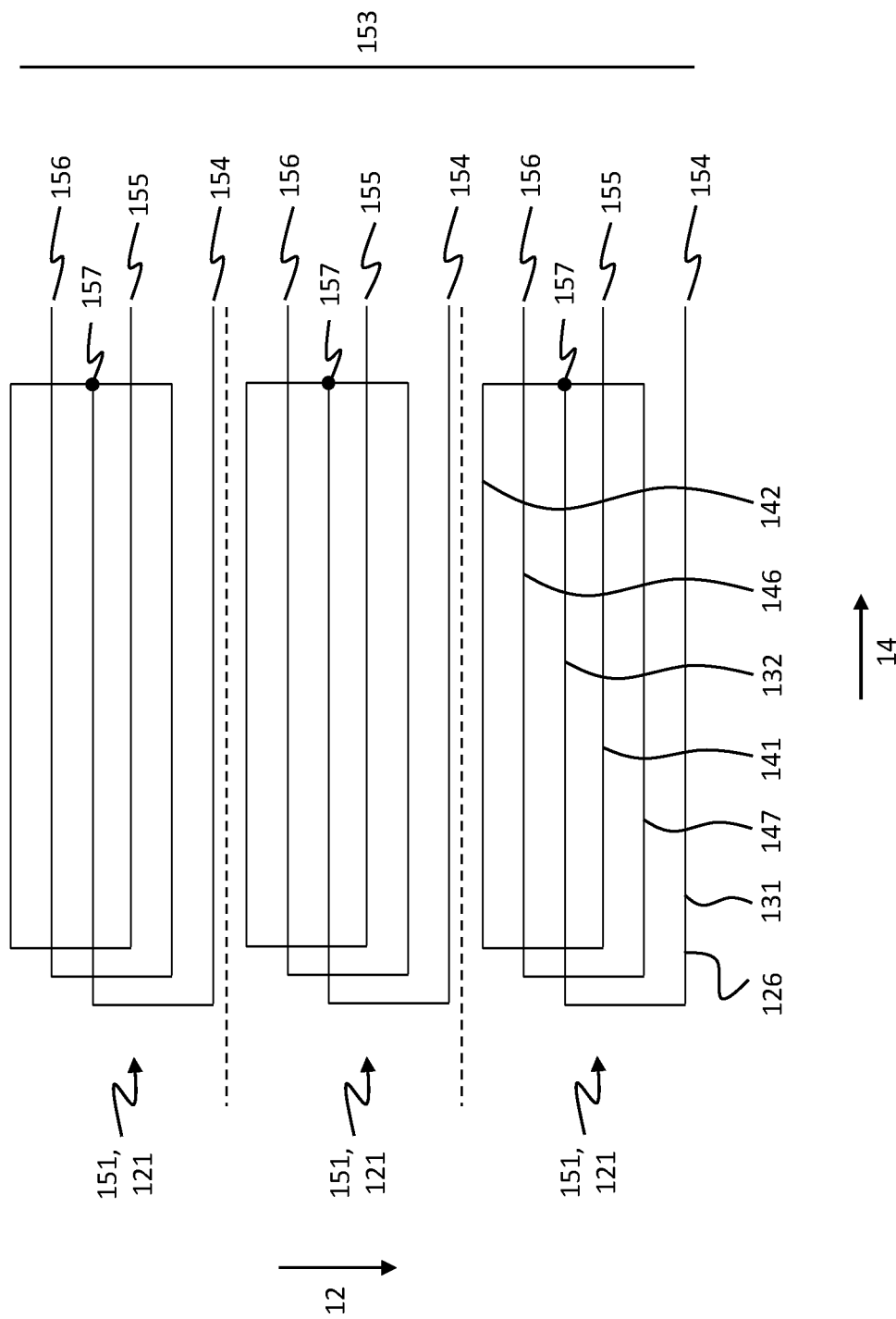
FIG. 9 show an equivalent circuit diagram of second stator segments of the first stator sector.

FIG. 9 shows an equivalent circuit diagram of the second stator segments 121 of the first stator sector 110. In the equivalent circuit diagram shown in FIG. 9, as in the equivalent circuit diagram of the first stator segments 120 shown in FIG. 8, all second coil conductors 126 of the second stator segments 121, which are disposed on top of one another and connected in series, are shown as a single conductor.

The second coil conductors 126 of the second stator segments 121 are each connected in the same way as the coil conductors 125 of the first stator segments 120 to form second three-phase systems 151. On a first side 153 of the second stator segments 121, oriented along the first direction 12, a first connection point 154 for feeding in the first phases U, a second connection point 155 for feeding in the second phases V and a third connection point 156 for feeding in the third phases W are arranged. The first connection point 154 is connected to a first forward conductor 131 arranged in one of the stator layers 105, 106. The second connection point 155 is connected to a second forward conductor 141 arranged in one of the stator layers 105, 106. The third connection point 156 is connected to a third forward conductor 146 disposed in one of the stator layers 105, 106. In addition, a neutral point 157 is arranged on the first side 153 of each of the second stator segments 121. At each neutral point 157, a first return conductor 132 of one of the stator layers 105, 106, a second return conductor 142 of one of the stator layers 105, 106, and a third return conductor 147 of one of the stator layers 105, 106 are connected to one another.

Figure 10:
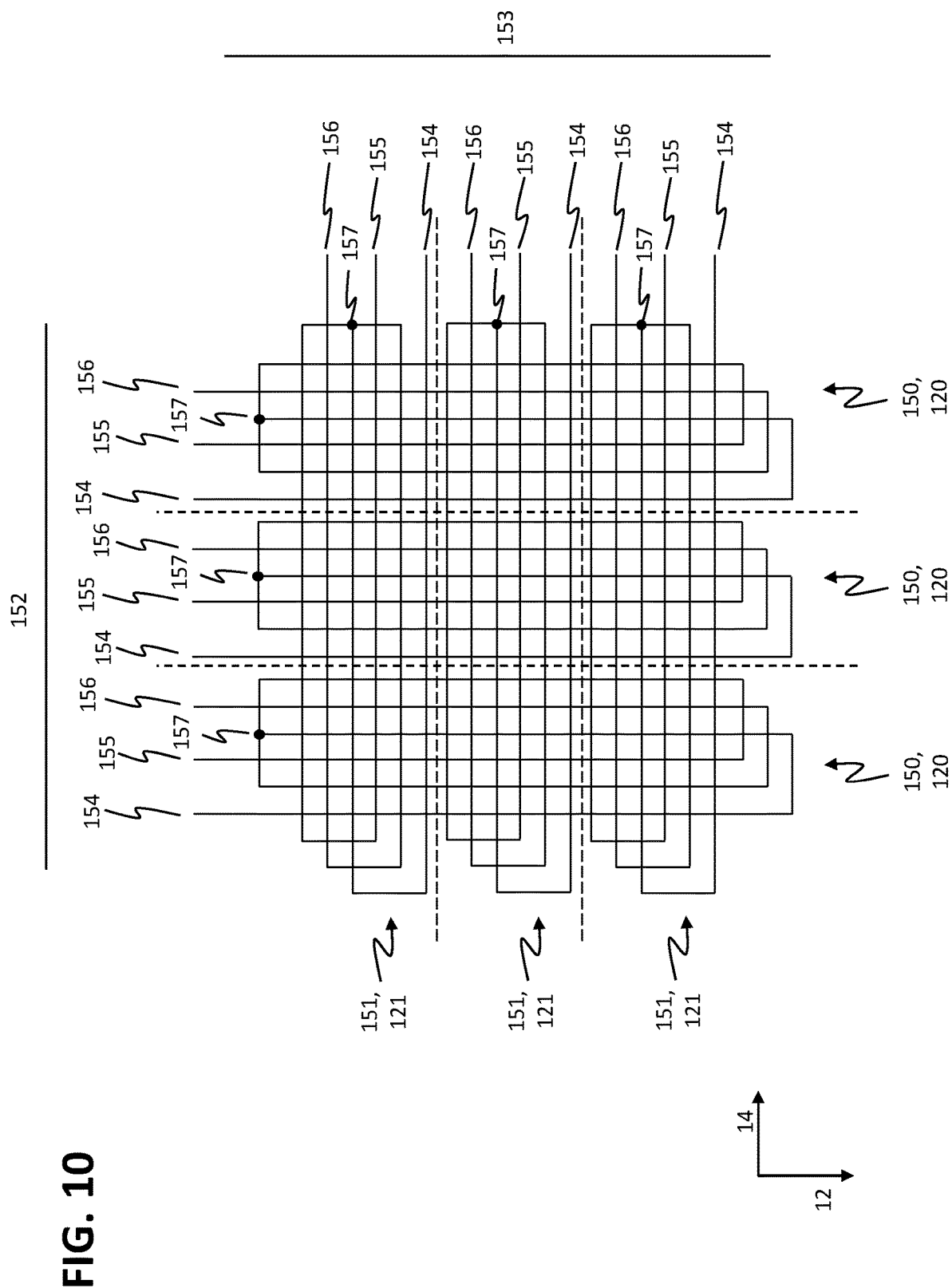
FIG. 10 show an equivalent circuit diagram of the first and second stator segments of the first stator sector.

FIG. 10 shows an equivalent circuit diagram of the first stator sector 110 with the first three-phase systems 150 described in FIG. 8 and representing the first stator segments 120 and the second three-phase systems 151 described in FIG. 9 and representing the second stator segments 121. The first three-phase systems 150 and the second three-phase systems 151 are arranged rotated by 90° with respect to each other. In particular, the first side 152 of the first stator segments 120 and the first side 153 of the second stator segments 121 are arranged perpendicular to each other.

Unless differences are described in the following, the equivalent circuit diagrams of the second stator sector 112, the third stator sector 113 and the fourth stator sector 114 each correspond to the equivalent circuit diagram of the first stator sector 110 shown in FIG. 10. In particular, the equivalent circuit diagram of the second stator sector 112 corresponds to the equivalent circuit diagram of the first stator sector 110 mirrored on the first side 152 of the first stator segments 120, the equivalent circuit diagram of the third stator sector 113 corresponds to the equivalent circuit diagram of the first stator sector 110 mirrored on the first side 153 of the second stator segments 121, and the equivalent circuit diagram of the fourth stator sector 114 corresponds to the equivalent circuit diagram of the first stator sector 110 rotated by 180°.

Figure 11:
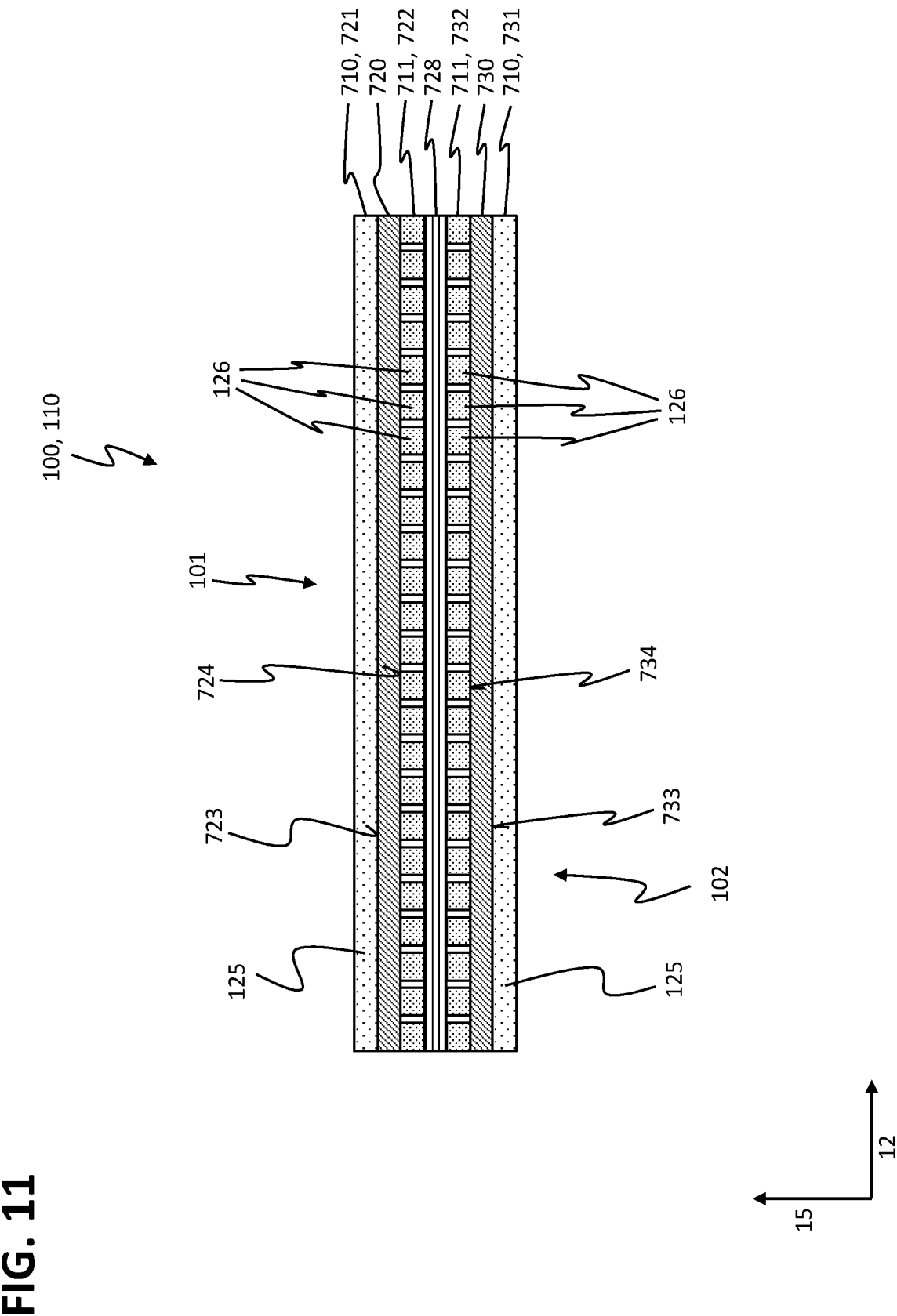
FIG. 11 show a schematic, not-true-to-scale depiction of the stator assembly in a sectional view.

FIG. 11 shows another schematic, not-to-scale depiction of the stator assembly 100 in a sectional view, with the sectional plane oriented perpendicularly with regard to the second direction 14.

The stator assembly 100 has a first arrangement of longitudinal stator layers 710 and a second arrangement of inclined stator layers 711. The longitudinal stator layers 710 are formed by all stator layers 104, 107 of the stator assembly 100 which comprise the first coil conductors 125 extending along the first direction 12. The inclined stator layers 711 are formed by all stator layers 105, 106 of the stator assembly 100 which comprise the second coil conductors 126 extending in the second direction 14. In the first stator assembly 100, the longitudinal stator layers 710 are formed by the first stator layer 104 and by the fourth stator layer 107, and the inclined stator layers 711 are formed by the second stator layer 105 and by the third stator layer 106. The inclined stator layers 711 may also be generally referred to as transverse stator layers.

The stator assembly 100 has a first carrier plate 720 and a second carrier plate 730. Unless differences are described, the second carrier plate 730 is embodied as described for the first carrier plate 720.

The first carrier plate 720 is plate-shaped in the first direction 12 and in the second direction 14, particularly as a plate extending in the first and second direction 12, 14. The first carrier plate 720 is extended in the first direction 12 and in the second direction 14 and has a smaller extension in the third direction 15 than in the first direction 12 and in the second direction 14. The first carrier plate 720 extends in the first direction 12 between the side faces 32 of the stator assembly 100 oriented along the second direction 14. In the second direction 14, the first carrier plate 720 extends between the side faces 32 of the stator assembly 100 oriented along the first direction 12.

The first carrier plate 720 has two layers, i.e. it comprises two stator layers of the stator assembly 100. The first carrier plate 720 comprises a first side 723 and a second side 724 opposite to the first side 723 in the third direction 15. On the first side 723 of the first carrier plate 720, a longitudinal stator layer 710 of the stator assembly 100 with first coil conductors 125 is arranged, which is referred to as first longitudinal stator layer 721. On the second side 724 of the first carrier plate 720, an inclined stator layer 711 of the stator assembly 100 with second coil conductors 126 is arranged, which is referred to as first inclined stator layer 722. The first side 723 of the first carrier plate 720 and the second side 724 of the first carrier plate 720 are each flat and arranged in parallel to each other.

The first carrier plate 720 comprises an electrically insulating material, for example a ceramic, a plastic or a glass fiber reinforced plastic. The electrically insulating material is arranged in the third direction 15 between the first longitudinal stator layer 721 and the first inclined stator layer 722. The first longitudinal stator layer 721 with the first coil conductors 125 and the first inclined stator layer 722 with the second coil conductors 126 are embodied as flat and electrically conductive layers, for example metallic layers, in the third direction 15.

The first carrier plate 720 may be embodied as a circuit board, in particular as a printed circuit board, and the first longitudinal stator layer 721 and the first stator inclined layer 722 may be embodied as conductor layers of the printed circuit board. The first coil conductors 125 of the first longitudinal stator layer 721 and the second coil conductors 126 of the first inclined stator layer 722 may be formed on the sides 723, 724 or layers of the first carrier plate 720 as conductor strips and/or conductor tracks extending in an elongated manner and having a thickness between 10 µm and 500 µm, in particular the conductor strips and/or conductor tracks may have a thickness between 50 µm and 250 µm. The first coil conductors 125 of the first longitudinal stator layer 721 and the second coil conductors 126 of the second inclined stator layer 722 may also be embodied as metal strips or metal wires.

The second carrier plate 730 is embodied as described for the first carrier plate 720. In particular, the second carrier plate 730 comprises a first side 733 and a second side 734 opposite to the first side 733 of the second carrier plate 730 in the third direction. The first side 733 of the second carrier plate 730 has a longitudinal stator layer 710 with first coil conductors 125 which is referred to as the second longitudinal stator layer 731, and the second side 734 of the second carrier plate 733 has an inclined stator layer 711 with second coil conductors 126, which is referred to as the second inclined stator layer 732. In analogy to the first carrier plate 720, the second carrier plate 730 may be embodied as a circuit board, in particular as a printed circuit board, and the second longitudinal stator layer 731 and the first inclined stator layer 732 may be embodied as conductor layers of the printed circuit board.

The first carrier plate 720 is aligned in such a way that the first side 723 of the first carrier plate 720 is located above the second side 724 of the first carrier plate 720 in the third direction 15. Thus, the first side 723 of the first carrier plate 720 forms the top side of the first carrier plate 720 in the third direction 15 and the second side 724 of the first carrier plate 720 forms the bottom side of the first carrier plate 720 in the third direction 15. The second carrier plate 730 is aligned in such a way that the first side 733 of the second carrier plate 730 is located below the second side 734 of the second carrier plate 730 in the third direction 15. Thus, the first side 733 of the second carrier plate 730 forms the bottom side of the second carrier plate 730 in the third direction 15 and the second side 734 of the second carrier plate 730 forms the top side of the second carrier plate 730 in the third direction 15.

The first carrier plate 720 and the second carrier plate 730 of the stator assembly 100 are arranged side by side in the third direction 15. The first carrier plate 720 and the second carrier plate 730 are aligned in parallel to each other. The first carrier plate 720 is arranged above the second carrier plate 730 in the third direction 15. In particular, the second side 724 of the first carrier plate 720 is arranged facing the second side 734 of the second carrier plate 730. The first side 723 of the first carrier plate 720 forms a top side 101 of the stator assembly 100 in the third direction 15 and the first side 733 of the second carrier plate 730 forms a bottom side 102 of the stator assembly 100 in the third direction 15.

In the stator assembly 100, the first longitudinal stator layer 721 forms the first stator layer 104 of the stator assembly 100. The first inclined stator layer 722 forms the second stator layer 105, the second inclined stator layer 732 forms the third stator layer 106, and the second longitudinal stator layer 731 forms the fourth stator layer 107 of the stator assembly 100.

An insulating layer 728 is arranged between the first carrier plate 720 and the second carrier plate 730. The insulating layer 728 is electrically insulating. The insulating layer 728 may e.g. have a plastic or a ceramic material. The insulating layer 728 may in the first direction 12 extend between the side surfaces 32 of the stator assembly 100 running along the second direction 14 and in the second direction 14 between the side surfaces 32 of the stator assembly 100 running along the first direction 12. The insulating layer 728 and the carrier plates 720, 730 may have the same thickness in the third direction 15. The thickness of the carrier plates 720, 730 and of the insulating layer 728 in the third direction 15 may e.g. be between 35 µm and 200 µm, particularly between 50 µm and 100 µm, particularly 75 µm. In the third direction 15, however, the thickness of the insulating layer 728 may also be less or more than that of the carrier plates 720, 730.

The insulating layer 728 is mechanically fixed to the first carrier plate 720 and to the second carrier plate 730. For example, the insulating layer 728 may be glued to the carrier plates 720, 730. Alternatively or additionally, a connecting element may run through the stator assembly 100 in the third direction 15 and mechanically connect the carrier plates 720, 730 and the insulating layer 728 to one another. The connecting element may e.g. run from the top side 101 of the stator assembly 100 to the bottom side 102 of the stator assembly 100. For example, the connecting element may run from the first side 723 of the first carrier plate 720 to the first side 733 of the second carrier plate 730. The connecting element may e.g. be embodied as a press-fit connector. In addition to the connecting element, the stator assembly 100 may have further, identically embodied connecting elements.

The stator assembly 100 in total comprises a multi-layer stator-layer arrangement with an even number of stator layers 104, 105, 106, 107. The stator assembly 100 in particular comprises a four-layer stator layer arrangement. The stator assembly 100 comprises a plurality of two-layer carrier plates 720, 730 arranged on top of one another in the third direction 15. In particular, the stator assembly 100 comprises two two-layer carrier plates 720, 730 on top of one another in the third direction 15.

The stator assembly 100 may have connecting structures in the area of the stator segments 120, 121. The connecting structures may be arranged on the coil conductors 125, 126 or between the coil conductors 125, 126 of the stator segments 120, 121.

The connecting structures may be embodied as horizontal connecting structures or as vertical connecting structures. The horizontal connecting structures are arranged in one of the stator layers 104, 105, 106, 107 and extend in the plane defined by the first and second direction 12, 14. The horizontal connecting structures may extend in an elongated manner. Like the coil conductors 125, 126, the horizontal connecting structures may be embodied as conductor paths or conductor path sections of one layer of a circuit board of the stator assembly 100.

The horizontal connecting structures may be embodied as longitudinal connectors and run in parallel to the coil conductors 125, 126 of the stator layers 104, 105, 106, 107 in which they are arranged. For example, horizontal connecting structures embodied as longitudinal connectors and arranged in the longitudinal stator layers 710 with first coil conductors 125 extend in an elongated manner along the first direction 12. Horizontal connecting structures embodied as longitudinal connectors and arranged with second coil conductors 126 in the inclined stator layers 711 correspondingly extend in an elongated manner along the second direction 14. Horizontal connecting structures formed as longitudinal connectors may also be described as parallel connectors.

The horizontal connecting structures may also be embodied as cross-connectors and run perpendicularly with regard to the coil conductors 125, 126 of the stator layer 104, 105, 106, 107 in which they are arranged. For example, horizontal connecting structures embodied as cross-connectors and arranged in the longitudinal stator layers 710 with first coil conductors 125 extend in an elongated manner along the direction perpendicular to the first direction 12, in case of stator assembly 100 along the second direction 14. Horizontal connecting structures embodied as cross-connectors and arranged in the inclined stator layers 711 with second coil conductors 126 extendomg in an elongated manner along the direction perpendicular to the second direction 14, in case of the stator assembly 100 along the first direction 12.

The stator layers 104, 105, 106, 107 may thus cover a majority of conductor structures. The conductor structures comprise the first or second coil conductors 125, 126 arranged in the respective stator layers 104, 105, 106, 107 as well as the horizontal connecting structures arranged in the respective stator layers 104, 105, 106, 107, in particular the longitudinal connectors and/or transverse connectors arranged in the respective stator layers 104, 105, 106, 107.

Part of the connecting structures may be embodied as vertical connecting structures, which connect conductor structures, in particular coil conductors 125, 126 or horizontal connecting structures, which are arranged on top of one another in the individual stator segments 120, 121 in different stator layers 104, 105, 106, 107. The vertical connecting structures may be embodied as through-contacts or vias (vertical interconnect access) between the individual stator layers 104, 105, 106, 107 of the carrier plates 710, 720 of the stator assembly 100.

The horizontal connecting structures may be embodied as conductor strips and/or tracks arranged in the layers of the carrier plates 720, 730.

Figure 12:
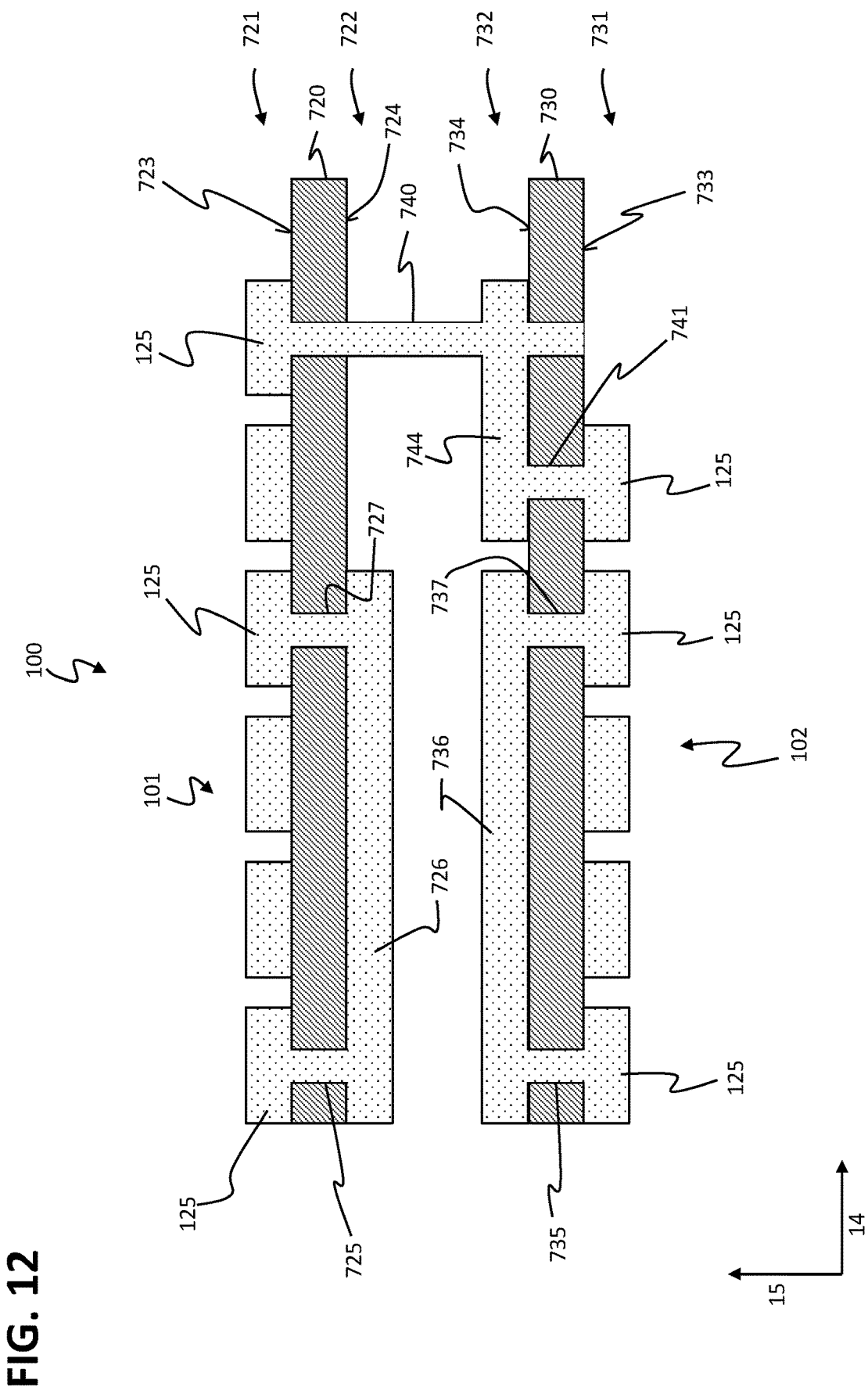
FIG. 12 show a schematic, not-true-to-scale depiction of a section of the stator assembly in a further, enlarged sectional view.

FIG. 12 shows a schematic, not-to-scale depiction of a section of the stator assembly 100 in a further enlarged sectional view. In the further sectional view shown in FIG. 12, the sectional plane is oriented perpendicularly with regard to the first direction 12, unlike the sectional view shown in FIG. 11. In the schematic depiction of FIG. 12, an insulating layer 728 can be arranged between the first carrier plate 720 and the second carrier plate 730.

The first carrier plate 720 comprises a first vertical connecting structure 725. The first vertical connecting structure 725 is aligned in parallel to the third direction 15 and runs through the first carrier plate 720 in the third direction 15. The first vertical connecting structure 725 in the third direction 15 extends from the first side 723 of the first carrier plate 720 to the second side 724 of the first carrier plate 720. In particular, the first vertical connecting structure 725 does not protrude over the first carrier plate 720 in the third direction 15. In particular, the first vertical connecting structure 725 may end in the third direction 15 on the first side 723 of the first carrier plate 720 and on the second side 724 of the first carrier plate 720.

The first vertical connecting structure 725 connects a first coil conductor 125 of the first longitudinal stator layer 721 arranged on the first side 723 of the first carrier plate 720 with a first conductor structure 726 arranged on the second side 724 of the first carrier plate 720 in an electrically conductive manner. On the second side 724 of the first carrier plate 720, the first conductor structure 726 may run in parallel to the second coil conductors 126 of the first inclined stator layer 722. The first conductor structure 726 may be a first horizontal connecting structure, in particular a first transverse connector or a first longitudinal connector. The first conductor structure 726 may be electrically insulated from the second coil conductors 126 of the second side 724 of the first carrier plate 720 so that no electrical connection exists between the first coil conductors 125 on the first side 723 of the first carrier plate 720 and the second coil conductors 126 on the second side 724 of the first carrier plate 720.

The first coil conductor 125 of the first longitudinal stator layer 721 may be directly electroconductively connected to the first vertical connecting structure 725. The first coil conductor 125 of the first longitudinal stator layer 721 may also be electroconductively connected to the first vertical connecting structure 725 via a horizontal connecting structure arranged on the first longitudinal stator layer 721, in particular via a transverse connector arranged on the first longitudinal stator layer 721 or via a longitudinal connector arranged on the first longitudinal stator layer 721.

In addition to the first vertical connecting structure 725, the first carrier plate 720 may comprise further vertical connecting structures which are embodied in the same way as the first vertical connecting structure 725. For example, as shown in FIG. 12, the first carrier plate 720 may comprise a further first vertical connecting structure 727 which electroconductively connects the first conductor structure 726 arranged on the first inclined stator layer 722 with a further first coil conductor 125 of the first longitudinal stator layer 721. The further first coil conductor 125 and the further first vertical connecting structure 727 may be electroconductively connected directly or via a horizontal connecting structure.

The second carrier plate 730 includes a second vertical connecting structure 735. Unless differences are described, the second vertical connecting structure 735 is embodied as described for the first vertical connecting structure 725. The second vertical connecting structure 735 is aligned in parallel to the third direction 15 and runs through the second carrier plate 730 in the third direction 15. The second vertical connecting structure 735 in the third direction 15 extends from the first side 733 of the second carrier plate 730 to the second side 734 of the second carrier plate 730. In particular, the second vertical connecting structure 735 does not protrude over the second carrier plate 730 in the third direction 15. In particular, the second vertical connecting structure 735 may in the third direction 15 end on the first side 733 of the second carrier plate 730 and on the second side 734 of the second carrier plate 730.

The second vertical connecting structure 735 electroconductively connects a first coil conductor 125 of the second longitudinal stator layer 731, which is arranged on the first side 733 of the second carrier plate 730, with a second conductor structure 736 arranged on the second side 734 of the second carrier plate 730. Unless differences are described, the second conductor structure 736 is embodied as described for the first conductor structure 726. On the second side 734 of the second carrier plate 730, the second conductor structure 736 may run in parallel to the second coil conductors 126 of the second inclined stator layer 732. The second conductor structure 736 may be a second horizontal connecting structure, in particular a second transverse connector or a second longitudinal connector. The second conductor structure 736 may be electrically insulated from the second coil conductors 126 of the second side 734 of the second carrier plate 730 so that no electrical connection exists between the first coil conductors 125 on the first side 733 of the second carrier plate 730 and the second coil conductors 126 on the second side 734 of the second carrier plate 730.

The first coil conductor 125 of the second longitudinal stator layer 731 may be directly electroconductively connected to the second vertical connecting structure 735. In an embodiment, the first coil conductor 125 of the second longitudinal stator layer 731 may also be electroconductively connected to the second vertical connecting structure 735 via a horizontal connecting structure arranged on the second longitudinal stator layer 731, in particular via a transverse connector arranged on the second longitudinal stator layer 731 or via a longitudinal connector arranged on the second longitudinal stator layer 731.

In addition to the second vertical connecting structure 735, the second carrier plate 730 may comprise further vertical connecting structures which are embodied like the second vertical connecting structure 735. For example, as shown in FIG. 12, the second carrier plate 730 may comprise a further second vertical connecting structure 737 which electroconductively connects the second conductor structure 736 arranged on the second inclined stator layer 732 to a further first coil conductor 125 of the second longitudinal stator layer 731. The further first coil conductor 125 of the second longitudinal stator layer 731 and the further second vertical connecting structure 737 may be electroconductively connected directly or via a horizontal connecting structure arranged on the second longitudinal stator layer 731.

The first vertical connecting structure 725 and the second vertical connecting structure 735 are arranged on top of one another in the third direction 15. In particular, the first vertical connecting structure 725 and the second vertical connecting structure 735 are aligned in the third direction 15. The first vertical connecting structure 725 and the second vertical connecting structure 735 are electrically insulated from each other by the insulating layer 728. In particular, on the second side 724 of the first carrier plate 720 the first vertical connecting structure 725 only extends up to the insulating layer 728, in particular only up to a top side of the insulating layer 728. On the second side 734 of the second carrier plate 730, the second vertical connecting structure 735 also only extends up to the insulating layer 728, in particular only up to a bottom side of the insulating layer 728.

In analogy to the first and second vertical connecting structures 725, 735, further vertical connecting structures of the first and second carrier plate 720, 730 may also be arranged 15 above one another in the third direction 15. In particular, the further first vertical connecting structure 727 and the further second vertical connecting structure 737 may be arranged on top of one another in the third direction 15 analogously to the first and second vertical connecting structures 725, 735.

The stator assembly 100 comprises a third vertical connecting structure 740. Unless differences are described, the third vertical connecting structure 740 is embodied as described for the first vertical connecting structure 725. The third connecting structure 740 connects a first coil conductor 125 arranged on the first side 723 of the first carrier plate 720 in an electroconductive manner to a third conductor structure 744 arranged on the second side 734 of the second carrier plate 730. The third conductor structure 744 may e.g. be a third horizontal connecting structure, in particular a third longitudinal connector or a third transverse connector. The third conductor structure 740 may be electrically insulated from the second coil conductors 126 on the second side 734 of the second carrier plate 730 so that no electrical connection exists between the first coil conductors 125 on the first side 723 of the first carrier plate 720 and the second coil conductors 126 on the second side 734 of the second carrier plate 730.

The third vertical connecting structure 740 runs in parallel to the third direction 15. In the third direction 15, the third vertical connecting structure 740 runs through the first carrier plate 720 and the insulating layer 728. The third vertical connecting structure 740 may also run through the second carrier plate 730. In particular, the third vertical connecting structure 740 may extend from the top side 101 of the stator assembly 100 to the bottom side 102 of the stator assembly 100 and from the topmost stator layer to the lowermost stator layer. In the stator assembly 100 shown in FIG. 12, the third vertical connecting structure 740 then extends from the first side 723 of the first carrier plate 720 to the first side 733 of the second carrier plate 730.

The third vertical connecting structure 740 only touches conductor structures of the respective stator layer 104, 105, 106, 107 on two stator layers 104, 105, 106, 107 of the stator assembly 100. On the remaining stator layers 104, 105, 106, 107, the conductor structures of the respective stator layer 104, 105, 106, 107 are arranged at a distance from the third vertical connecting structure 740. In particular, annular insulating areas may be arranged around the third vertical connecting structure 740 on the remaining stator layers 104, 105, 106, 107 between the third vertical connecting structure 740 and the conductor structures of the respective stator layer 104, 105, 106, 107. In particular, the third vertical connecting structure 740 only touches conductor structures of the first longitudinal stator layer 721 and conductor structures of the second inclined stator layer 732, so that the third vertical connecting structure 740 forms an electrically conductive connection between the conductor structures of the first inclined stator layer 722 and the conductor structures of the second longitudinal stator layer 731. Thereby, the third vertical connecting structure 740 is electroconductively connected to first coil conductors 125 on the first longitudinal stator layer 721 and is electrically insulated on the second inclined stator layer 732 from the second coil conductors 126 arranged there, so that no electrically conductive connection exists between the first and the second coil conductors 125, 126.

The second carrier plate 730 comprises a fourth vertical connecting structure 741. Unless differences are described, the fourth vertical connecting structure 741 is embodied as described for the second vertical connecting structure 735. The fourth vertical connecting structure 741 connects the third conductor structure 744 of the second inclined stator layer 732, which is embodied as a horizontal connecting structure, in particular as a longitudinal or transverse connector, to a first coil conductor 125 of the second longitudinal stator layer 731. Like the second vertical connecting structure 735, the fourth vertical connecting structure 741 extends from the first side 733 of the second carrier plate 730 to the second side 734 of the second carrier plate 730. In the stator assembly 100, a first coil conductor 125 of the first longitudinal stator layer 721 is electroconductively connected to a first coil conductor 125 of the second longitudinal stator layer 731 via the third vertical connecting structure 740, the third conductor structure 744 and the fourth vertical connecting structure 741.

Instead of or in addition to the third vertical connecting structure 740, the stator assembly 100 may also comprise further vertical connecting structures which, like the third vertical connecting structure 740, extend from the top side 101 of the stator assembly 100 to the bottom side 102 of the stator assembly 100. Such vertical connecting structures may touch two conductor structures arranged in stator layers 722, 731 other than the first longitudinal stator layer 721 and the second inclined stator layer 732. For example, such a vertical connecting structure may electroconductively connect a conductor structure on the first longitudinal stator layer 721, such as a first coil conductor 125, a longitudinal connector or a transverse connector of the first longitudinal stator layer 721, to a conductor structure on the second longitudinal stator layer 731, such as a first coil conductor 125, a longitudinal connector or a transverse connector of the second longitudinal stator layer 731. Such a vertical connecting structure may also electroconductively connect a conductor structure arranged on the first inclined stator layer 722 to a conductor structure arranged on the second longitudinal stator layer 733 or to a conductor structure arranged on the second inclined stator layer 734.

In addition to the first vertical connecting structures 725, 727, the first carrier plate 720 may also include further vertical connecting structures which are embodied analogously to the first vertical connecting structures 725, 727 and connect second coil conductors 126 arranged on the second side 724 of the first carrier plate 720 to conductor structures arranged on the first side 723 of the first carrier plate 720. For example, the first carrier plate 720 may include a vertical connecting structure that electroconductively connects a second coil conductor 126 arranged on the second side 724 of the first carrier plate 720 to a longitudinal connector located on the first side 723 of the first carrier plate 720.

In addition to the second vertical connecting structures 735, 737, the second carrier plate 730 may also include further vertical connecting structures which are embodied analogously to the second vertical connecting structures 735, 737 and connect second coil conductors 126 arranged on the second side 734 of the second carrier plate 730 to conductor structures arranged on the first side 733 of the second carrier plate 730. For example, the second carrier plate 730 may include a vertical connecting structure that electroconductively connects a second coil conductor 126 arranged on the second side 734 of the second carrier plate 730 to a longitudinal connector arranged on the first side 733 of the second carrier plate 730.

The first vertical connecting structures 725, 727 of the first carrier plate 720 may each comprise conductively coated through-holes through the first carrier plate 720. The second vertical connecting structures 735, 737 and the fourth vertical connecting structure 741 of the second carrier plate 730 may each include conductively coated through-holes through the second carrier plate 730.

The through-contacts of the first vertical connecting structures 725, 727 and the through-contacts of the second vertical connecting structures 735, 737 and the fourth vertical connecting structure 741 may only extend over the carrier plate 720, 730 on which the stator layers 721, 722, 731, 732 connected via the respective through-contact are arranged, but not over the entire stator assembly 100. Such through-contacts of a stator assembly 100 consisting of a plurality of two-layer carrier plates 720, 730 are also referred to as blind vias or buried vias.

In particular, vertical connecting structures 725, 727 formed as blind vias or buried vias extend through the first carrier plate 720 from the first side 723 of the first carrier plate 720 to the second side 724 of the first carrier plate 720. In particular, the vertical connecting structures 735, 737, 741 embodied as blind vias or buried vias extend through the second carrier plate 730 from the first side 733 of the second carrier plate 730 to the second side 734 of the second carrier plate 730. This means that the conductor structures of the longitudinal stator layers 710 and the conductor structures of the inclined stator layers 711 of the individual carrier plates 720, 730 are, among other things, electroconductively connected to each other by connecting structures 725, 727, 735, 737, 741 which are exclusively embodied on the respective carrier plate 720, 730.

The first coil conductors 125 of the longitudinal stator layer 710 and the second coil conductors 126 of the inclined stator layers 711 of the individual carrier plates 720, 730 are each electrically insulated from each other. The vertical connecting structures 725, 727, which are exclusively embodied on the first carrier plate 720, each connect a first coil conductor 125 on the first side 723 of the first carrier plate 720 in an electrically conductive manner to a horizontal connecting structure, in particular to a longitudinal connector or a transverse connector, on the second side 724 of the first carrier plate 720 or a second coil conductor 126 on the second side 724 of the first carrier plate 720 in an electrically conductive manner to a horizontal connecting structure, in particular to a longitudinal connector or a transverse connector, on the first side 723 of the first carrier plate 720. In analogy, the vertical connecting structures 735, 737, 741, which are exclusively implemented on the second carrier plate 730, each connect a first coil conductor 125 on the first side 733 of the second carrier plate 730 to a horizontal connecting structure, in particular to a longitudinal connector or a transverse connector, on the second side 734 of the second carrier plate 730 or a second coil conductor 126 on the second side 734 of the second carrier plate 730 to a horizontal connecting structure, in particular to a longitudinal connector or a transverse connector, on the first side 733 of the second carrier plate 720.

The third vertical connecting structure 740 may have a conductively coated through-hole which extends in the third direction 15 through the entire stator assembly 100. In particular, the through-hole of the third vertical connecting structure 740 may in the third direction 15 extend from the top side 101 of the stator assembly 100 to the bottom side 102 of the stator assembly 100. Such through-contacts are also referred to as through vias or through hole vias.

Vertical connecting structures which, like the first vertical connecting structures 725, 727 and the second vertical connecting structures 735, 737, only electroconductively connect conductor structures in two adjacent and/or neighboring stator layers 104, 105, 106, 107 of the stator assembly and only extend between the adjacent and/or neighboring stator layers 104, 105, 106, 107 may also be called neighboring layer connectors. Vertical connecting structures that extend from the top 101 of the stator assembly 100 to the bottom 102 of the stator assembly 100, like the third vertical connecting structure 740 and unlike the neighboring layer connectors, may also be referred to as through-connectors. Neighboring layer connectors may be buried vias or blind vias, and through vias or through hole vias.

The drive currents of the individual three-phase systems 150, 151 are fed into the stator assembly 100 and into the coil conductors 125, 126 via a contact arrangement 420 as shown in FIG. 3. The contact arrangement 420 is described in German patent application DE 10 2017 131 326.5. This description is fully incorporated into the present description by reference.

is cross-shaped and in the first direction 12 extends between the first and third stator sector 110, 113 and between the second and fourth stator sector 112, 114. In the second direction 14, the contact arrangement 420 extends between the first and second stator sector 110, 112 and the third and fourth stator sector 113, 114. The contact arrangement 420 comprises a first contact structure 421 arranged between the first and second stator sector 110, 112, a second contact structure 422 arranged between the second and fourth stator sector 112, 114, a third contact structure 423 arranged between the third and fourth stator sector 113, 114, and a fourth contact structure 424 arranged between the first and third stator sector 110, 113.

With the first contact structure 421, the first coil conductors 125 of the first and second stator sectors 110, 112 are electroconductively connected. With the second contact structure 422, the second coil conductors 126 of the second and fourth stator sectors 112, 114 are electroconductively connected. The first coil conductors 125 of the third and fourth stator sectors 113, 114 are electroconductively connected to the third contact structure 423. The second coil conductors 126 of the first and third stator sectors 110, 113 are electroconductively connected to the fourth contact structure 424. Thus, the first contact structure 421 comprises the connection points 154, 155, 156 of the first three-phase system 150 as shown in FIGS. 8 and 10, arranged on the first side 152 of the first three-phase system 150. The fourth contact structure 424 comprises the connection points 154, 155, 156 of the second three-phase system 151 as shown in FIGS. 9 and 10, arranged on the first side 153 of the second three-phase system 151.

The contact structures 421, 422, 423, 424 each comprise a plurality of contact units arranged side by side, which are described in detail in the above-mentioned German patent application DE 10 2017 131 326.5. In particular, the contact units may each be embodied as contact holes or vias (vertical interconnect access) in the stator assembly 100 and comprise conductively coated through-holes through the stator assembly 100. The contact units, in particular the vias, may extend from the top side 101 of the stator assembly 100 to the bottom side 102 of the stator assembly 100, as is the case with the through-connectors.

Figure 13:
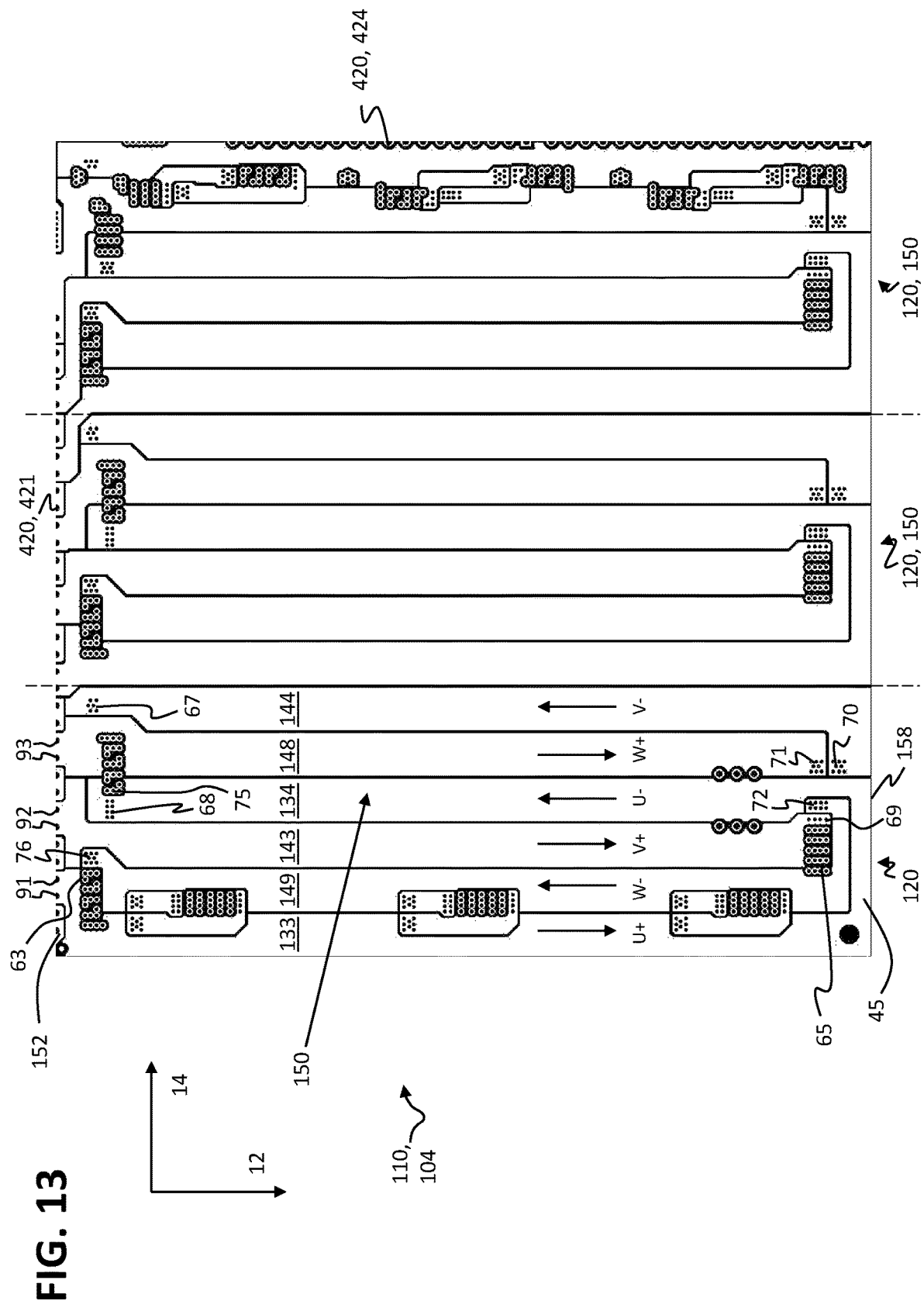
FIG. 13 show a top view of the first stator layer of the first stator sector of the stator assembly.
Figure 14:
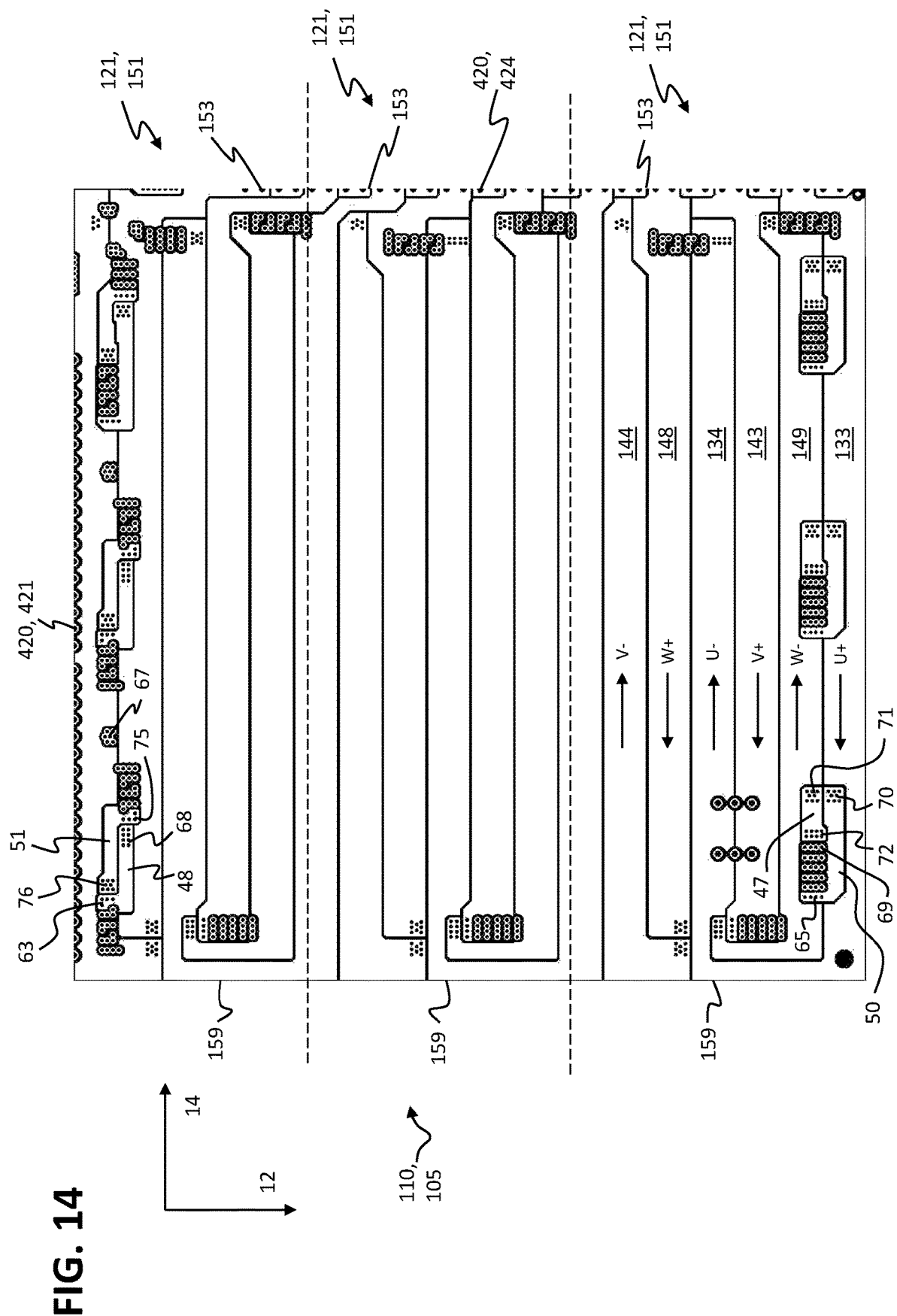
FIG. 14 show a top view of the second stator layer of the first stator sector of the stator assembly.
Figure 15:
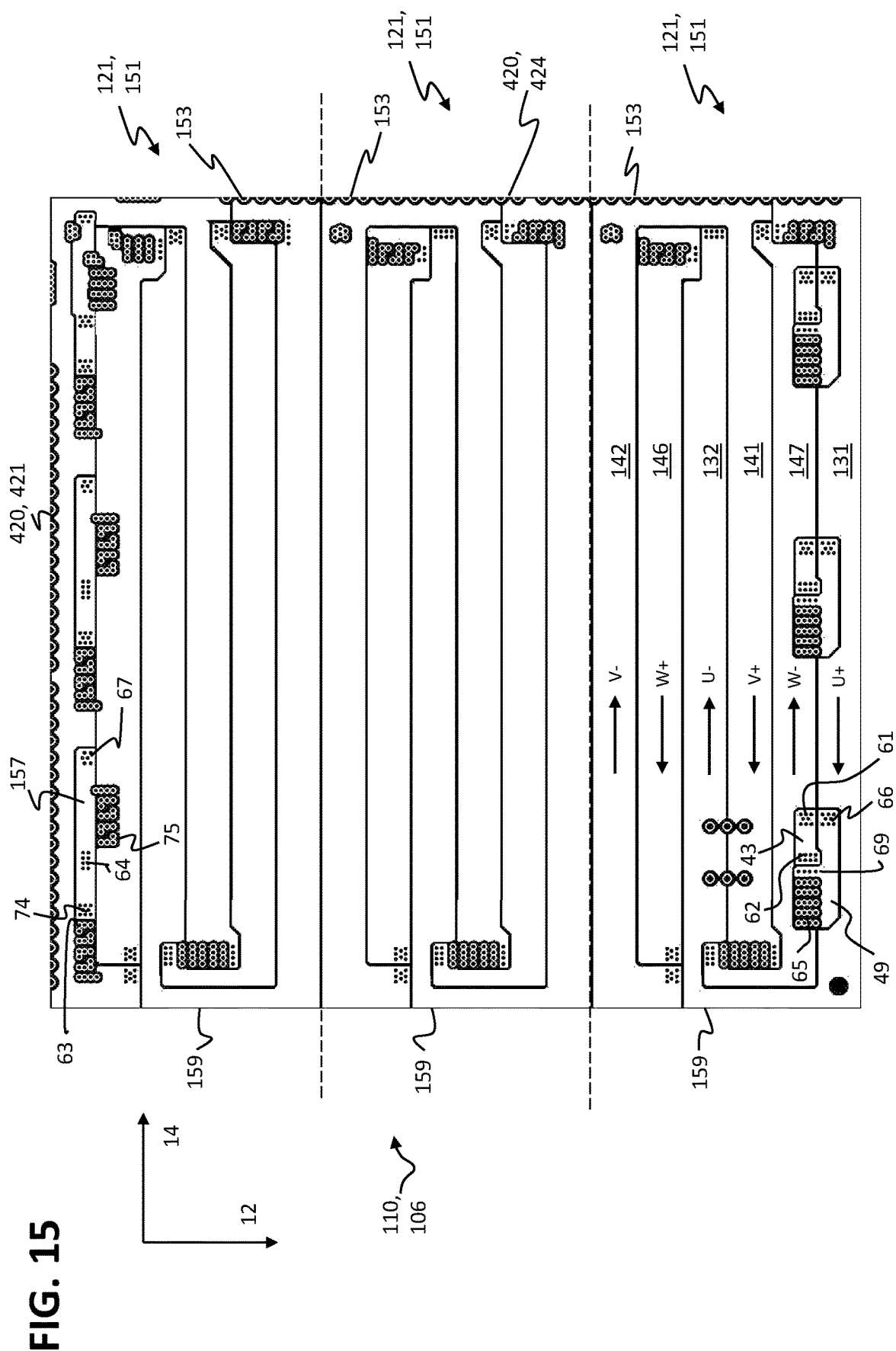
FIG. 15 show a top view of the third stator layer of the first stator sector of the stator assembly.
Figure 16:
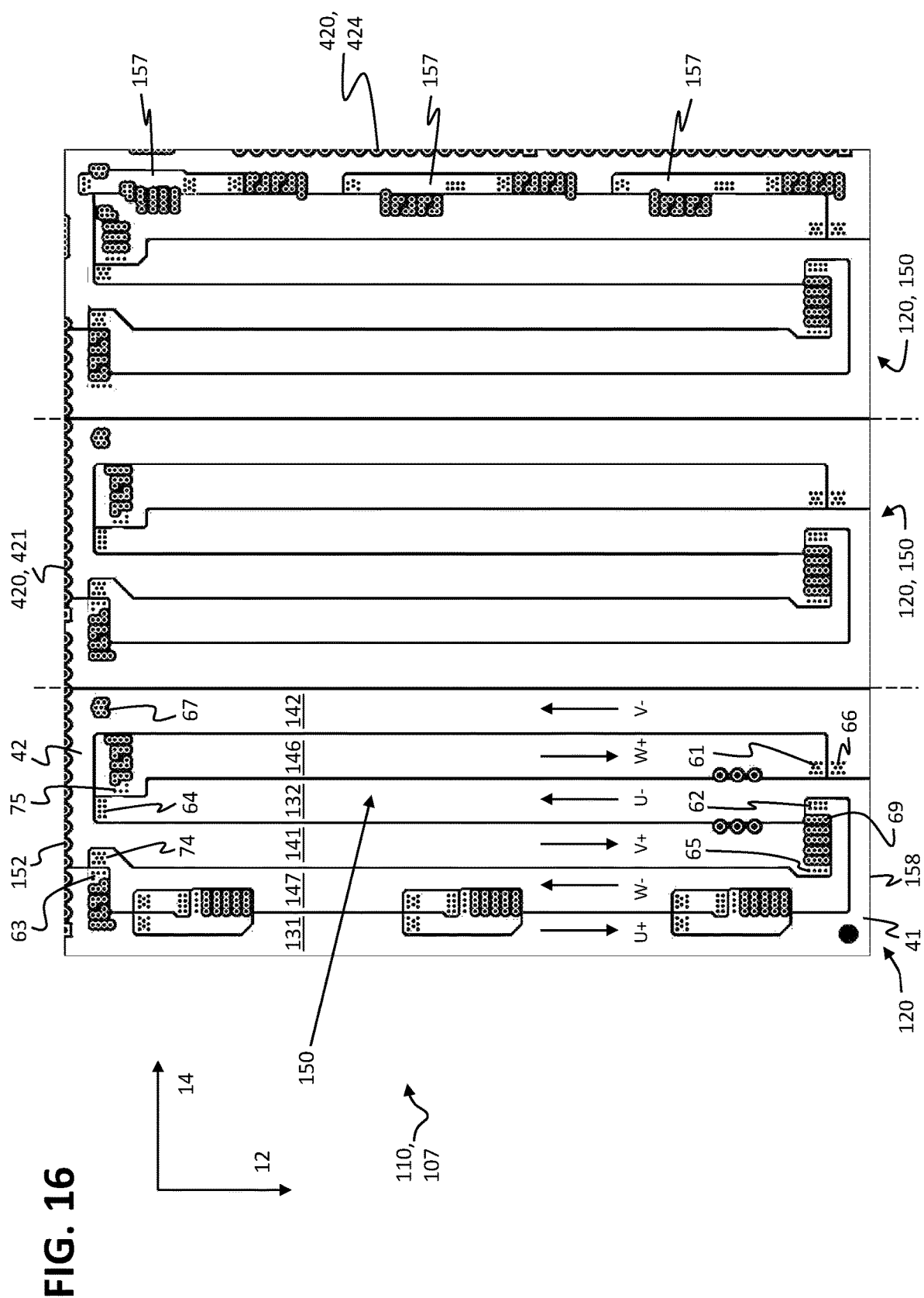
FIG. 16 show a top view of the fourth stator layer of the first stator sector of the stator assembly.

FIG. 13 shows a schematic depiction of a top view of the first stator layer 104 of the first stator sector 110. FIG. 14 shows a schematic depiction of a top view of the second stator layer 105 of the first stator sector 110. FIG. 15 shows a schematic depiction of a top view of the third stator layer 106 of the first stator sector 110. FIG. 16 shows a top view of the fourth stator layer 107 of the first stator sector 110. In the following, the interconnection of the coil conductors of the stator segments 120, 121 to form the three-phase systems 150, 151 is described using the outer first stator segment 120 arranged opposite to the second direction 14 at the outer edge of the first stator sector 110.

On the stator assembly 100, the first coil conductors 125 of the outer first stator segment 120 are interconnected inside the first stator sector 110 and inside the outer first stator segment 120 to form the first three-phase system 150 as described in connection with FIGS. 6 to 10. Particularly in the third direction, 15 stacked first coil conductors 125 of the first and fourth stator layers 104, 107 of the first three-phase system 150 are connected in series on the stator assembly 100 in such a way that the same drive current flows through each stacked first coil conductors 125 of one of the phases U, V, W.

In the fourth stator layer 107, the outer first stator segment 120 comprises as described in connection with FIG. 6, the first forward conductor 131, the third return conductor 147, the second forward conductor 141, the first return conductor 132, the third forward conductor 146 and the second return conductor 142.

As shown in FIG. 13, the outer first stator segment 120 in the first stator layer 104 comprises another first forward conductor 133 of the first phase U which is arranged opposite to the second direction 14 at the outermost edge of the first stator segment 120. In the second direction 14, the outer first stator segment 120 in the first stator layer 104 comprises, in addition to the first forward conductor 133, a further third return conductor 149 of the third phase W, a further second forward conductor 143 of the second phase V, a further first return conductor 134 of the first phase U, a further third forward conductor 148 of the third phase W and a further second return conductor 144 of the second phase V. Unless differences are shown, the further forward conductors 133, 143, 148 are formed as described for the forward conductors 131, 141, 145 arranged in the fourth stator layer 107.

The further first conductor 133 shown in FIG. 13 and the first forward conductor 131 shown in FIG. 16 are connected in series on the stator assembly 100, particularly within the first stator segment 120, in such a way that the drive current of the first phase U flows through them in the first direction 12. The further first return conductor 134 shown in FIG. 13 and the first return conductor 132 shown in FIG. 16 are connected in series on the stator assembly 100, in particular within the first stator segment 120, in such a way that the drive current of the first phase U flows through them in a direction opposite to the first direction 12.

The further second forward conductor 143 shown in FIG. 13 and the second forward conductor 141 shown in FIG. 16 are connected in series on the stator assembly 100, particularly within the first stator segment 120, in such a way that the drive current of the second phase V flows through them in the first direction 12. The further second return conductor 144 shown in FIG. 13 and the second return conductor 142 shown in FIG. 16 are connected in series on the stator assembly 100, in particular within the first stator segment 120, in such a way that the drive current of the second phase V flows through them in a direction opposite to the first direction 12.

The further third forward conductor 148 shown in FIG. 13 and the third forward conductor 145 shown in FIG. 16 are connected in series on the stator assembly 100, particularly within the first stator segment 120, in such a way that the drive current of the third phase W flows through them in the first direction 12. The further third return conductor 149 shown in FIG. 13 and the third return conductor 146 shown in FIG. 16 are connected in series on the stator assembly 100, particularly within the first stator segment 120, in such a way that the drive current of the third phase W flows through them in a direction opposite to the first direction 12.

The first stator layer 104 forms a connecting stator layer of the stator assembly 100. In the connecting stator layer, the first coil conductors 125 of the first stator sector 110 are electroconductively connected to the first contact structure 421. In particular, the further first forward conductor 133 is electroconductively connected to a first connection structure 91 of the first contact structure 421, the further second forward conductor 143 with a second connection structure 92 of the first contact structure 421 and the further third forward conductor 148 with a third connection structure 93 of the first contact structure 421. Via the first connection structure 91, the drive current of the first phase U is fed into the further first forward conductor 133, via the second connection structure 92, the drive current of the second phase V is fed to the further second forward conductor 143, and via the third connection structure 93, the drive current of the third phase W is fed to the further third forward conductor 148.

The first connection structure 91 forms the first connection point 154 shown in FIG. 8. The second connection structure 92 forms the second connection point 155 shown in FIG. 8. The third connection structure 93 forms the third connection point 156 shown in FIG. 8.

The further first forward conductor 133 may be electroconductively connected to further first connection structures 91 for feeding the first phase U. Likewise, the further second forward conductor 143 may be electroconductively connected with further second connection structures 92 for feeding in the second phase V and the further third forward conductor 148 with further third connection structures 93 for feeding in the third phase W. In particular, the further first forward conductor 133 may be electroconductively connected as shown to a further first connection structure 91, the further second forward conductor 143 to a further second connection structure 92 and the further third forward conductor 148 to a further third connection structure 93. The connection structures 91, 92, 93 may be formed by the adjacent contact units of the first contact structure 421.

The first side 152 of the first three-phase system 150 shown in FIGS. 13 and 16 runs along the second direction 14 and is located in the first direction 12 at the second stator sector 112, in particular in the middle of the stator assembly 100. The first three-phase system 150 has a second side 158 opposite to the first side 152 in the first direction 12. The second side 158 of the first three-phase system 150 runs in parallel to the first side 152 and along the second direction 14. The second side 158 of the first three-phase system 150 is arranged at the edge of the stator assembly 100 in the second direction 12. The forward conductors 131, 133, 141, 143, 146, 148 and return conductors 132, 134, 142, 144, 147, 149 of the first three-phase system 150 comprise first ends arranged on the first side 152 of the first three-phase system 150 and second ends arranged on the second side 158 of the first three-phase system 150.

The connection structures 91, 92, 93 are arranged on the first side 152 of the first three-phase system 150. The further first forward conductors 133, 143, 148 are each electroconductively connected to the connection structures 91, 92, 93 in the first stator layer 104 functioning as the connection stator layer, so that the electrically conductive connections between the connection structures 91, 92, 93 and the further forward conductors 133, 143, 148 are each established exclusively via conductor structures, which are arranged exclusively in the first stator layer 104. The further forward conductors 133, 143, 148 are each electroconductively connected in the connecting stator layer with the connecting structures 91, 92, 93 at their first ends located on the first side 152 of the first three-phase system 150.

As shown in FIGS. 13 and 16, the first forward conductors 131, 133 and the first return conductors 132, 134 are electroconductively connected to each other at their second ends arranged on the second side 158 of the first three-phase system 150, each in the stator layer 104, 107 in which they are located, by horizontal connecting conductors. In particular, the first forward conductor 131 is electroconductively connected at its second end in the fourth stator layer 107 by a first horizontal connecting conductor 41 arranged in the fourth stator layer 107 and at the second side 158 of the first three-phase system 150 to the first return conductor 132 at the second end of the latter. The further first forward conductor 133 is electroconductively connected at its second end to the further first return conductor 134 at its second end in the first stator layer 104 by a further first horizontal connecting conductor 45 arranged in the first stator layer 104 and on the second side 158 of the first three-phase system 150.

The first horizontal connecting conductors 41, 45 may be formed in the stator layers 104, 107, as shown, by horizontal connecting structures embodied as cross-connectors. The horizontal connecting conductors 41, 45 may be formed in particular by conductor paths oriented transversely with regard to the first coil conductors 125 of the first and fourth stator layers 104, 107, which extend in an elongated manner in the first direction 12. The horizontal connecting conductors 41, 45 are arranged on top of one another in the third direction 15 and aligned with each other.

As shown in FIG. 16, the second forward conductor 141 and the second return conductor 142 are electroconductively connected to each other at their second ends arranged on the first side 152 of the first three-phase system 150 in the stator layer in which they are arranged, i.e. in the fourth stator layer 107, by a second horizontal connecting conductor 42. The second horizontal connecting conductor 42 is arranged on the first side 152 of the first three-phase system 150 and in the fourth stator layer 107.

The second horizontal connecting conductor 42 may be embodied as described for the first horizontal connecting conductors 41, 45. In particular, the second horizontal connecting conductor 42 may be formed in the fourth stator layer 107 as shown in the figure by a horizontal connecting structure embodied as a cross-connector. The second horizontal connecting conductor 42 may be embodied in particular by conductors which are oriented transversely with regard to the first coil conductors 125 of the fourth stator layer 107 which extend in an elongated manner in the first direction 12.

The first three-phase system 150 comprises a plurality of vertical connecting conductors. The vertical connecting conductors may be embodied as vertical connecting structures, in particular as through-connectors or as neighboring layer connectors. In particular, as shown in FIG. 16, the first three-phase system 150 comprises a first vertical connecting conductor 61, a second vertical connecting conductor 62, a third vertical connecting conductor 63, a fourth vertical connecting conductor 64, a fifth vertical connecting conductor 65, a sixth vertical connecting conductor 66, a seventh vertical connecting conductor 67, and an eighth vertical connecting conductor 68.

Vertical connecting structures embodied as neighboring layer connectors connect conductor structures which are arranged in neighboring stator layers. If the stator assembly 100 comprises a plurality of carrier plates 720, 730 arranged on top of one another in the third direction 15, the stator layers 104, 105, 106, 107, which are arranged on opposite sides 723, 724, 733, 734 of the carrier plates 720, 730 form neighboring stator layers. In particular, in this case the first and second stator layers 104, 105 form neighboring stator layers and the third and fourth stator layers 106, 107 also form neighboring stator layers.

The third forward conductor 146 arranged in the fourth stator layer 107 and shown in FIG. 16, and the third return conductor 147 arranged in the fourth stator layer 107, are connected to each other in an electrically conductive manner via a third horizontal connecting conductor 43 shown in FIG. 15. The third horizontal connecting conductor 43 is arranged in the third stator layer 106 which forms the neighboring stator layer of the fourth stator layer 107, and at the second side 158 of the first three-phase system 150.

The first and second vertical connecting conductor 61, 62 are arranged on the second side 158 of the three-phase system 150. In the fourth stator layer 107, the third forward conductor 146 is at its second end electroconductively connected to the first vertical connecting conductor 61 and in the third stator layer 106, the third horizontal connecting conductor 43 is also electroconductively connected to the first vertical connecting conductor 61. Thus, the second end of the third forward conductor 146 is electroconductively connected to the third horizontal connecting conductor 43 arranged in the third stator layer 106 via the first vertical connecting conductor 61.

In the fourth stator layer 107, the third return conductor 147 is electroconductively connected at its second end to the second vertical connecting conductor 62. More precisely, the third return conductor 147 is connected to the second vertical connecting conductor 62 via a transverse connector arranged in the fourth stator layer 107 and at the second side 158 of the three-phase system 150. In the third stator layer 106, the second vertical connecting conductor 62 is electroconductively connected to the third horizontal connecting conductor 43. Thus, the third return conductor 147 is connected at its second end to the third horizontal connecting conductor 43 arranged in the third stator layer 106 via the second vertical connecting conductor 62.

As shown, the third horizontal connecting conductor 43 may be embodied as a horizontal connecting structure, particularly as a longitudinal connector formed in the third stator layer 106 and in parallel to the second coil conductors 126 arranged there. The first and second vertical connecting conductors 61, 62 may be embodied as neighboring layer connectors and extend in the third direction 15 only from the fourth stator layer 107 to the third stator layer 106.

The first vertical connecting conductor 61 may be formed by the further second vertical connecting structure 737 shown in FIG. 12 and the third horizontal connecting conductor 43 may be formed by the second conductor structure 736 shown in FIG. 12. The second vertical connecting conductor 62 may be formed by the second vertical connecting structure 735 shown in FIG. 12, wherein the transverse connector connected to the third return conductor 147 is electroconductively connected to the second vertical connecting structure 735 in the fourth stator layer 107 instead of the first coil conductor 125. The third forward conductor 146 and the third return conductor 147 are then arranged on the first side 733 of the second carrier plate 730 shown in FIGS. 11 and 12 and the third horizontal connecting conductor 43 is arranged on the second side 734 of the second carrier plate 730 shown in FIGS. 11 and 12.

As shown in FIG. 13, the further third forward conductor 148 is electroconductively connected to the further third return conductor 149 via a further third horizontal connecting conductor 47 arranged in the second stator layer 105 and shown in FIG. 14. The second stator layer 105 forms a neighboring stator layer to the first stator layer 104 in the third direction 15. Unless differences are described, the further third horizontal connecting conductor 47 is arranged and embodied as described for the third horizontal connecting conductor 43. In particular, the further third horizontal interconnection conductor 47 is arranged at the second side 158 of the first three-phase system 150. The further third horizontal connecting conductor 47 is embodied as a longitudinal connector.

The further third forward conductor 148 is electroconductively connected at its second end to the further third horizontal conductor 47 via a further first vertical connecting conductor 71 arranged at the second side 158 of the first three-phase system 150. The further third return conductor 149 is electroconductively connected at its second end to the further third horizontal connecting conductor 47 via a further second vertical connecting conductor 72 arranged at the second side 158 of the first three-phase system 150. In the first stator layer 104, the further third forward conductor 148 is directly connected to the further first vertical connecting conductor 71. In the first stator layer 104, the further third return conductor 149 is electroconductively connected to the further second vertical connecting conductor 72 via a cross-connector.

The further first vertical connecting conductor 71 and the further second vertical connecting conductor 72 are embodied as neighboring layer connectors extending between the first and second stator layers 104, 105. The further first vertical connecting conductor 71 may be formed by the further first vertical connecting structure 727 shown in FIG. 12 and the further third horizontal connecting conductor 47 may be formed by the first conductor structure 726 shown in FIG. 12. The further second vertical connecting conductor 72 may be formed by the first vertical connecting structure 725 shown in FIG. 12, wherein the transverse connector connected to the third return conductor 147 is electroconductively connected to the first vertical connecting structure 725 in the first stator layer 106 instead of the first coil conductor 125. The further third forward conductor 148 and the further third return conductor 149 are arranged on the first side 723 of the first carrier plate 720 shown in FIGS. 11 and 12 and the further third horizontal connecting conductor 47 is arranged on the second side 724 of the first carrier plate 720 shown in FIGS. 11 and 12.

The first vertical connecting conductor 61 and the further first vertical connecting conductor 71 are arranged on top of each other and in alignment with each other in the third direction 15, as shown and described in FIG. 12 for the further first vertical connecting structure 727 and the further second vertical connecting structure 737. The second vertical connecting conductor 62 and the further second vertical connecting conductor 72 are arranged on top of one another and in alignment with each other in the third direction 15 as shown and described in FIG. 12 for the first vertical connecting structure 725 and the second vertical connecting structure 735. The third horizontal connecting conductor 43 and the further third horizontal connecting conductor 47 are arranged on top of one another and in alignment with each other in the third direction 15.

As shown in FIG. 16, in the fourth stator layer 107, the first forward conductor 131 is electroconductively connected at its first end with the third vertical connecting conductor 63 arranged at the first side 152 of the first three-phase system 150. As shown, the first forward conductor 131 may be electroconductively connected to the third vertical connecting conductor 63 via a transverse connector arranged in the fourth stator layer 107. The third vertical connecting conductor 63 is embodied as a through-connector and extends from the first stator layer 104 to the fourth stator layer 107 and from the top side 101 of the stator assembly 100 to the bottom side 102 of the stator assembly 100.

Via the third vertical connecting conductor 63, the first forward conductor 131 is connected to the first connection structure 91 in an electrically conductive manner for feeding in the first phase of the first three-phase system 150. As shown in FIG. 14, in the second stator layer 105 a fourth horizontal connecting conductor 48 arranged at the first side 152 of the first three-phase system 150 is electroconductively connected to the third vertical connecting conductor 63. In the second stator layer 105, the fourth horizontal connecting conductor 48 is further electroconductively connected to the eighth vertical connecting conductor 68 arranged at the first side 152 of the first three-phase system 150. On the first stator layer 104, the eighth vertical connecting conductor 68 is electroconductively connected to the further first return conductor 134 of the first phase U of the first three-phase system 150, so that the eighth vertical connecting conductor 68 and the first forward conductor 131 are electroconductively connected to the first connection structure 91 via the further first return conductor 134, the third horizontal connecting conductor 45 and the further first forward conductor 133.

The fourth horizontal connecting conductor 48 is embodied as a longitudinal connector in the second stator layer 105. The eighth vertical connecting conductor 68 is embodied as a neighboring layer connector which extends in the third direction 15 between the second and first stator layers 105, 104. The fourth horizontal connecting conductor 48 is arranged on the neighboring stator layer of the first stator layer 104 embodied by the second stator layer 105 and arranged in the third direction 15 adjacent to the first stator layer 104. In particular, the fourth horizontal connecting conductor 48 is arranged on the second side 724 of the first carrier plate 720.

As shown in FIG. 16, at its first end in the fourth stator layer 107, the first return conductor 132 is electroconductively connected to the fourth vertical connecting conductor 64 arranged at the first side 152 of the first three-phase system 150. The first return conductor 132 is electroconductively connected to the neutral point 157 of the first three-phase system 150 shown in FIG. 15 via the fourth vertical connecting conductor 64, As shown, the neutral point 157 may be formed in the third stator layer 106. At the neutral point 157, the first phase U, the second phase V and the third phase W may be electroconductively connected to each other, particularly as shown, via a longitudinal connector embodied in the inclined stator layer. The longitudinal connector of the neutral point 157 is arranged at the first side 152 of the first three-phase system 150.

The fourth vertical connecting conductor 64 is embodied as a neighboring layer connector and in the third direction 15 extends from the fourth stator layer 107 to the third stator layer 106 embodying the neighboring stator layer of the fourth stator layer 106. The fourth vertical connecting conductor 64 may be embodied as described in connection with the second vertical connecting structure 735 shown in FIG. 12.

The second return conductor 142 arranged in the fourth stator layer 107 and shown in FIG. 16 is electroconductively connected at its second end to the second connection structure 92. In particular, at its second end in the fourth stator layer 107 the second return conductor 142 is electroconductively connected to the sixth vertical connecting conductor 66 located at the second side 158 of the first three-phase system 150. The sixth vertical connecting conductor 66 is embodied as a neighboring layer connector and in the third direction 15 extends between the fourth stator layer 107 and the third stator layer 106.

In the third stator layer 105, the sixth vertical connecting conductor 66 is electroconductively connected to a fifth horizontal connecting conductor 49 arranged in the third stator layer 105 and on the second side 158 of the first three-phase system 150. The fifth horizontal connecting conductor 49 is in the third stator layer 106 electroconductively connected to a ninth vertical connecting conductor 69 arranged at the second side 158 of the first three-phase system 150. The ninth vertical interconnection conductor 69 is embodied as a through-connector and in the third direction 15 extends between the fourth and first stator layers 107, 104 and between the bottom side 102 and the top side 101 of the stator assembly 100.

In the first stator layer 104, the ninth vertical connecting conductor 69 is electroconductively connected to the further second forward conductor 143 at its second end, so that the second return conductor 142 is electroconductively connected to the second connection structure 92 via the sixth vertical connecting conductor 66, the fifth horizontal connecting conductor 49, the ninth vertical connecting conductor 69 and the further second forward conductor 143. In particular, on the second side 158 of the three-phase system 150 the further second forward conductor 143 is electroconductively connected to the sixth vertical connecting conductor 66. This means that all the conductors via which the further second forward conductor 143 is connected to the sixth vertical connecting conductor 66 and the second return conductor 142 are arranged on the second side 158 of the three-phase system 150.

In the third stator layer 106, the fifth horizontal connecting conductor 49 is embodied as a longitudinal connector. The fifth horizontal connecting conductor 49 is arranged on a neighboring stator layer of the fourth stator layer 107 formed by the third stator layer 106 and arranged adjacent to the fourth stator layer 107 in the third direction 15. The fifth horizontal connecting conductor 49 is arranged on the second side 734 of the second carrier plate 730.

The second return conductor 142 and the further second forward conductor 143 may be connected to each other via the sixth vertical connecting conductor 66, the fifth horizontal connecting conductor 49 and the ninth vertical connecting conductor 69, as described in FIG. 12 for the connection of the first coil conductor 125 via the fourth vertical connecting structure 741, the third conductor structure 744 and the third vertical connecting structure 740. In particular, the sixth vertical connecting conductor 66 may be embodied as the fourth vertical connecting structure 741, the fifth horizontal connecting conductor 49 as the third conductor structure 744, and the ninth vertical connecting conductor 69 as the third vertical connecting structure 740.

The second forward conductor 141 shown in FIG. 16 is electroconductively connected at its second end to the neutral point 157 of the first three-phase system 150. In particular, at its second end in the fourth stator layer 107 the second forward conductor 141 is electroconductively connected to the fifth vertical connecting conductor 65 arranged on the second side 158 of the first three-phase system 150. The fifth vertical connecting conductor 65 is embodied as a through-connector.

In the second stator layer 105, the fifth vertical connecting conductor 65 is electroconductively connected to a sixth horizontal connecting conductor 50 arranged in the second stator layer 105 and at the second side 158 of the first three-phase system 150. In the second stator layer 105, the sixth horizontal connecting conductor 50 is electroconductively connected to a tenth vertical connecting conductor 70. The tenth vertical connecting conductor 70 is embodied as a neighboring layer connector and in the third direction 15 extends between the second stator layer 105 and the first stator layer 104. The sixth horizontal connecting conductor 50 is arranged on the neighboring stator layer of the first stator layer 104 embodied by the second stator layer 105.

In the first stator layer 104, the tenth vertical connecting conductor 70 is electroconductively connected to the second return conductor 144 at its second end. At its first end in the first stator layer 104, the further second return conductor 144 is electroconductively connected to the seventh vertical connecting conductor 67 arranged on the first side 152 of the first three-phase system 150. The seventh vertical connecting conductor 67 is embodied as a through-connector. The seventh vertical connecting conductor 67 is electroconductively connected to the neutral point 157 in the third stator layer 106. Thus, the second forward conductor 141 is electroconductively connected at its second end to the neutral point 157 via the fifth vertical connecting conductor 65, the sixth horizontal connecting conductor 50, the tenth vertical connecting conductor 70, the further second return conductor 144 and the seventh vertical connecting conductor 67. In particular, the second forward conductor 141 is electroconductively connected to the neutral point 157 via the fifth vertical connecting conductor 65. In addition, the further second return conductor 144 is electroconductively connected to the fifth vertical connecting conductor 65 at the second side 158 of the three-phase system 150, namely by the tenth vertical connecting conductor 70 and the sixth horizontal connecting conductor 50, which are both arranged at the second side 158 of the first three-phase system 150.

The third return conductor 147 shown in FIG. 16 is at its first end electroconductively connected to the neutral point 157. In particular, the third return conductor 147 in the fourth stator layer 107 is electroconductively connected to an eleventh vertical connecting conductor 74 arranged on the first side 152 of the first three-phase system 150. The eleventh vertical connecting conductor 74 is embodied as a neighboring layer connector extending in the third direction 15 between the fourth and third stator layers 107, 106. In the third stator layer 106, the eleventh vertical connecting conductor 74 is electroconductively connected to the horizontal connecting conductor of the neutral point 157, so that the third return conductor 147 is electroconductively connected to the neutral point 157 via the eleventh vertical connecting conductor 74.

At its first end, the third conductor 146 shown in FIG. 16 is electroconductively connected to the third connection structure 93 for feeding the third phase W. In particular, the third forward conductor 146 in the fourth stator layer 107 is at its first end electroconductively connected to a twelfth vertical connecting conductor 75 arranged on the first side 152 of the first three-phase system 150. The twelfth vertical connecting conductor 75 is embodied as a through-connector.

In the second stator layer 105, the twelfth vertical connecting conductor 75 is electroconductively connected to a seventh horizontal connecting conductor 51 arranged in the second stator layer 105 and on the first side 152 of the first three-phase system 150. The seventh horizontal connecting conductor 51 is embodied as a longitudinal connector and is electroconductively connected in the second stator layer 105 to a thirteenth vertical connecting conductor 76 arranged on the first side of the first three-phase system 150. The thirteenth vertical connecting conductor 76 is embodied as a neighboring layer connector extending between the second and first stator layers 105, 104 in the third direction 15.

In the first stator layer 104, the thirteenth vertical connecting conductor 76 is electroconductively connected to the further third return conductor 149 at its first end. Thereby, the third forward conductor 146 is on the first side 152 of the first three-phase system 150 electroconductively connected to the further third return conductor 149 at its first end via the twelfth vertical connecting conductor 75, the seventh horizontal connecting conductor 51 and the thirteenth vertical connecting conductor 76. Furthermore, the third forward conductor 146 is electroconductively connected to the third connection structure 93 via the further third return conductor 149 and the further third forward conductor 148.

At the first side 152 of the first three-phase system 150, the thirteenth vertical connecting conductor 76 formed between the first and second stator layers 104, 105 as an neighboring layer connector, and the eleventh vertical connecting conductor 74 formed between the third and fourth stator layers 106, 107 as a neighboring layer connector, are arranged on top of one another in the third direction 15. At the second side 158 of the first three-phase system 150, the tenth vertical connecting conductor 70 formed between the first and second stator layers 104, 105 as a neighboring layer connector, and the sixth vertical connecting conductor 66 formed between the third and fourth stator layers 106, 107 as a neighboring layer connector are arranged on top of one another in the third direction 15. Likewise, the sixth horizontal connecting conductor 50, which is arranged in the second stator layer 105, and the fifth horizontal connecting conductor 49, which is arranged in the third stator layer 106, are arranged on top of one another in the third direction 15.

Figure 17:
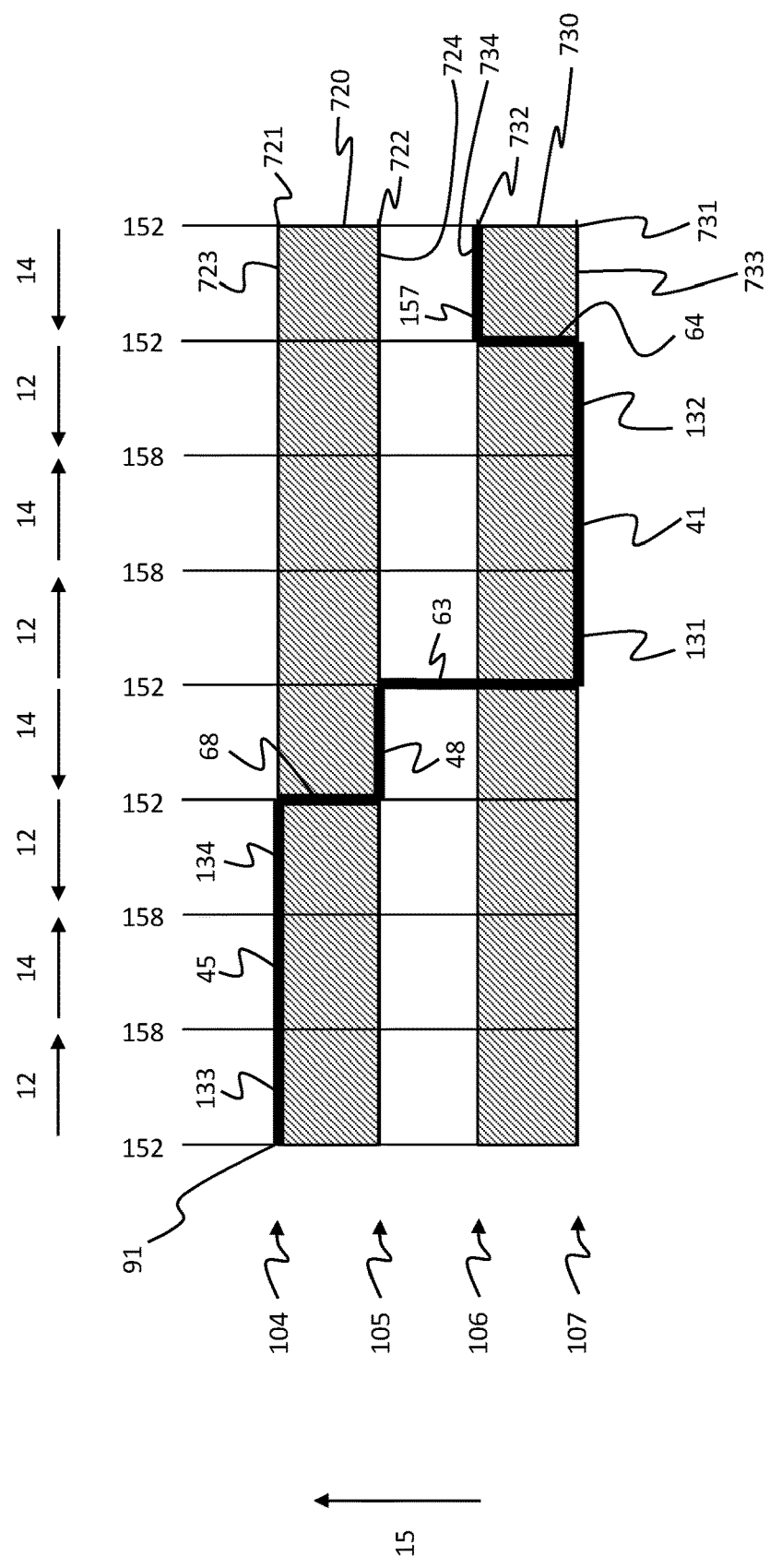
FIG. 17 show an interconnection of the conductor structures for conducting the first phase of the drive current on the stator assembly.

FIG. 17 shows a very simplified, schematic diagram of the wiring of the conductor structures for conducting the first phase U of the drive current on the stator assembly 100 comprising the first and second carrier plate 720, 730. FIG. 17 shows the third direction 15 in vertical direction. In the horizontal direction, the course of the conductor structures for conducting the first phase U from the first contact structure 91 to the neutral point 157 is shown from left to right. All conductor structures within the individual stator layers 104, 105, 106, 107 are in this context shown oriented in such a way that the positive current flow direction of the first phase U is oriented from left to right. In this respect, FIG. 17 shows a development of the conductor structures along the positive current flow direction of the first phase U. Vertical markings indicate the first and second sides 152, 158 of the first three-phase system 150. Horizontal arrows indicate the orientation of the first and second direction 12, 14 along the displayed development.

The further first forward conductor 133 is connected to the first connection structure 91 for feeding in the first phase U of the drive current at the first side 152 of the first three-phase system 150 in the first longitudinal stator layer 721 formed by the first stator layer 104. At the second side 158 of the first three-phase system 150, the further first forward conductor 133 in the first longitudinal stator layer 721 is connected to the further first return conductor 134 via the further first horizontal connector 45. At the first side 152 of the three-phase system 150, the further first return conductor 134 is electroconductively connected to the first forward conductor 131 arranged in the second longitudinal stator layer 731 formed by the fourth stator layer 107 via the eighth vertical connecting conductor 68, the fourth horizontal connecting conductor 48 formed on the second stator layer 105 and the third vertical connecting conductor 63.

At the second side 158 of the three-phase system 150, the first forward conductor 131 in the second longitudinal stator layer 731 is connected to the first return conductor 132 via the first horizontal connector 41. At the first side 152 of the three-phase system 150, the first return conductor 132 is electroconductively connected via the fourth vertical connecting conductor 64 to the neutral point 157 arranged in the second inclined stator layer 732 formed by the third stator layer 106.

Figure 18:
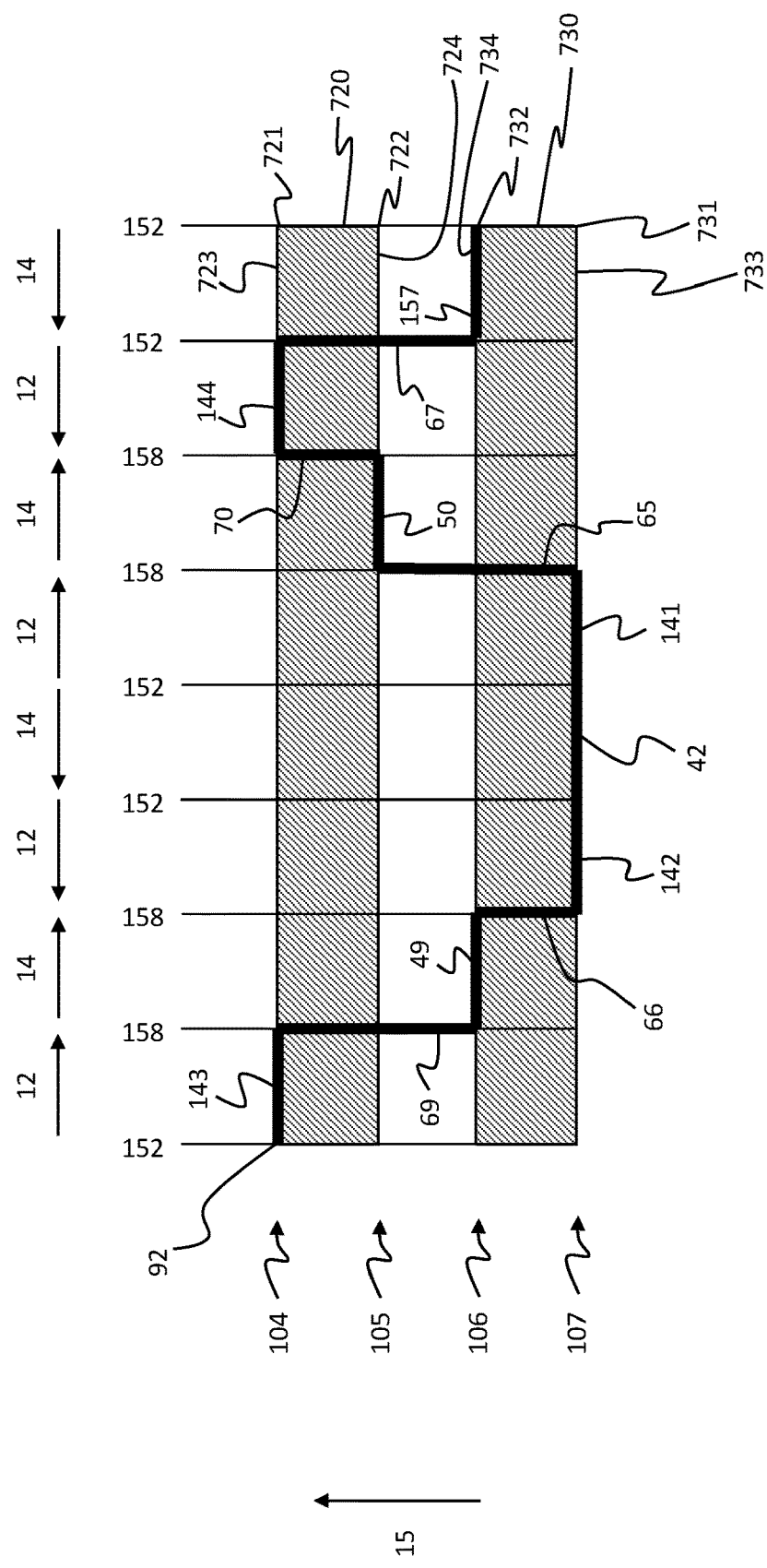
FIG. 18 show an interconnection of the conductor structures for conducting the second phase of the drive current on the stator assembly.

FIG. 18 shows a very simplified schematic diagram of the wiring of the conductor structures for conducting the second phase V of the drive current on the stator assembly 100 comprising the first and second carrier plate 720, 730. FIG. 18 shows the third direction 15 in vertical direction. In the horizontal direction, the course of the conductor structures for conducting the second phase V from the second contact structure 92 to the neutral point 157 is shown from left to right. All conductor structures within the individual stator layers 104, 105, 106, 107 are in this context shown oriented so that the positive current flow direction of the second phase V is from left to right. In this respect, FIG. 18 shows a development of the conductor structures along the positive current flow direction of the second phase V. Vertical markings indicate the first and second sides 152, 158 of the first three-phase system 150. Horizontal arrows indicate the orientation of the first and second direction 12, 14 along the displayed development.

The further second forward conductor 143 is connected to the second connection structure 92 for feeding in the second phase V of the drive current at the first side 152 of the first three-phase system 150 in the first longitudinal stator layer 721 formed by the first stator layer 104. At the second side 158 of the first three-phase system 150, the further second forward conductor 143 is connected via the ninth vertical connecting conductor 69, the fifth horizontal connecting conductor 49 formed on the third stator layer 106 and the sixth vertical connecting conductor 66 to the second return conductor 142 arranged in the second longitudinal stator layer 731 formed by the third stator layer 106.

At the first side 152 of the three-phase system 150, the second return conductor 142 in the second longitudinal stator layer 731 is connected to the second forward conductor 141 via the second horizontal connecting conductor 42. At the second side 158 of the first three-phase system 150, the second forward conductor 141 is connected to the further second return conductor 144 arranged in the first longitudinal stator layer 721 via the fifth vertical connecting conductor 65, the sixth horizontal connecting conductor 50 formed on the second stator layer 105 and the tenth vertical connecting conductor 70. At the first side 152 of the first three-phase system 150, the further second return conductor 144 is connected to the neutral point 157 arranged in the second inclined stator layer 732 formed by the third stator layer 106 via the seventh vertical connecting conductor 67.

Figure 19:
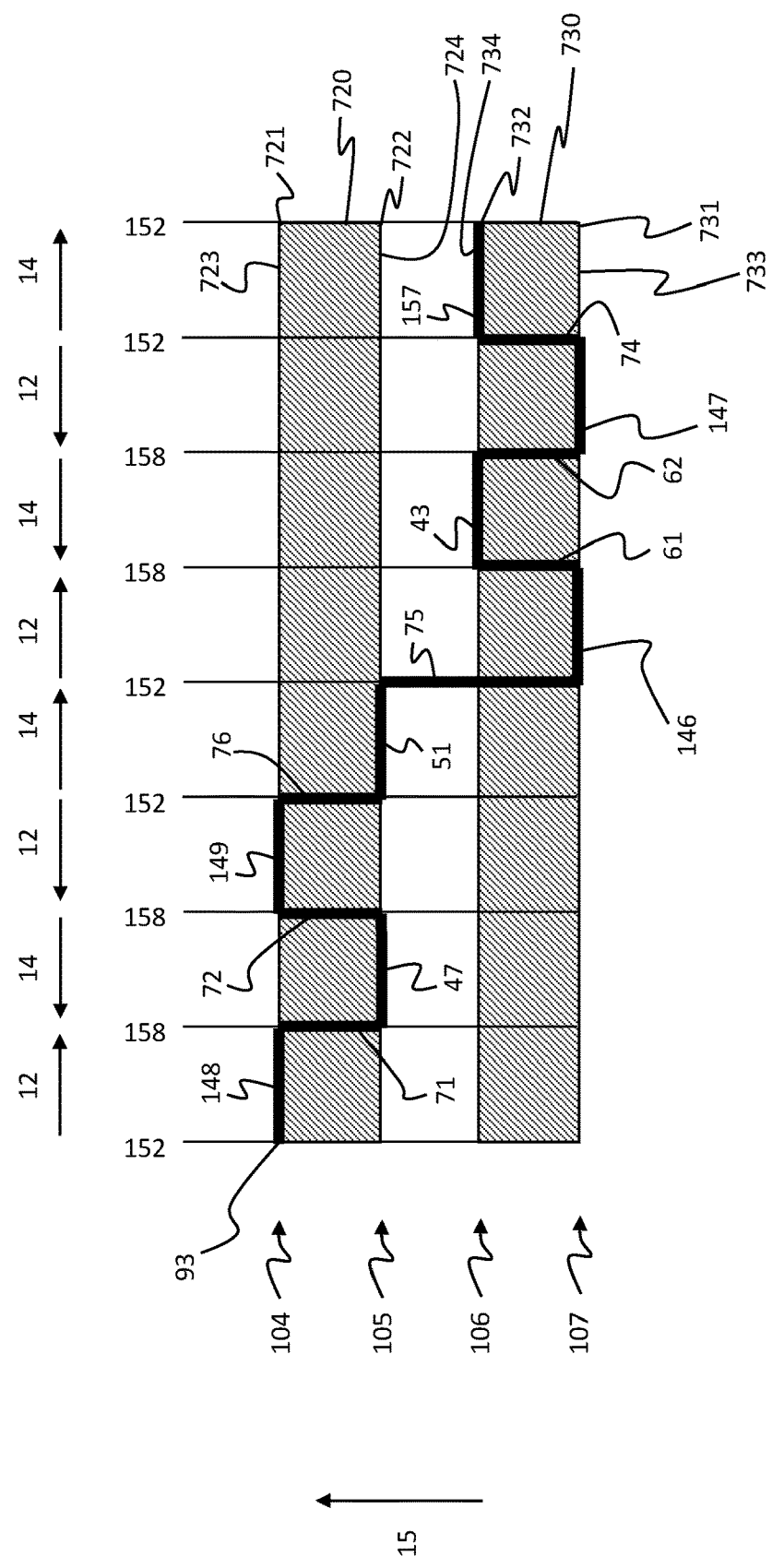
FIG. 19 show an interconnection of the conductor structures for conducting the third phase of the drive current on the stator assembly.

FIG. 19 shows a very simplified, schematic diagram of the wiring of the conductor structures for conducting the third phase W of the drive current on the stator assembly 100 comprising the first and second carrier plate 720, 730. FIG. 19 shows the third direction 15 in vertical direction. In the horizontal direction, the course of the conductor structures for conducting the third phase W from the third contact structure 93 to the neutral point 157 is shown from left to right. All conductor structures within the individual stator layers 104, 105, 106, 107 are shown oriented so that the positive current flow direction of the third phase W is oriented from left to right. In this respect, FIG. 19 shows a development of the conductor structures along the positive current flow direction of the third phase W. Vertical markings each indicate the first and second sides 152, 158 of the first three-phase system 150. Horizontal arrows indicate the orientation of the first and second direction 12, 14 along the displayed development.

The further third forward conductor 148 is connected to the third connection structure 93 for feeding in the third phase W of the drive current at the first side 152 of the first three-phase system 150 in the first longitudinal stator layer 721 formed by the first stator layer 104. At the second side 158 of the first three-phase system 150, the further third forward conductor 148 is connected to the further third return conductor 149 via the further first vertical connecting conductor 71, the further third horizontal connecting conductor 47 formed on the second stator layer 105 and the further second vertical connecting conductor 72. The further third return conductor 149 is connected to the third forward conductor 146 arranged in the second longitudinal stator layer 731 formed by the fourth stator layer 107 at the first side 152 of the first three-phase system 150 via the thirteenth vertical connecting conductor 76, the seventh horizontal connecting conductor 51 formed on the second stator layer 105, and the twelfth vertical connecting conductor 75.

At the second side 158 of the first three-phase system 150, the third forward conductor 146 is connected to the third return conductor 147 via the first vertical connecting conductor 61, the third horizontal connecting conductor 43 formed on the third stator layer 106, and the second vertical connecting conductor 62. The third return conductor 147 is connected to the neutral point 157 located in the second inclined stator layer 732 formed by the third stator layer 106 at the first side 152 of the first three-phase system 150 via the eleventh vertical connecting conductor 74.

In total, the first forward conductors 131, 133 are thus each connected to the first connection structure 91 at their first end located at the first side 152 of the first three-phase system 150. The first forward conductors 131, 133 are each connected at their second end located at the second side 158 of the first three-phase system 150 in their respective stator layer 104, 107 to the second end of the first return conductor 132, 134. The first return conductors 132, 134 are each connected to the neutral point 157 at their first end located at the first side 152 of the first three-phase system 150.

In total, the third forward conductors 146, 148 are thus each connected to the third connection structure 93 at their first end located at the first side 152 of the first three-phase system 150. The third forward conductors 146, 148 are each connected at their second end located at the second side 158 of the first three-phase system 150 to the third return conductors 147, 149 at their second ends via the first vertical connecting conductors 61, 71, which are embodied as neighboring layer connectors, the third horizontal connecting conductors 43, 47 arranged in the neighboring stator layer of the respective third forward conductor 146, 148, and the second vertical connecting conductors 62, 72 embodied as neighboring layer connectors. The third return conductors 147, 149 are each connected to the neutral point 157 at their first end located at the first side 152 of the first three-phase system 150.

In the fourth stator layer 107, the second return conductor 142 is connected at its second end located at the second side 158 of the first three-phase system 150 to a vertical connecting structure formed by the sixth vertical connecting conductor 66 and as a neighboring layer connector. At its first end located at the first side 152 of the first three-phase system 150, the second return conductor 142 in the fourth stator layer 107 is connected to the first end of the second forward conductor 141 via a horizontal connecting structure located in the fourth stator layer 107, formed by the second horizontal connecting conductor 42 and embodied as a cross-connector. At its second end in the fourth stator layer 107, the second forward conductor 141 is connected to a vertical connecting structure formed by the fifth vertical connecting conductor 65 and embodied as a through-connector.

The first coil conductors 125 of the first three-phase systems 150 of the remaining first stator segments 120 are connected in the same way as described for the first coil conductors 125 of the outer first stator segment 120 of the first stator sector 110. This applies to the further first stator segments 120 of the first stator sector 110 as well as to the further first stator segments 120 of the second, third and fourth stator sectors 112, 113, 114, wherein the first sides 152 of the first three-phase systems 150 are respectively arranged in the center of the stator assembly 100 and at the contact arrangement 420, and the second sides 158 of the first three-phase systems 150 are in the first direction 12 respectively arranged opposite to the first sides 152 at the outer edge of the stator assembly 100.

The second coil conductors 126 of the second three-phase systems 151 of the first stator sector 110 are each connected in the same way as described for the first coil conductors 125 of the first stator segment 120 of the first stator sector 110. The second three-phase systems 151 each have one side 154 of the second three-phase systems 151 in the second direction 14 opposite to the first side 159. The first sides 153 of the second three-phase systems 151 are arranged in the second direction 14 each in the center of the stator assembly 100 and at the contact arrangement 420. The second sides 159 of the second three-phase systems 151 are in the second direction 14 arranged opposite to the first sides 153 at the outer edge of the stator assembly 100.

The second stator layer 105 comprises the further first, further second and further third forward conductors 133, 143, 148, as well as the further first, further second and further third return conductors 134, 144, 149 of the second three-phase systems 151. The second stator layer 105 forms the connecting stator layer of the second three-phase systems 151 in which the further forward conductors 133, 143, 148 arranged in the second stator layer 105 are electroconductively connected to the connecting structures of contact arrangement 420. The first stator layer 104 forms the neighboring stator layer of the second stator layer 105, on which the horizontal connecting conductors connected to the second coil conductors 126 of the second stator layer 105 via neighboring layer connectors, are arranged. The third stator layer 106 comprises the first, second, and third forward conductors 131, 141, 146, as well as the first, second, and third return conductors 132, 142, 147 of the second three-phase systems 151. The fourth stator layer 107 forms the neighboring stator layer of the third stator layer 106 on which the horizontal connecting conductors connected to the second coil conductors 126 of the third stator layer 106 via neighbor layer connectors are arranged. In particular, the neutral points 157 of the second three-phase systems 151 are arranged in the fourth stator layer 107.

The arrangement of the conductor structures of the second three-phase systems 151 on the carrier plates 720, 730 of the stator assembly 100 corresponds to the arrangement shown in FIGS. 17 to 19, wherein the arrangement of the conductor structures of the individual carrier plates 720, 730 is mirrored in the third direction 15 on the central plane of the individual carrier plates 720, 730. For example, in the second three-phase systems 151, in contrast to the arrangement shown in FIG. 18, the further second forward conductor 143 is arranged in the first inclined stator layer 722 on the second side 724 of the first carrier plate 720, the fifth horizontal connecting conductor 49 is arranged in the second longitudinal stator layer 731 on the first side 733 of the second carrier plate 730, and the second return conductor 142 is arranged in the second inclined stator layer 732 on the second side 734 of the second carrier plate 730.

In the stator assembly 100, the connection stator layer of the second three-phase systems 151 is formed by the uppermost inclined stator layer 711 of the stator assembly 100 in the third direction 15. The stator layer with the first, second, and third forward conductors 131, 141, 146, as well as with the first, second, and third return conductors 132, 142, 147 of the second three-phase systems 151 is formed by the lowermost stator inclination 711 of the stator assembly 100 in the third direction 15. The neighboring stator layer with the neutral points 157 of the second three-phase systems 151 is formed by the lowermost longitudinal stator layer 711 of the stator assembly 100 in the third direction 15.

Alternative embodiments of the stator assembly 100 may include further stator layers in addition to the four stator layers 104, 105, 106, 107.

Figure 20:
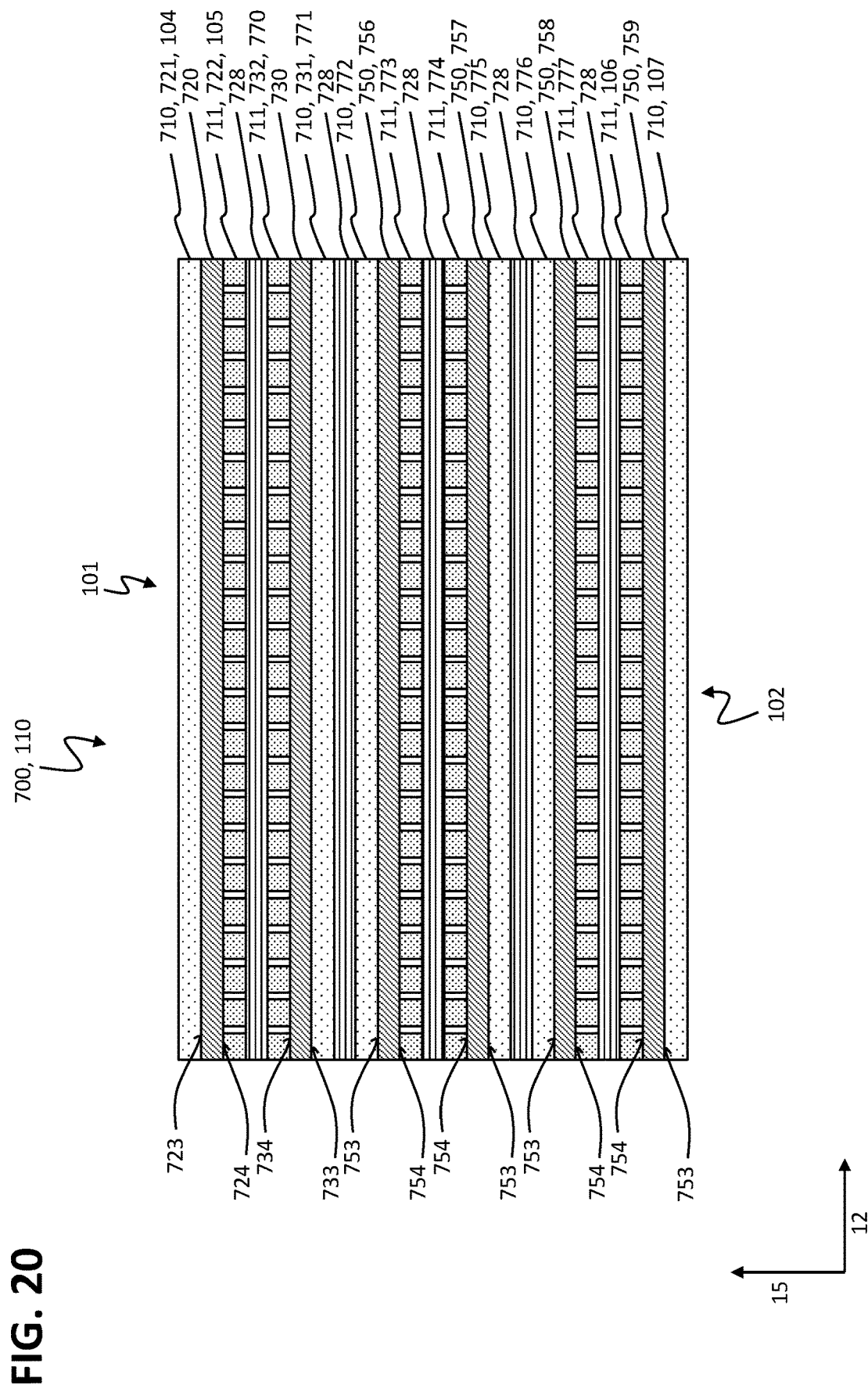
FIG. 20 show a further stator assembly of the stator module in a sectional view.

FIG. 20 shows a schematic, not to scale depiction of a further stator assembly 700 of stator module 10 in a sectional view, in which the sectional plane is oriented perpendicularly with regard to the second direction 14. Unless differences are described, the further stator assembly 700 is embodied as described for the stator assembly 100. In the further stator assembly 700, particularly the first direction 12 is oriented perpendicularly with regard to the second direction 14.

The further stator assembly 700 is described in detail in the German patent application DE 10 2018 117 981.2 in connection with FIGS. 9 to 11. This description is made the subject matter of the present application by reference.

The further stator assembly 700 has a first arrangement of a total of six longitudinal stator layers 710 and a second arrangement of a total of six inclined stator layers 711. In the third direction 15, the further stator assembly 700 comprises a sequence of two inclined stator layers 711, two longitudinal stator layers 710, two inclined stator layers 711, two longitudinal stator layers 710, two inclined stator layers 711 and one longitudinal stator layer 710 below an uppermost longitudinal stator layer 710.

As stator assembly 100, the further stator assembly 700 may also comprise two-layer carrier plates arranged on top of one another in the third direction 15, with a longitudinal stator layer 710 being arranged on the first side and an inclined stator layer 711 being arranged on the second side.

As stator assembly 100, the further stator assembly 700 also comprises a first carrier plate 720 and a second carrier plate 730. The first carrier plate 720 of the further stator assembly 700 is embodied as described for the first carrier plate 720 of stator assembly 100. The second carrier plate 730 of the further stator assembly 700 is embodied as described for the second carrier plate 730 of the stator assembly 100. In particular, on a first side 723 of the first carrier plate 720, a longitudinal stator layer 710 referred to as first longitudinal stator layer 721 is arranged, and on a second side 724 of the first carrier plate 720 opposite to the first side 723 in the third direction 15, an inclined stator layer 711 referred to as first inclined stator layer 722 is arranged, on a first side 733 of the second carrier plate 730, a longitudinal stator layer 710 referred to as second longitudinal stator layer 731 is arranged and on a second side 734 of the second carrier plate 720 opposite to the first side 733 in the third direction 15, an inclined stator layer 711 referred to as second tilted stator layer 732 is arranged.

The first side 723 of the first carrier plate 720 is in the third direction 15 arranged above the second side 724 of the first carrier plate 720. The first side 733 of the second carrier plate 730 is in the third direction 15 arranged below the second side 734 of the second carrier plate 730. The first carrier plate 720 and the second carrier plate 730 are arranged side by side in the third direction 15, with the first carrier plate 720 being arranged above the second carrier plate 730. The second side 724 of the first carrier plate 720 is arranged facing the second side 734 of the second carrier plate 730.

The further stator assembly 700 comprises four further carrier plates 750 in addition to the first and second carrier plates 720, 730. Unless differences are described, the further carrier plates 750 are embodied and arranged as described for the first and second carrier plates 720, 730. In particular, the further carrier plates 750 each have a first side 753 with a longitudinal stator layer 710 and a second side 754 with an inclined stator layer 711. The carrier plates 720, 730, 750 of the first further stator assembly 700 are arranged on top of one another in the third direction 15 and aligned in parallel to each other. In the third direction 15, facing sides of adjacent carrier plates 720, 730, 750 are alternately embodied as facing first sides 723, 733, 753 or as facing second sides 724, 734, 754.

In the further stator assembly 700, the first carrier plate 720 is arranged as the uppermost carrier plate in the third direction 15 above all other carrier plates 730, 750. The first longitudinal stator layer 721 forms the uppermost stator layer and the first inclined stator layer 722 forms the second uppermost stator layer of the further stator assembly 700. The first side 723 of the first carrier plate 720 forms a top side 101 of the further stator assembly 700.

In the third direction 15 below the first carrier plate 720, the second carrier plate 730, a first further carrier plate 756, a second further carrier plate 757, a third further carrier plate 758 and a fourth further carrier plate 759 are arranged in sequence. The first side 733 of the second carrier plate 730 is arranged facing the first side 753 of the first further carrier plate 756, the second side 754 of the first further carrier plate 756 is arranged facing the second side 754 of the second further carrier plate 757, the first side 753 of the second further carrier plate 757 is arranged facing the first side 753 of the third further carrier plate 758 and the second side 754 of the third further carrier plate 758 is arranged facing the second side 754 of the fourth further carrier plate 759. The first side 753 of the fourth further carrier plate 759 forms the bottom side 102 of the further stator assembly 700.

Between each of the carrier plates 720, 730, 750 there is an insulating layer 728, which is embodied like the insulating layer 728 of the stator assembly 100.

The further stator assembly 700 comprises a total of a multi-layer stator layer arrangement with an even number of stator layers. The further stator assembly 700 in particular comprises a twelve-layer stator layer arrangement. The further stator assembly 700 comprises a plurality of two-layer carrier plates 720, 730, 750 arranged on top of one another in the third direction 15, and in particular six two-layer carrier plates 720, 730, 750 arranged on top of one another in the third direction 15.

In the further stator assembly 700, inside the stator assembly 700, i.e. apart from the uppermost stator layer and the lowermost stator layer, an inclined stator layer 711 is arranged in the third direction 15 next to each longitudinal stator layer 710 and a longitudinal stator layer 710 next to each inclined stator layer 711. Each longitudinal stator layer 710 is thereby arranged on the first side 723, 733, 753 and each adjacent inclined stator layer 711 on the second side 724, 734, 754 of the two-layer carrier plates 720, 730, 750. In particular, the further stator assembly 700 in each case exclusively comprises two-layer carrier plates 720, 730, 750 on the first side 723, 733, 753 of which a longitudinal stator layer 710 is arranged and on the second side 724, 734, 754 of which an inclined stator layer 711 is arranged.

As stator assembly 100, the further stator assembly 700 has the first stator layer 104, the second stator layer 105, the third stator layer 106 and the fourth stator layer 107. In the third direction 15, the first stator layer 104 is arranged on the top side 101 of the further stator assembly 700. As in the stator assembly 100, the second stator layer 105 of the further stator assembly 700 is in the third direction 15 arranged adjacent to and below the first stator layer 104 and forms the neighboring stator layer of the first stator layer 104. The fourth stator layer 107 is in the third direction 15 arranged on the bottom side 102 of the further stator assembly 700, as with the stator assembly 100. In the third direction 15, the third stator layer 106 is arranged adjacent to and above the fourth stator layer 107 and forms the neighboring stator layer of the fourth stator layer 107.

In the third direction 15 between the second stator layer 105 and the third stator layer 106, the further stator assembly 700 in turn comprises a fifth stator layer 770 embodied as an inclined stator layer 711, a sixth stator layer 771 embodied as a longitudinal stator layer 710, and a seventh stator layer 772 embodied as a longitudinal stator layer 710, an eighth stator layer 773 formed as an inclined stator layer 711, a ninth stator layer 774 formed as an inclined stator layer 711, a tenth stator layer 775 formed as a longitudinal stator layer 710, an eleventh stator layer 776 formed as a longitudinal stator layer 710 and a twelfth stator layer 777 formed as an inclined stator layer 711.

The fifth stator layer 770 is arranged on the second side 734 of the second carrier plate 730 and the sixth stator layer 771 is arranged on the first side 731 of the second carrier plate 730. Thus, the fifth stator layer 770 and the sixth stator layer 771 form neighboring stator layers arranged on opposite sides of the second carrier plate 730. The seventh stator layer 772 is arranged on the first side 753 of the first further carrier plate 756 and the eighth stator layer 773 is arranged on the second side 754 of the first further carrier plate 756. Thus, the seventh stator layer 772 and the eighth stator layer 773 form neighboring stator layers arranged on opposite sides of the first additional carrier plate 756.

The ninth stator layer 774 is arranged on the second side 754 of the second further carrier plate 757 and the tenth stator layer 775 is arranged on the first side 753 of the second further carrier plate 757. Thus, the ninth stator layer 774 and the tenth stator layer 775 form neighboring stator layers arranged on opposite sides of the second further carrier plate 757. The eleventh stator layer 776 is arranged on the first side 735 of the third further carrier plate 758 and the twelfth stator layer 777 is arranged on the second side 754 of the third further carrier plate 758. Thus, the eleventh stator layer 776 and the twelfth stator layer 777 form neighboring stator layers on opposite sides of the third additional carrier plate 758.

The third stator layer 106 is located on the second side 754 of the fourth further carrier plate 759 and the fourth stator layer 107 is located on the first side 753 of the fourth further carrier plate 759. Thus, the third stator layer 106 and the fourth stator layer 107 form neighboring stator layers on opposite sides of the fourth further carrier plate 759.

Figure 21:
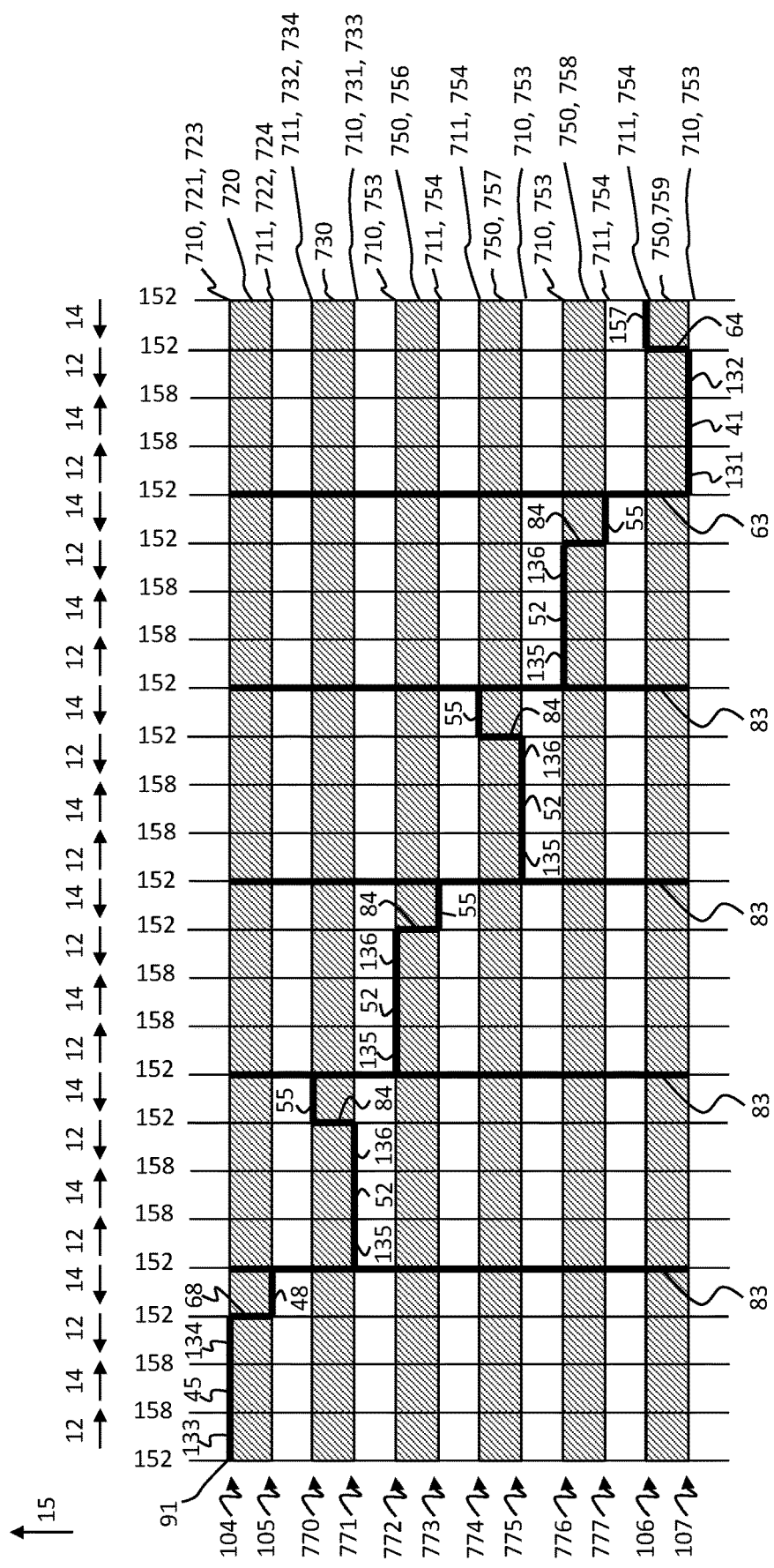
FIG. 21 show an interconnection of the conductor structures for conducting the first phase of the drive current on the further stator assembly.
Figure 22:
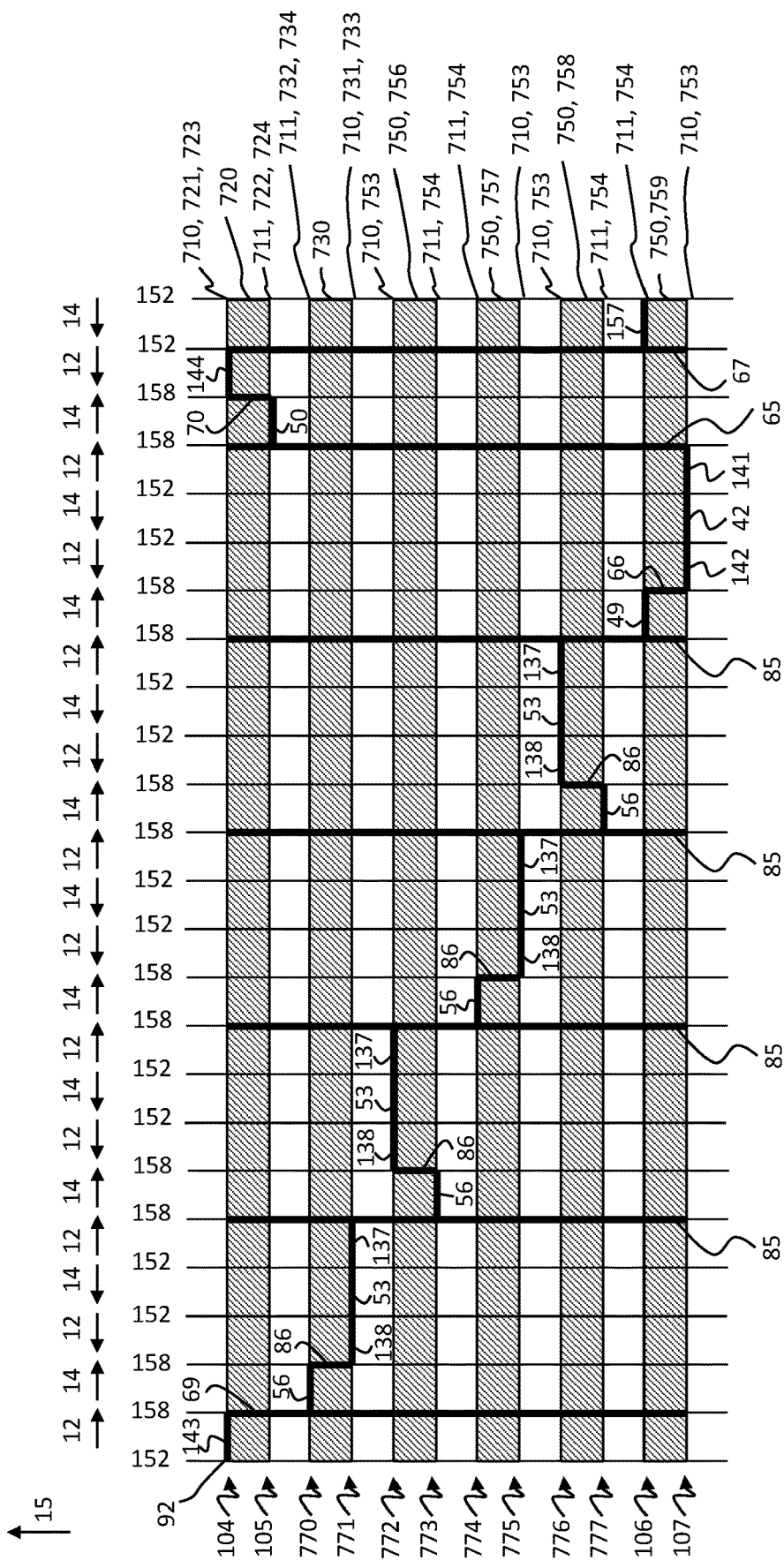
FIG. 22 show an interconnection of the conductor structures for conducting the second phase of the drive current on the further stator assembly.
Figure 23:
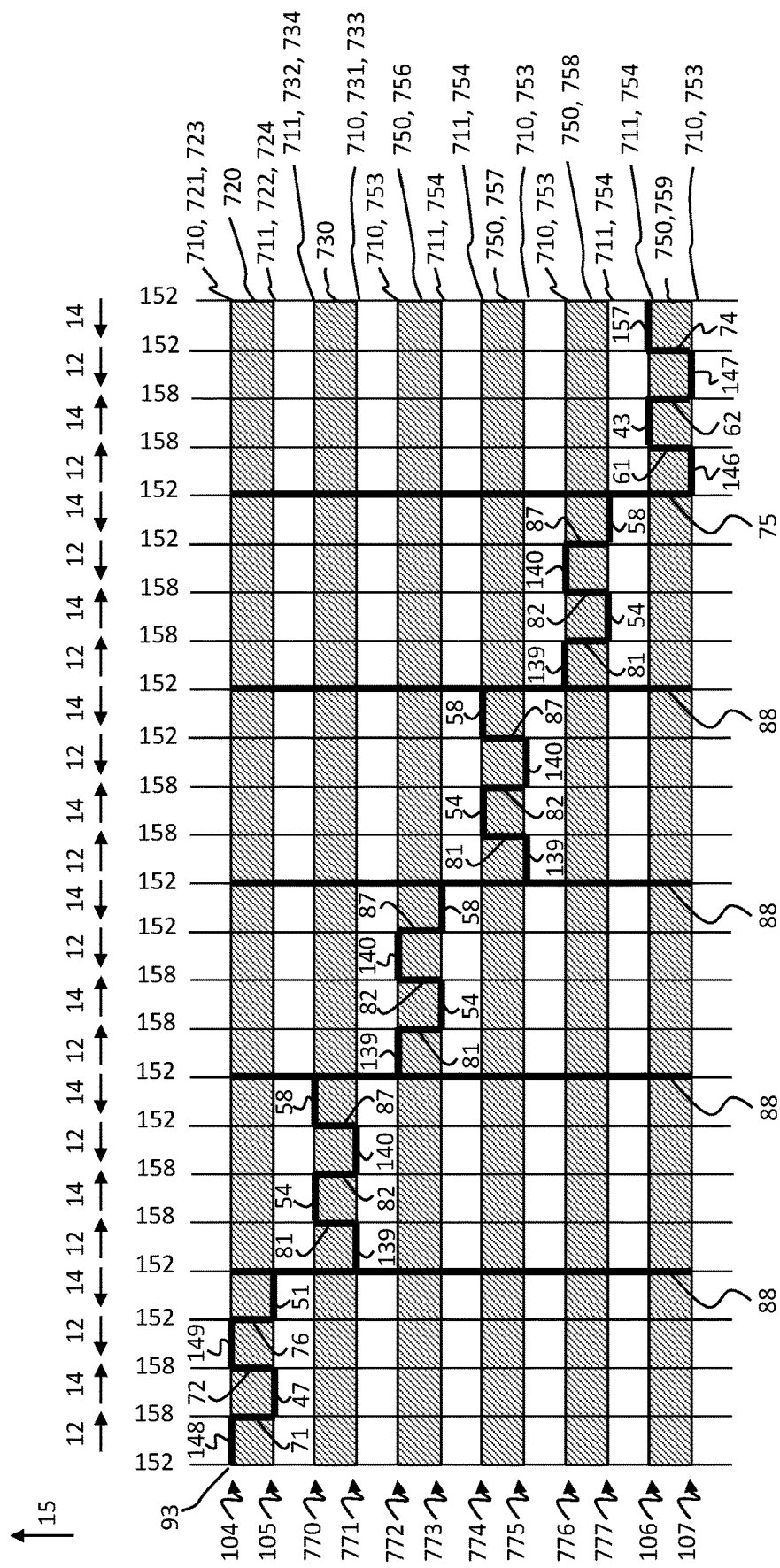
FIG. 23 show an interconnection of the conductor structures for conducting the third phase of the drive current on the further stator assembly.

FIG. 21 shows a very simplified schematic diagram of the wiring of the conductor structures for conducting the first phase U of the drive current on the further stator assembly 700. FIG. 22 shows a schematic depiction of the wiring of the conductor structures for conducting the second phase V of the drive current on the further stator assembly 700. FIG. 23 shows a schematic depiction of the wiring of the conductor structures for conducting the third phase W of the drive current on the further stator assembly 700. The depiction in FIG. 21 shows an implementation of the conductor structures for conducting the first phase U of the drive current that corresponds to the development shown in FIG. 17. The depiction in FIG. 22 shows an implementation of the conductor structures for conducting the second phase V of the drive current, which corresponds to the implementation shown in FIG. 18. The depiction in FIG. 23 shows an implementation of the conductor structures for conducting the third phase W of the drive current corresponding to the implementation shown in FIG. 19.

Unless differences are described, the first stator layer 104 of the further stator assembly 700 is embodied as described for the first stator layer 104 of the stator assembly 100. In particular, the first stator layer 104 of the further stator assembly 700 comprises the further first, the further second and the further third forward conductor 133, 143, 148, the further first, the further second and the further third return conductor 134, 144, 149 as well as the further first horizontal connecting conductor 45.

Unless differences are described, the second stator layer 105 of the further stator assembly 700 is embodied as described for the second stator layer 105 of the stator assembly 100. In particular, the second stator layer 105 of the further stator assembly 700 includes the third horizontal connecting conductor 47, the fourth horizontal connecting conductor 48, the sixth horizontal connecting conductor 50, and the seventh horizontal connecting conductor 51.

Unless differences are described, the third stator layer 106 of the further stator assembly 700 is embodied as described for the third stator layer 106 of the stator assembly 100. In particular, the third stator layer 106 of the further stator assembly 700 includes the third horizontal connecting conductor 43, the fifth horizontal connecting conductor 49, and the neutral point 157 of the first three-phase systems 150.

Unless differences are described, the fourth stator layer 107 of the further stator assembly 700 is embodied as described for the fourth stator layer 107 of the stator assembly 100. In particular, the fourth stator layer 107 of the further stator assembly 700 comprises the first, second and third forward conductor 131, 141, 146, the first, second and third return conductor 132, 142, 147, as well as the first and second horizontal connecting conductor 41, 42.

As shown in FIG. 21, the further first forward conductor 133 is electroconductively connected at its first end in the first stator layer 104 to the first connection structure 91 arranged on the first side 152 of the first three-phase system 150 for feeding in the first phase U. In the first stator layer 104, the first forward conductor 133 is connected at its second end to the further first return conductor 134 at its second end via the further first horizontal connecting conductor 45 arranged on the second side 158 of the first three-phase system 150. In the first stator layer 104, the further second return conductor 134 is electroconductively connected at its first end to the eighth vertical connecting conductor 68 arranged on the first side 152 of the first three-phase system 150. In the second stator layer 105, the eighth vertical connecting conductor 68 is electroconductively connected to the fourth horizontal connecting conductor 48 arranged on the first side 152 of the first three-phase system 150.

In the sixth stator layer 771, the seventh stator layer 772, the tenth stator layer 775 and the eleventh stator layer 776, the further stator assembly 700 each comprises an additional first forward conductor 135, an additional first forward conductor 136 and an additional first horizontal connecting conductor 52 for conducting the first phase U. The additional first forward conductors 135 are embodied as described for the first forward conductor 131 of the fourth stator layer 107, the additional first return conductors 135 are embodied as described for the first return conductor 132 of the fourth stator layer 107, and the additional first horizontal connecting conductors 52 are embodied as described for the first horizontal connecting conductor 41 of the fourth stator layer 107.

At their second end and in their respective stator layers 771, 772, 775, 776, the additional first forward conductors 135 are each electroconductively connected to the additional first return conductor 136 via one of the additional first horizontal connecting conductors 52 arranged on the second side 158 of the first three-phase system 150.

The additional first return conductors 136 are each electroconductively connected at their first end and in their respective stator layers 771, 772, 775, 776 to an additional fourth vertical connecting conductor 84 arranged at the first side 152 of the first three-phase system 150 and embodied as an neighboring layer connector. Unless differences are described, the additional fourth vertical connecting conductors 84 are embodied as described for the fourth vertical connecting conductor 64.

The additional fourth vertical connecting conductors 84 are each electroconductively connected to an additional fourth horizontal connecting conductor 55 in the neighboring stator layer of the respective stator layer 771, 772, 775, 776. Unless differences are described, the additional fourth horizontal connecting conductors 55 are embodied as described for the fourth horizontal connecting conductor 48.

The additional fourth horizontal connecting conductor 55 arranged in the fifth stator layer 770 is electroconductively connected to the first end of the additional first return conductor 136 of the sixth stator layer 771 via the additional fourth vertical connecting conductor 84 which is formed between the fifth and sixth stator layers 770, 771 as a through-connector through the second carrier plate 730. The additional fourth horizontal connecting conductor 55 arranged in the eighth stator layer 773 is electroconductively connected to the first end of the additional first return conductor 136 of the seventh stator layer 772 via the additional fourth vertical connecting conductor 84 which is formed as a through-connector through the first further carrier plate 756.

The additional fourth horizontal connecting conductor 55 arranged in the ninth stator layer 774 is electroconductively connected to the first end of the additional first return conductor 136 of the tenth stator layer 775 via the additional fourth vertical connecting conductor 84 formed between the ninth and the tenth stator layers 774, 775 as a through-connector through the second further carrier plate 757. The additional fourth horizontal connecting conductor 55 arranged in the twelfth stator layer 777 is electroconductively connected to the first end of the additional first return conductor 136 of the eleventh stator layer 776, 777 via the additional fourth vertical connecting conductor 84, which is a through-connector through the third further carrier plate 758.

The horizontal connecting conductor of the neutral point 157 of the first three-phase system 150 arranged in the third stator layer 106 is electroconductively connected to the first end of the first return conductor 132 of the fourth stator layer 104 via the fourth vertical connecting conductor 64, which is formed between the third and fourth stator layers 106, 107 as a through-connector through the fourth further carrier plate 758.

The further stator assembly 700 comprises four additional third vertical connecting conductors 83. The additional third vertical connecting conductors 83 are embodied as through-connectors and are arranged on the first side 152 of the first three-phase system 150. Unless differences are described, the additional third vertical connecting conductors 83 are embodied as described for the third vertical connecting conductor 63.

The additional first forward conductors 135 are each electroconductively connected at their first end and in their stator layers 771, 772, 775, 776 to one of the additional third vertical connecting conductors 83. Via the additional third vertical connecting conductor 83, the additional first forward conductors 135 are electroconductively connected at their first end to the first connection structure 91. In particular, the additional first forward conductors 135 of a stator layer 771, 772, 775, 776, 107 are connected at their first ends via the additional third vertical connecting conductors 83 to the additional first forward conductor 133, the additional first forward conductors 135, the additional first return conductor 134 and the additional first return conductors 136 of the next longitudinal stator layers 710 arranged above the respective stator layer 771, 772, 775, 776, 107. In particular, the additional first forward conductors 135 of a respective stator layer 771, 772, 775, 776, 107 are connected via the additional third vertical connecting conductors 83 to all forward conductors and all return conductors of the first phase U, respectively, which are arranged in the longitudinal stator layers 710 arranged above the respective stator layer 771, 772, 775, 776, 107.

One of the additional third vertical connecting conductors 83 is in the eleventh stator layer 776 connected to the additional first vertical connecting conductor 135 and in the ninth stator layer 774 to the additional fourth horizontal connecting conductor 55. One of the additional third vertical connecting conductors 83 is in the tenth stator layer 775 connected to the additional first vertical conductor 135 and in the eighth stator layer 773 to the additional fourth horizontal connecting conductor 55. One of the additional third vertical connecting conductors 83 is in the seventh stator layer 772 connected to the additional first vertical conductor 135 and in the fifth stator layer 770 to the additional fourth horizontal connecting conductor 55.

One of the additional third vertical connecting conductors 83 is in the sixth stator layer 771 connected to the additional first vertical connecting conductor 135 and in the second stator layer 105 to the fourth horizontal connecting conductor 48. In the other stator assembly 700, the first forward conductor 131 is in the fourth stator layer 107 electroconductively connected to the third vertical connecting conductor 63 and the third vertical connecting conductor 63 is in the twelfth stator layer 777 electroconductively connected to the additional fourth horizontal connecting conductor 55.

As in the stator assembly 100, in the further stator assembly 700 the fourth horizontal connecting conductor 48 of the second stator layer 105 is electroconductively connected to the third vertical connecting conductor 63 arranged on the first side 152 of the first three-phase system 150. In contrast to the stator assembly 100, in the further stator assembly 700 the fourth horizontal connecting conductor 48 of the second stator layer 105 is not directly connected and to the third vertical connecting conductor 63 in the second stator layer 105. Instead, the fourth horizontal connecting conductor 48 is electroconductively connected to the third vertical connecting conductor 63 via the additional third vertical connecting conductor 83, the additional first outward and return conductors 135, 136, the additional first horizontal connecting conductor 52, the additional fourth vertical connecting conductor 84 and the additional fourth horizontal connecting conductor 55.

In the stator assemblies 100, 700, in each longitudinal stator layer 710, the forward conductors 131, 133, 135 of the first phase U are connected in series in an electrically conductive manner via the horizontal connecting conductors 41, 45, 52 arranged in the respective longitudinal stator layer 710 and at the second side 158 of the first three-phase system 150 with the return conductors 132, 134, 135 of the first phase U at their second end. With the exception of the connection stator layer, the forward conductors 131, 133, 135 of the first phase U are electroconductively connected at their first end in each longitudinal stator layer 710 with a vertical connecting conductor 63, 83 arranged at the first side 152 of the first three-phase system 150 and embodied as a through-connector. Via the vertical connecting conductors 63, 83, the forward conductors 131, 133, 135 of the first phase U are electroconductively connected to a horizontal connecting conductor 48, 55 embodied as a longitudinal conductor of the next but one inclined stator layer 711 in the third direction 15. The vertical connecting conductors 63, 83 connect the forward conductors 131, 133, 135 of the first phase U with the first connection structure 91 for feeding in the first phase U.

In the stator assemblies 100, 700, the return conductors 131, 133, 135 of the first phase U are electroconductively connected at their first end in each longitudinal stator layer 710 to a vertical connecting conductor 64, 68, 84 embodied as a neighboring layer connector and arranged on the first side 152 of the first three-phase system 150. Via the vertical connecting conductors 64, 68, 84, the return conductors 131, 133, 135 of the first phase U are electroconductively connected to a horizontal connecting conductor 48, 55 embodied as an neighboring stator layer of the respective longitudinal stator layer 710 in the inclined stator layer 711 and arranged at the first side 152 of the first three-phase system 150. The return conductors 131, 133, 135 of the first phase U are electroconductively connected to the neutral point 157 of the first three-phase system 150 via the vertical connecting conductors 64, 68, 84. The return conductors 131, 133, 135 of the first phase U may be electroconductively connected to the neutral point 157 of the first three-phase system 150 via further conductor structures, in addition to the vertical connecting conductors 64, 68, 84.

In particular, the additional first return conductors 136 are each electroconductively connected to the neutral point 157 of the first three-phase system 150 at their first end via the additional fourth vertical connecting conductors 84. In this context, the additional first return conductors 136 may be electroconductively connected to the neutral point 157 of the first three-phase system 150 via further conductor structures in addition to the additional fourth vertical connecting conductors 84.

As shown in FIG. 22, in the further stator assembly 700 the further second forward conductor 143 is electroconductively connected at its first end in the first stator layer 104 to the second connection structure 92 arranged at the first side 152 of the first three-phase system 150 for feeding in the second phase V. The further second forward conductor 143 is electroconductively connected at its second end in the first stator layer 104 to the ninth vertical connecting structure 69 arranged at the second side 158 of the first three-phase system 150 and embodied as a through-connector.

In the sixth stator layer 771, the seventh stator layer 772, the tenth stator layer 775 and the eleventh stator layer 776 the further stator assembly 700 each comprises an additional second forward conductor 137, an additional second return conductor 138 and an additional second horizontal connecting conductor 53 for conducting the second phase V. The additional second forward conductors 137 are embodied as described for the second forward conductor 141 of the fourth stator layer 107, the additional second return conductors 138 are embodied as described for the second return conductor 142 of the fourth stator layer 107, and the additional second horizontal connecting conductors 53 are embodied as described for the second horizontal connecting conductor 42 of the fourth stator layer 107.

At their first end and in their respective stator layers 771, 772, 775, 776, the additional second forward conductors 137 are each electroconductively connected to the additional second return conductor 138 via one of the additional second horizontal connecting conductors 53 arranged on the first side 152 of the first three-phase system 150.

The additional second return conductors 138 are each electroconductively connected at their second end and in their respective stator layers 771, 772, 775, 776 to an additional sixth vertical connecting conductor 86 arranged on the second side 158 of the first three-phase system 150 and embodied as a neighboring layer connector. Unless differences are described, the additional sixth vertical connecting conductors 86 are embodied as described for the sixth vertical connecting conductor 66.

The additional sixth vertical connecting conductors 86 are each electroconductively connected to an additional fifth horizontal connecting conductor 56 in the neighboring stator layer of the respective stator layer 771, 772, 775, 776. Unless differences are described, the additional fifth horizontal connecting conductors 56 are embodied as described for the fifth horizontal connecting conductor 49.

The additional fifth horizontal connecting conductor 56 arranged in the fifth stator layer 770 is electroconductively connected to the second end of the additional second return conductor 138 of the sixth stator layer 771 via the additional sixth vertical connecting conductor 86, which is formed between the fifth and sixth stator layers 770, 771 as a through-connector through the second carrier plate 730. The additional fifth horizontal connecting conductor 56 arranged in the eighth stator layer 773 is electroconductively connected to the second end of the additional second return conductor 138 of the seventh stator layer 772, 773 via the additional sixth vertical connecting conductor 86 formed as a through-connector through the first further carrier plate 756.

The additional fifth horizontal connecting conductor 56 arranged in the ninth stator layer 774 is electroconductively connected to the second end of the additional second return conductor 138 of the tenth stator layer 775 via the additional sixth vertical connecting conductor 86 formed between the ninth and the tenth stator layers 774, 775 as a through-connector through the second further carrier plate 757. The additional fifth horizontal connecting conductor 56 arranged in the twelfth stator layer 777 is electroconductively connected to the second end of the additional second return conductor 138 of the eleventh stator layer 776, 777 via the additional sixth vertical connecting conductor 86 embodied as a through-connector through the third further carrier plate 758.

The fifth horizontal connecting conductor 49 arranged in the third stator layer 106 is electroconductively connected to the first end of the second return conductor 142 of the fourth stator layer 104 via the sixth vertical connecting conductor 66 formed between the third and fourth stator layers 106, 107 as a through-connector through the fourth further carrier plate 758.

The additional stator assembly 700 comprises four additional fifth vertical connecting conductors 85. The additional fifth vertical connecting conductors 85 are embodied as through-connectors and are arranged at the second side 158 of the first three-phase system 150. Unless differences are described, the additional fifth vertical connecting conductors 85 are embodied as described for the fifth vertical connecting conductor 65.

The additional second forward conductors 137 are each electroconductively connected at their second end and in their stator layers 771, 772, 775, 776 to one of the additional fifth vertical connecting conductors 85. Via the additional fifth vertical connecting conductors 85, the additional second forward conductors 137 are each electroconductively connected at their second end to the neutral point 157 of the first three-phase system 150. In particular, the additional second forward conductors 137 of a stator layer 771, 772, 775, 776 are each connected via the additional fifth vertical connecting conductors 85 to the second forward conductor 142, the additional second forward conductors 137, the second return conductor 141 and the additional second return conductors 138 of the longitudinal stator layers 710 arranged below the respective stator layer 771, 772, 775, 776. In particular, the additional second forward conductors 137 of a respective stator layer 771, 772, 775, 776 are connected via the additional fifth vertical connecting conductors 85 to all forward conductors and all return conductors of the second phase V respectively, which are located in the longitudinal stator layers 710 arranged below the respective stator layer 771, 772, 775, 776, 104.

One of the additional fifth vertical connecting conductors 85 is in the eleventh stator layer 776 connected to the additional second vertical connecting conductor 137 and in the third stator layer 106 with the fifth horizontal connecting conductor 49. One of the additional fifth vertical connecting conductors 85 is in the tenth stator layer 775 connected to the additional second forward conductor 137 in the tenth stator layer 775 and in the twelfth stator layer 777 with the additional fifth horizontal connecting conductor 56. One of the additional fifth vertical connecting conductors 85 is in the seventh stator layer 772 connected to the additional second forward conductor 137 and in the ninth stator layer 774 with the additional fourth horizontal connecting conductor 55.

One of the additional fifth vertical connecting conductors 85 is in the sixth stator layer 771 connected to the additional second vertical connecting conductor 137 and in the eighth stator layer 773 to the additional fifth horizontal connecting conductor 56. In the further stator assembly 700, the further second forward conductor 143 is in the first stator layer 107 electroconductively connected to the ninth vertical connecting conductor 69 and the ninth vertical connecting conductor 69 is in the fifth stator layer 770 electroconductively connected to the additional fifth horizontal connecting conductor 56.

As with the stator assembly 100, the second return conductor 142 of the fourth stator layer 107 is electroconductively connected to the second connection structure 92 via the sixth vertical connecting conductor 66. In this case, the second return conductor 142 of the fourth stator layer 107 may be connected to the second connection structure 92, as shown, not only via the sixth vertical connecting conductor 66 but also via further conductor structures arranged between the sixth vertical connecting conductor 66 and the second connection structure 92.

As in the stator assembly 100, the second forward conductor 141 of the fourth stator layer 107 in the further stator assembly 700 is in the fourth stator layer 107 electroconductively connected to the fifth vertical connecting conductor 65 arranged on the second side 158 of the three-phase system 150. Via the fifth vertical connecting conductor 65, the second forward conductor 141 is electroconductively connected to the neutral point 157 of the first three-phase system 150. The fifth vertical connecting conductor 65 is embodied as a through-connector. In this context, the second forward conductor 141 may be connected, as shown, to the neutral point 157 via other conductor structures arranged between the fifth vertical connecting conductor 65 and the neutral point 157 apart from the fifth vertical connecting conductor 65.

As in the stator assembly 100, the further second return conductor 144 in the first stator layer 104 at the second side 158 of the three-phase system 150 is electroconductively connected to the fifth vertical connecting conductor 65 in the further stator assembly 700. As in the stator assembly 100, the second return conductor 144 of the further stator assembly 700 is electroconductively connected to the fifth vertical connecting conductor 65 in the first stator layer 104 at the second side 158 of the three-phase system 150 via the tenth vertical connecting conductor 70 and the sixth horizontal connecting conductor 50.

As in the stator assembly 100, the further second return conductor 144 on the first side 152 of the three-phase system 150 is electroconductively connected to the seventh vertical connecting conductor 67 in the first stator layer 104 and via the seventh vertical connecting conductor 67 to the neutral point 157 of the first three-phase system 150.

In the stator assemblies 100, 700, with the exception of the connecting stator layer, in each longitudinal stator layer 710 the forward conductors 137, 141, 143 of the second phase V are each, at their first end, connected in series to the return conductors 138, 142, 144 of the second phase V in an electrically conductive manner via the horizontal connecting conductors 42, 53 arranged in the respective longitudinal stator layer 710 on the first side 152 of the first three-phase system 150. The forward conductors 137, 141, 143 of the second phase V are electroconductively connected at their second end in each longitudinal stator layer 710 to a vertical connecting conductor 65, 69, 85 arranged on the first side 152 of the first three-phase system 150 and embodied as a through-connector.

With the exception of the fourth stator layer 107, the forward conductors 137, 143 of the second phase V are electroconductively connected via the vertical connecting conductors 65, 69, 85 to a horizontal connecting conductor 49, 56, which is embodied as a longitudinal connector and which is located opposite to the third direction 15 of the next but one inclined stator layer 711. Via the vertical connecting conductors 65, 69, 85, the forward conductors 137, 141, 143 of the second phase V are electroconductively connected to the neutral point 157 of the first three-phase system 150. In this case, the forward conductors 137, 141, 143 of the second phase V may be connected to the neutral point 157 of the first three-phase system 150, as shown, not only via the vertical connecting conductors 65, 69, 85, but via further conductor structures arranged between the forward conductors 137, 141, 143 and the neutral point 157 of the first three-phase system 150.

In the stator assemblies 100, 700, the return conductors 138, 142, 144 of the second phase V are electroconductively connected at their second end in each longitudinal stator layer 710 to a vertical connecting conductor 66, 70, 86, which is embodied as a neighboring layer connector and is arranged at the second side 158 of the first three-phase system 150. Via the vertical connecting conductors 66, 70, 86, the return conductors 138, 142, 144 of the second phase V are electroconductively connected to a horizontal connecting conductor 49, 50, 56, arranged in the neighboring stator layer embodied as an inclined stator layer 711 of the respective longitudinal stator layer 710 and arranged at the second side 158 of the first three-phase system 150. Via the vertical connecting conductors 66, 70, 86, the return conductors 138, 142, 144 of the second phase V are electroconductively connected to the second connection structure 92 for feeding in the second phase V. The return conductors 138, 142, 144 of the second phase V may, as shown, be connected to the second connection structure 92, not only via the vertical connecting conductors 66, 70, 86, but via further conductor structures arranged between the return conductors 138, 142, 144 and the second connection structure 92.

In particular, the additional second return conductors 138 are each electroconductively connected at their second end to the second connection structure 92 of the first three-phase system 150 via the additional sixth vertical connecting conductors 86. In this context, the additional second return conductors 138 of the second phase V may be connected, as shown, to the second connection structure 92, not only via the additional sixth vertical connecting conductors 86, but also via further conductor structures which are arranged between the additional second return conductors 138 and the second connection structure 92.

As shown in FIG. 23, in the further stator assembly 700, the further third forward conductor 148 is in the first stator layer 104 electroconductively connected at its first end to the third connection structure 93 arranged on the first side 152 of the first three-phase system 150 for feeding in the third phase W. The further third forward conductor 148 is in the first stator layer 104 electroconductively connected at its second end with the further first vertical connecting structure 71 arranged on the second side 158 of the first three-phase system 150 and embodied as a neighboring layer connector.

The further first vertical connecting structure 71 is in the second stator layer 105 electroconductively connected to the further third horizontal connecting conductor 47 arranged at the second side 158 of the first three-phase system 150. The further third horizontal connecting conductor 47 is electroconductively connected in the second stator layer 105 with the further second vertical connecting conductor 72 arranged at the second side 158 of the first three-phase system 150 and embodied as a neighboring layer connector. The further second vertical connecting conductor 72 is in the first stator layer 104 electroconductively connected to the further third return conductor 149. Thus, at the second side 158 of the first three-phase system 150, the further third forward conductor 148 and the further third return conductor 149 are electroconductively connected to each other at their second ends.

The further stator assembly 700 comprises an additional third forward conductor 139 and an additional third forward conductor 140 in the sixth stator layer 771, the seventh stator layer 772, the tenth stator layer 775 and the eleventh stator layer 776 to conduct the third phase W. The additional third phase conductors 139 are embodied as described for the third phase conductor 146 of the fourth stator layer 107 and the additional third return conductors 140 are embodied as described for the third return conductor 147 of the fourth stator layer 107.

The further stator assembly 700 comprises an additional third horizontal connecting conductor 54 in the fifth stator layer 770, 773 in the eighth stator layer, 774 in the ninth stator layer and 777 in the twelfth stator layer. The additional third horizontal connecting conductors 54 are embodied as described for the third horizontal connecting conductor 43. In particular, the additional third horizontal connecting conductors 54 are arranged at the second side 158 of the first three-phase system 150 and are embodied as longitudinal connectors extending along the second direction 14. The additional seventh horizontal connecting conductors 58 are formed as described for the seventh horizontal connecting conductor 51. In particular, the additional seventh horizontal connecting conductors 51 are arranged on the first side 158 of the first three-phase system 150 and are embodied as longitudinal connectors extending along the second direction 14.

The additional third forward conductors 139 are at their second end and in their respective stator layers 771, 772, 775, 776 each connected to one of the additional first vertical connecting conductors 81. The additional third return conductors 140 are at their second end and in their respective stator layers 771, 772, 775, 776 each connected to one of the additional second vertical connecting conductors 82. The additional third horizontal connecting conductors 54 are electroconductively connected in their respective stator layers 770, 773, 774, 777 to the additional first and second vertical connecting conductors 81, 82. Thus, the additional third forward conductors 139 and the additional third return conductors 140 are at their second ends electroconductively connected to the second side 158 of the first three-phase system 150. In particular, the additional third forward conductors 139 and the additional third return conductors 140 are electroconductively connected to each other at their second ends at the second side 158 of the first three-phase system 150 via the third horizontal connecting conductors 54 arranged in the neighboring stator layer of the respective additional third forward and return conductors 139, 140.

The additional third forward and return conductors 139, 140 of the sixth stator layer 771 are electroconductively connected to one another via the additional third horizontal connecting conductor 54 arranged in the fifth stator layer 770 forming the neighboring stator layer of the sixth stator layer 771, and via the additional first and second vertical connecting conductors 81, 82 of the second carrier plate 730, which are embodied as neighboring layer connectors through the second carrier plate 730. The additional third forward and return conductors 139, 140 of the seventh stator layer 772 are electroconductively connected to one another via the additional third horizontal connecting conductor 54 arranged in the eighth stator layer 773, forming the neighboring stator layer of the seventh stator layer 772, and via the additional first and second vertical connecting conductors 81, 82 of the first further supporting plate 753, which are embodied as neighboring layer connectors through the first further supporting plate 753.

The additional third forward and return conductors 139, 140 of the tenth stator layer 775 are electroconductively connected to one another via the additional third horizontal connecting conductor 54 arranged in the ninth stator layer 774, which forms the neighboring stator layer of the tenth stator layer 775, and via the additional first and second vertical connecting conductors 81, 82 of the second further carrier plate 757, which are embodied as neighboring layer connectors through the second further carrier plate 757. The additional third forward and return conductors 139, 140 of the eleventh stator layer 776 are electroconductively connected to one another via the additional third horizontal interconnection conductor 54 arranged in the twelfth stator layer 777 forming the neighboring stator layer of the eleventh stator layer 776 and via the additional first and second vertical connecting conductors 81, 82 of the third further carrier plate 758 formed as neighboring layer connectors by the third further carrier plate 758.

The additional third return conductors 140 are in their respective stator layers 771, 772, 775, 776 each electroconductively connected at their first end to an additional eleventh vertical connecting conductor 87 arranged on the first side 152 of the first three-phase system 150 and embodied as neighboring layer connectors. Unless differences are described, the additional eleventh vertical connecting conductors 87 are embodied as described for the eleventh vertical connecting conductor 74. The additional eleventh vertical connecting conductors 87 are each electroconductively connected to one of the additional seventh horizontal connecting conductors 58 in the neighboring stator layer of the relevant stator layer 771, 772, 775, 776.

The additional seventh horizontal connecting conductor 58 arranged in the fifth stator layer 770 is electroconductively connected to the first end of the additional third return conductor 140 of the sixth stator layer 771 via the additional eleventh vertical connecting conductor 87 formed between the fifth and sixth stator layers 770, 771 as a through-connector through the second carrier plate 730. The additional seventh horizontal connecting conductor 58 arranged in the eighth stator layer 773 is electroconductively connected to the first end of the additional third return conductor 136 of the seventh stator layer 772 via the additional eleventh vertical connecting conductor 87, which is formed between the seventh and eighth stator layer 772, 773 as a through-connector through the first additional carrier plate 756.

The additional seventh horizontal connecting conductor 58 arranged in the ninth stator layer 774 is electroconductively connected to the first end of the additional third return conductor 140 of the tenth stator layer 775 via the additional eleventh vertical connecting conductor 87 formed between the ninth and the tenth stator layers 774, 775 as a through-connector through the second further carrier plate 757. The additional seventh horizontal connecting conductor 58 arranged in the twelfth stator layer 777 is electroconductively connected to the first end of the additional third return conductor 140 of the eleventh stator layer 776 via the additional eleventh vertical connecting conductor 87, which is formed between the eleventh and twelfth stator layer 776, 777 as a through-connector through the third further carrier plate 758.

The horizontal connecting conductor of the neutral point 157 of the first three-phase system 150 arranged in the third stator layer 106 is electroconductively connected to the first end of the third return conductor 147 of the fourth stator layer 104 via the eleventh vertical connecting conductor 74 embodied between the third and fourth stator layers 106, 107 as a through-connector through the fourth further carrier plate 758.

The further stator assembly 700 comprises four additional twelfth vertical connecting conductors 88. The additional twelfth vertical connecting conductors 88 are embodied as through-connectors and are arranged at the first side 152 of the first three-phase system 150. Unless differences are described, the additional twelfth vertical connecting conductors 88 are embodied as described for the twelfth vertical connecting conductor 75.

The additional third forward conductors 139 are in their respective stator layers 771, 772, 775, 776 electroconductively connected at their first end to one of the additional twelfth vertical connecting conductors 88. Via the additional twelfth vertical connecting conductors 88, the additional third forward conductors 139 are electroconductively connected at their first end to the third connection structure 93. Thereby, as shown, the additional third forward conductors 139 of the third phase W may be connected to the third connection structure 93 via further conductor structures arranged between the additional third forward conductors 139 and the third connection structure 93, in addition to the additional twelfth vertical connecting conductor 88.

In particular, the additional third forward conductors 139 of a respective stator layer 771, 772, 775, 776, 107 are connected to the additional third forward conductor 148, the further third forward conductors 139, the additional third return conductor 149 and the additional third return conductors 140 of the longitudinal stator layers 710 arranged above the respective stator layer 771, 772, 775, 776, 107 via the additional twelfth vertical connecting conductors 88. In particular, the additional third forward conductors 139 of a respective stator layer 771, 772, 775, 776, 107 are each connected via the additional twelfth vertical connecting conductors 88 to all forward conductors and all return conductors of the third phase W which are arranged in the longitudinal stator layers 710 arranged above the respective stator layer 771, 772, 775, 776, 107.

One of the additional twelfth vertical connecting conductors 88 is in the eleventh stator layer 776 connected to the additional third forward conductor 139 and in the ninth stator layer 774 to the additional seventh horizontal connecting conductor 58. One of the additional twelfth vertical connecting conductors 88 is in the tenth stator layer 775 connected to the additional third forward conductor 139 and in the eighth stator layer 773 to the additional seventh horizontal connecting conductor 58. One of the additional twelfth vertical connecting conductors 88 is in the seventh stator layer 772 connected to the additional third forwards conductor 139 and in the fifth stator layer 770 to the additional seventh horizontal connecting conductor 58.

One of the additional twelfth vertical connecting conductors 88 is in the sixth stator layer 771 connected to the additional third forward conductor 139 arranged there and in the second stator layer 105 to the seventh horizontal connecting conductor 51 arranged there. In the further stator assembly 700, the third forward conductor 146 is in the fourth stator layer 107 electroconductively connected to the twelfth vertical connecting conductor 75 and the twelfth vertical connecting conductor 75 is in the twelfth stator layer 777 electroconductively connected to the additional seventh horizontal connecting conductor 58.

As with the stator assembly 100, the seventh horizontal connecting conductor 51 of the second stator layer 105 is electroconductively connected to the twelfth vertical connecting conductor 75 arranged at the first side 152 of the first three-phase system 150. In contrast to the stator assembly 100, in the further stator assembly 700 the seventh horizontal connecting conductor 51 is not directly and in the second stator layer 105 connected to the twelfth vertical connecting conductor 75. Instead, the seventh horizontal connecting conductor 51 is electroconductively connected to the twelfth vertical connecting conductor 75 via the additional twelfth vertical connecting conductors 88, the additional third forward and return conductors 139, 140, the additional first and second vertical connecting conductors 81, 82, the additional third horizontal connecting conductors 54, the additional eleventh vertical connecting conductors 87 and the additional seventh horizontal connecting conductors 58.

In the stator assemblies 100, 700, in each longitudinal stator layer 710 the forward conductors 139, 146, 148 of the third phase W are connected in series in an electrically conductive manner via the horizontal connecting conductors 43, 47, 53 arranged in the neighboring stator layer of the respective longitudinal stator layer 710 at the second side 158 of the first three-phase system 150 to the return conductors 140, 147, 149 of the third phase W at their second end. With the exception of the connection stator layer, the forward conductors 139, 146, 148 of the third phase W are electroconductively connected at their first end in each longitudinal stator layer 710 with a vertical connecting conductor 75, 88 arranged at the first side 152 of the first three-phase system 150 and embodied as a through-connector. Via the vertical connecting conductors 75, 88, the forward conductors 139, 146, 148 of the third phase W are electroconductively connected to a horizontal connecting conductor 51, 58 of the next but one inclined stator layer 711 in the third direction 15 embodied as a longitudinal connector. Via the horizontal connecting conductors 51, 58, the forward conductors 139, 146, 148 of the third phase W are electroconductively connected to the third connection structure 93 for feeding in the third phase W. In addition to the horizontal connecting conductors 51, 58, the forward conductors 139, 146, 148 of the third phase W may be connected to the third connection structure 93 via further conductor structures which are arranged between the forward conductors 139, 146, 148 of the third phase W and the third connection structure 93.

In the stator assemblies 100, 700, the return conductors 140, 147, 149 of the third phase W are in each longitudinal stator layer 710 electroconductively connected at their first end to a vertical connecting conductor 74, 76, 87 embodied as a neighboring layer connector and arranged on the first side 152 of the first three-phase system 150. Via the vertical connecting conductors 74, 76, 87, the return conductors 140, 147, 149 of the third phase W are electroconductively connected to a horizontal connecting conductor 51, 58 embodied as an neighboring stator layer of the respective longitudinal stator layer 710 in the inclined stator layer 711 and arranged at the first side 152 of the first three-phase system 150. The return conductors 140, 147, 149 of the third phase W are electroconductively connected to the neutral point 157 of the first three-phase system 150 via the vertical connecting conductors 74, 76, 87. The return conductors 140, 147, 149 of the third phase W may thereby be connected to the neutral point 157 of the first three-phase system 150, as shown, except for the vertical connecting conductors 74, 76, 87 via further conductor structures which are arranged between the return conductors 140, 147, 149 of the third phase W and the neutral point 157 of the first three-phase system 150.

In particular, the additional third return conductors 140 are each electroconductively connected at their first end via the additional eleventh vertical connecting conductors 87 to the neutral point 157 of the first three-phase system 150. The additional third return conductors 140 may be connected, as shown, to the neutral point 157 of the first three-phase system 150, except for the additional eleventh vertical connecting conductors 87, via further conductor structures arranged between the additional third return conductors 140 and the neutral point 157 of the first three-phase system 150.

In the further stator assembly 700, the eighth vertical connecting conductor 68 connected to the first end of the further first return conductor 134 and the additional fourth vertical connecting conductors 84 connected to the first end of the additional first return conductor 136 may be arranged on the first side 152 of the first three-phase system 150 on top of one another in the third direction 15, in particular aligned with one another in the third direction 15. In addition, at the first side 152 of the first three-phase system 150, the thirteenth vertical connecting conductor 76 connected to the first end of the further third return conductor 149, the additional eleventh vertical interconnecting conductor 87 connected to the first end of the additional third return conductor 140 and the eleventh vertical connecting conductor 84 connected to the first end of the third return conductor 147 may be arranged on top of one another in the third direction 15, in particular arranged flush with one another in the third direction 15.

In the further stator assembly 700, the further first vertical connecting conductor 71 connected to the second end of the further third forward conductor 148, the additional first vertical connecting conductors 81 respectively connected to the first end of the additional third forward conductor 139 and the first vertical connecting conductor 61 connected to the first end of the third forward conductor 146 may be arranged on top of one another in the third direction 15 at the second side 152 of the first three-phase system 150, in particular flush with one another in the third direction 15. In addition, at the second side 152 of the first three-phase system 150, the further second vertical connecting conductor 72 connected to the second end of the further third return conductor 149, the additional second vertical connecting conductors 82 respectively connected to the first end of the additional third return conductor 140 and the second vertical connecting conductor 62 connected to the first end of the third return conductor 147 may be arranged on top of one another in the third direction 15, in particular flush with one another in the third direction 15. In the further stator assembly 700, the tenth vertical connecting conductor 70 connected to the second end of the further second return conductor 144, the additional sixth vertical connecting conductor 86 respectively connected to the first end of the additional second return conductor 138 in each case and the sixth vertical connecting conductor 66 connected to the second end of the second return conductor 142 may be arranged on top of one another in the third direction 15, in particular in alignment with one another in the third direction 15.

Thus, in the stator assembly 100 and in the further stator assembly 700, all vertical connecting conductors 61, 71, 81 connected to the second ends of the forward conductors 139, 146, 148 of the third phase W are arranged at the second side 158 of the first three-phase system 150, on top of one another in the third direction 15, in particular flush with one another in the third direction 15. In addition, all vertical connecting conductors 61, 71, 81 connected to the second ends of the return conductors 140, 147, 149 of the third phase W are arranged at the second side 158 of the first three-phase system 150 on top of one another in the third direction 15, in particular in flush with one another in the third direction 15. In addition, at the second side 158 of the first three-phase system 150, all vertical connecting conductors 66, 70, 86 connected to the second ends of the return conductors 138, 142, 144 of the second phase V are arranged on top of one another in the third direction 15, in particular flush with one another in the third direction 15.

This means that in of the stator assembly 100 and in the further stator assembly 700 on the first side 152 of the first three-phase system 150, all vertical connecting conductors 74, 76, 87 connected to the first ends of the forward conductors 139, 146, 148 of the third phase W are arranged on top of one another in the third direction 15, in particular flush with one another in the third direction 15. In addition, with the exception of the fourth vertical connecting conductor 64, all vertical connecting conductors 68, 84 connected to the first ends of the return conductors 132, 134, 136 of the first phase U are arranged at the first side 152 of the first three-phase system 150, on top of one another in the third direction 15, in particular flush with one another in the third direction 15.

In the further stator assembly 700, the fourth horizontal connecting conductor 48 and the additional fourth horizontal connecting conductors 55 may be arranged at the first side 152 of the first three-phase system 150 on top of one another in the third direction 15, in particular flush with one another in the third direction 15. In addition, at the first side 152 of the first three-phase system 150 the seventh horizontal connecting conductor 51 and the additional seventh horizontal connecting conductors 58 may be arranged on top of one another in the third direction 15, in particular flush with one another in the third direction 15.

In the further stator assembly 700, the third horizontal connecting conductor 43, the additional third horizontal connecting conductors 54 and the further third horizontal connecting conductor 47 may be arranged at the second side 152 of the first three-phase system 150, on top of one another in the third direction 15, in particular flush with one another in the third direction 15. In addition, on the first side 152 of the first three-phase system 150, the fifth horizontal connecting conductor 49, the sixth horizontal connecting conductor 50 and the additional fifth horizontal connecting conductor 56 may be arranged on top of one another in the third direction 15, in particular in alignment with each other in the third direction 15.

In the stator assemblies 100, 700, the connection stator layer of the first three-phase systems 150 is formed by the uppermost longitudinal stator layer 710 of the stator assemblies 100, 700 in the third direction 15. The stator layer with the first, second and third forward conductor 131, 141, 146, as well as with the first, second and third return conductor 132, 142, 147 of the first three-phase systems 150 is formed by the lowermost longitudinal stator layer 710 of the stator assemblies 100, 700 in the third direction 15. The neighboring stator layer having the neutral points 157 of the first three-phase systems 150 is formed by the lowermost inclined stator layer 710 of the stator assemblies 100, 700 in the third direction 15.

In the stator assemblies 100, 700, the connection stator layer of the second three-phase systems 151 is formed by the uppermost inclined stator layer 711 of the stator assemblies 100, 700 in the third direction 15. The stator layer with the first, second and third forward conductor 131, 141, 146, as well as with the first, second and third return conductor 132, 142, 147 of the second three-phase systems 151 is formed by the lowermost inclined stator layer 711 of the stator assemblies 100, 700 in the third direction 15. The neighboring stator layer with the neutral points 157 of the second three-phase systems 151 is formed by the lowermost longitudinal stator layer 711 of the stator assemblies 100, 700 in the third direction 15.

The interconnection of the first coil conductors 125 in the first three-phase systems 150 of the longitudinal stator layers 721 and the connection of the second coil conductors 126 in the second three-phase systems of the inclined stator layers 722 thus have the following shared features.

The first forward conductors of the individual stator layers 721, 722 are each electroconductively connected in their stator layer 721, 722 at the second side 158 of their three-phase system 150, 151 to the first return conductor of the respective stator layer 721, 722 by a first horizontal connecting conductor arranged in the respective stator layer 721, 722 and at the second side 158, 159 of the respective three-phase system 150, 151. With the exception of the connecting stator layer, all second forward conductors of the individual stator layers 721, 722 are electroconductively connected to the second return conductor of the respective stator layer 721, 722 at the first side 152 of their three-phase system 150, 151 by a second horizontal connecting conductor arranged in the respective stator layer 721, 722 and at the first side 152, 153 of the respective three-phase system 150, 151.

The third forward conductors of the individual stator layers 721, 722 are each electroconductively connected to the third return conductor of the respective stator layer 721 at the second side 158, 159 of their three-phase system 150, 151 by a third horizontal connecting conductor arranged at the second side 158, 159 of the respective three-phase system 150, 151, 722, wherein the horizontal connecting conductor is arranged in the third direction 15 adjacent to the respective stator layer 721, 722 and on the side of the carrier plate 720, 730, 750 of the respective stator layer 721, 722 opposite to the respective stator layer 721, 722. The third forward conductor and the third return conductor are thereby each electroconductively connected to the respective third horizontal connecting conductor via vertical connecting conductors which are embodied as neighboring layer connectors through the respective carrier plate 720, 730, 750.

The individual first horizontal connecting conductors of the first three-phase systems 150 may be arranged on top of one another on the inclined stator layers 721 in the third direction 15, particularly flush with one another. The individual first horizontal connecting conductors of the second three-phase systems 151 may be arranged on top of one another on the longitudinal stator layers 720 in the third direction 15 in particular flush with one another.

The individual second horizontal connecting conductors of the first three-phase systems 150 may be arranged on top of one another on the inclined stator layers 721 in the third direction 15, in particular flush with one another. The individual second horizontal connecting conductors of the second three-phase systems 151 may be arranged on top of one another on the longitudinal stator layers 720 in the third direction 15, in particular flush with one another.

The individual third horizontal connecting conductors of the first three-phase systems 150 may be arranged on top of one another on the inclined stator layers 721 in the third direction 15, in particular flush with one another. The individual third horizontal interconnecting conductors of the second three-phase systems 151 may be arranged on top of one another on the longitudinal stator layers 720 in the third direction 15, in particular flush with one another.

Likewise, the vertical connecting conductors of the first three-phase systems 150 which connect the third forward conductors with the third horizontal connecting conductors in an electrically conductive manner, may be aligned on top of one another in the third direction, particularly flush with one another. Likewise, the vertical connecting conductors of the second three-phase systems 150 which connect the third forward conductors to the third horizontal connecting conductors in an electrically conductive manner, may be arranged on top of one another in the third direction 15, in particular flush with one another.

The vertical connecting conductors of the second three-phase system 151 which electroconductively connect the third return conductors to the third horizontal connecting conductors, may also be arranged on top of one another in the third direction 15, in particular flush with one another. The vertical connecting conductors of the second three-phase systems 151 to electroconductively connect the third return conductors with the third horizontal connecting conductors, may also be arranged on top of one another in the third direction 15, in particular flush with one another.

The first phase U of the drive current is fed into the first phase conductors in all stator layers 721, 722 at the first side 152, 153 of the respective three-phase system 150, 151. The second phase V of the drive current is fed into the second return conductor at the second side 152, 153 of the respective three-phase system 150, 151 in all stator layers 721, 722. The third phase W of the drive current is fed into the third return conductor in all stator layers 721, 722 at the first side 152, 153 of the respective three-phase system 150, 151.

This invention has been described with respect to exemplary embodiments. It is understood that changes can be made and equivalents can be substituted to adapt these disclosures to different materials and situations, while remaining with the scope of the invention. The invention is thus not limited to the particular examples that are disclosed, but encompasses all the embodiments that fall within the scope of the claims.

TABLE 1

List of References (1-76)

| | |
|---|---|
| 1 | planar-drive system |
| 8 | top side |
| 9 | bottom side |
| 10 | stator module |
| 11 | stator surface |
| 12 | first direction |
| 14 | second direction |
| 15 | third direction |
| 19 | module housing |
| 30 | outer edge of stator surface |
| 32 | side face of stator assembly |
| 41 | first horizontal connecting conductor |
| 42 | second horizontal connecting conductor |

TABLE 1-continued

List of References (1-76)

| | |
|---|---|
| 43 | third horizontal connecting conductor |
| 45 | further first horizontal connecting conductor |
| 47 | further third horizontal connecting conductor |
| 48 | fourth horizontal connecting conductor |
| 49 | fifth horizontal connecting conductor |
| 50 | sixth horizontal connecting conductor |
| 51 | seventh horizontal connecting conductor |
| 52 | additional first horizontal connecting conductor |
| 53 | additional second horizontal connecting conductor |
| 54 | additional third horizontal connecting conductor |
| 55 | additional fourth horizontal connecting conductor |
| 56 | additional fifth horizontal connecting conductor |
| 58 | additional seventh horizontal connecting conductor |
| 61 | first vertical connecting conductor |
| 62 | second vertical connecting conductor |
| 63 | third vertical connecting conductor |
| 64 | fourth vertical connecting conductor |
| 65 | fifth vertical connecting conductor |
| 66 | sixth vertical connecting conductor |
| 67 | seventh vertical connecting conductor |
| 68 | eighth vertical connecting conductor |
| 69 | ninth vertical connecting conductor |
| 70 | tenth vertical connecting conductor |
| 71 | further first vertical connecting conductor |
| 72 | further second vertical connecting conductor |
| 73 | further third vertical connecting conductor |
| 74 | eleventh vertical connecting conductor |
| 75 | twelfth vertical connecting conductor |
| 76 | thirteenth vertical connecting conductor |

TABLE 2

List of References (81-149)

| | |
|---|---|
| 81 | additional first vertical connecting conductor |
| 82 | additional second vertical connecting conductor |
| 83 | additional third vertical connecting conductor |
| 84 | additional fourth vertical connecting conductor |
| 84 | additional fourth vertical connecting conductor |
| 85 | additional fifth vertical connecting conductor |
| 86 | additional sixth vertical connecting conductor |
| 87 | additional eleventh vertical connecting conductor |
| 88 | additional twelfth vertical connecting conductor |
| 91 | first connection structure |
| 92 | second connection structure |
| 93 | third connection structure |
| 100 | stator assembly |
| 101 | top side of stator assembly |
| 102 | bottom side of stator assembly |
| 104 | first stator layer |
| 105 | second stator layer |
| 106 | third stator layer |
| 107 | fourth stator layer |

TABLE 2-continued

List of References (81-149)

| | |
|---|---|
| 110 | first stator sector |
| 112 | second stator sector |
| 113 | third stator sector |
| 114 | fourth stator sector |
| 120 | first stator segments |
| 121 | second stator segments |
| 125 | first coil conductor |
| 126 | second coil conductor |
| 131 | first forward conductor |
| 132 | first return conductor |
| 133 | further first forward conductor |
| 134 | further first return conductor |
| 135 | additional first forward conductor |
| 136 | additional first return conductor |
| 137 | additional second forward conductor |
| 138 | additional second return conductor |
| 139 | additional third forward conductor |
| 140 | additional third return conductor |
| 141 | second forward conductor |
| 142 | second return conductor |
| 143 | second further forward conductor |
| 144 | further second return conductor |
| 146 | third forward conductor |
| 147 | third return conductor |
| 148 | further third forward conductor |
| 149 | further third return conductor |

TABLE 3

List of References (150-424)

| | |
|---|---|
| 150 | first three-phase systems |
| 151 | second three-phase systems |
| 152 | first side of first three-phase system |
| 153 | first side of second three-phase system |
| 154 | first connection point |
| 155 | second connection point |
| 156 | third connection point |
| 157 | neutral point |
| 158 | second side of first three-phase system |
| 159 | second side of second three-phase system |
| 200 | rotor |
| 201 | magnetic arrangement |
| 206 | first rotor direction |
| 208 | second rotor direction |
| 210 | first magnet unit |
| 211 | first drive magnet |
| 220 | second magnetic unit |
| 221 | second drive magnet |
| 230 | third magnetic unit |
| 240 | fourth magnetic unit |
| 420 | contact arrangement |
| 421 | first contact structure |
| 422 | second contact structure |
| 423 | third contact structure |
| 424 | fourth contact structure |

TABLE 4

List of References (700-777)

| | |
|---|---|
| 700 | further stator assembly |
| 710 | longitudinal stator layer |
| 711 | inclined stator layer |
| 720 | first carrier plate |
| 721 | first longitudinal stator layer |
| 722 | first inclined stator layer |
| 723 | first side of first carrier plate |
| 724 | second side of first carrier plate |
| 725 | first vertical connecting structure |

TABLE 4-continued

List of References (700-777)

| | |
|---|---|
| 726 | first conductor structure |
| 727 | further first vertical connecting structure |
| 728 | insulation layer |
| 730 | second carrier plate |
| 731 | second longitudinal stator layer |
| 732 | second inclined stator layer |
| 733 | first side of the second carrier plate |
| 734 | second side of the second carrier plate |
| 735 | second vertical connecting structure |
| 736 | second conductor structure |
| 737 | further second vertical connecting structure |
| 740 | third vertical connecting structure |
| 741 | fourth vertical connecting structure |
| 744 | third conductor structure |
| 750 | further carrier plate |
| 753 | first side of further carrier plate |
| 754 | second side of further carrier plate |
| 756 | first further carrier plate |
| 757 | second further carrier plate |
| 758 | third further carrier plate |
| 759 | fourth further carrier plate |
| 770 | fifth stator layer |
| 771 | sixth stator layer |
| 772 | seventh stator layer |
| 773 | eight stator layer |
| 774 | ninth stator layer |
| 775 | tenth stator layer |
| 776 | eleventh stator layer |
| 777 | twelfth stator layer |

What is claimed is:

1. A stator assembly for driving a rotor of an electrical planar motor,
wherein the stator assembly comprises:
coil conductors arranged in a stator layer of the stator assembly,
wherein the coil conductors extend in an elongated manner a first direction and are arranged side by side in a second direction oriented perpendicularly with regard to the first direction,
wherein the coil conductors are connected on the stator assembly to form a three-phase system having a first phase U, a second phase V and a third phase W, and
wherein the coil conductors are configured as a first forward conductor and as a first return conductor of the first phase U connected in series with the first forward conductor, as a second forward conductor and as a second return conductor of the second phase V connected in series with the second forward conductor and as a third forward conductor and as a third return conductor of the third phase W connected in series with the third forward conductor;
wherein the three-phase system has a first side and a second side opposite to the first side,
wherein the first forward conductor and the first return conductor are electroconductively connected in series by a first horizontal connecting conductor arranged in the stator layer and at the second side of the three-phase system, and
wherein the second forward conductor and the second return conductor are electroconductively connected in series by a second horizontal connecting conductor arranged in the stator layer and at the first side of the three-phase system.

2. The stator assembly according to claim 1,
wherein the third forward conductor and the third return conductor are electroconductively connected to each other by a third horizontal connecting conductor arranged at the second side of the three-phase system,
wherein the third horizontal connecting conductor is arranged in a neighboring stator layer arranged adjacent to the stator layer,
wherein the third forward conductor is electroconductively connected to the third horizontal connecting conductor via a first vertical connecting conductor, and
wherein the third return conductor is electroconductively connected to the third horizontal connecting conductor via a second vertical connecting conductor.

3. The stator assembly according to claim 2,
wherein the stator assembly comprises a two-layer carrier plate,
wherein the stator layer is arranged on a first side of the carrier plate and the neighboring stator layer is arranged on a second side of the carrier plate, and
wherein the first vertical connecting conductor and the second vertical connecting conductor each extend from the first side of the carrier plate to the second side of the carrier plate.

4. The stator assembly according to claim 1,
wherein the stator assembly comprises a first connection structure for feeding in the first phase U and a second connection structure for feeding in the second phase V,
wherein the first forward conductor is electroconductively connected in the stator layer to a third vertical connecting conductor arranged on the first side,
wherein the first forward conductor is electroconductively connected to the first connection structure via the third vertical connecting conductor,
wherein the first return conductor is electroconductively connected in the stator layer to a fourth vertical connecting conductor arranged on the first side,
wherein the first return conductor is electroconductively connected via the fourth vertical connecting conductor to a neutral point of the three-phase system,
wherein the second forward conductor is electroconductively connected in the stator layer to a fifth vertical connecting conductor arranged at the second side,
wherein the second forward conductor is electroconductively connected to the neutral point via the fifth vertical connecting conductor,
wherein the second return conductor is electroconductively connected in the stator layer to a sixth vertical connecting conductor arranged at the second side, and
wherein the second return conductor is electroconductively connected to the second connection structure via the sixth vertical connecting conductor.

5. The stator assembly according to claim 4,
wherein the first connection structure and the second connection structure are arranged on the first side of the three-phase system,
wherein the stator assembly comprises a connecting stator layer,
wherein the connecting stator layer comprises a further first forward conductor of the first phase U, a further first return conductor of the first phase U and a further second forward conductor of the second phase V,
wherein the first connection structure in the connecting stator layer is electroconductively connected to the further first forward conductor and the second connection structure in the connecting stator layer is electroconductively connected to the further second forward conductor,
wherein the further first forward conductor is electroconductively connected to the further first return conductor by a further first horizontal connecting conductor arranged in the connecting stator layer and at the second side of the three-phase system, and wherein the further second forward conductor is electroconductively connected to the sixth vertical connecting conductor at the second side of the three-phase system.

6. The stator assembly according to claim 4, wherein stator assembly comprises a further second return conductor of the second phase V, wherein the further second return conductor is electroconductively connected to the fifth vertical connecting conductor at the second side of the three-phase system, wherein the further second return conductor is electroconductively connected to the neutral point of the three-phase system at the first side of the three-phase system via a seventh vertical connecting conductor, and wherein the further second return conductor is arranged in the connecting stator layer and is electroconductively connected to the seventh vertical connecting conductor in the connecting stator layer.

7. The stator assembly according to claim 4, wherein the neutral point of the three-phase system is arranged in the neighboring stator layer.

8. A stator assembly for driving a rotor of an electrical planar motor, wherein the stator assembly comprises:

coil conductors arranged in a stator layer of the stator assembly;

wherein the coil conductors extend in an elongated manner a first direction and are arranged side by side in a second direction oriented perpendicularly with regard to the first direction, wherein the coil conductors are connected on the stator assembly to form a three-phase system having a first phase U, a second phase V and a third phase W, wherein the coil conductors are configured as a first forward conductor and as a first return conductor of the first phase U connected in series with the first forward conductor, as a second forward conductor and as a second return conductor of the second phase V connected in series with the second forward conductor and as a third forward conductor and as a third return conductor of the third phase W connected in series with the third forward conductor, wherein the first forward conductor and the first return conductor are electroconductively connected in series by a first horizontal connecting conductor arranged in the stator layer, wherein the second forward conductor and the second return conductor are electroconductively connected in series by a second horizontal connecting conductor arranged in the stator layer, wherein the three-phase system comprises a first side and a second side opposite to the first side which extend along the second direction, wherein the first horizontal connecting conductor connects the ends located at the second side of the three-phase system of the first forward conductor and of the first return conductor and the second horizontal connecting conductor connects the ends located at the first side of the three-phase system of the second forward conductor and of the second return conductor, and wherein the first horizontal connecting conductor and the second horizontal connecting conductor are in the stator layer each configured as transverse connector in the form of conductor paths.

9. The stator assembly according to claim 8, wherein the third forward conductor and the third return conductor are electroconductively connected to each other by a third horizontal connecting conductor arranged at the second side of the three-phase system, wherein the third horizontal connecting conductor is arranged in a neighboring stator layer arranged adjacent to the stator layer, wherein the third forward conductor is electroconductively connected to the third horizontal connecting conductor via a first vertical connecting conductor, and wherein the third return conductor is electroconductively connected to the third horizontal connecting conductor via a second vertical connecting conductor.

10. The stator assembly according to claim 9, wherein the stator assembly comprises a two-layer carrier plate provided with two stator layers, wherein the stator layer is arranged on a first side of the carrier plate and the neighboring stator layer is arranged on a second side of the carrier plate, and wherein the first vertical connecting conductor and the second vertical connecting conductor each extend from the first side of the carrier plate to the second side of the carrier plate.

11. The stator assembly according to claim 8, wherein the stator assembly comprises a first connection structure for feeding in the first phase U and a second connection structure for feeding in the second phase V, wherein the first forward conductor is electroconductively connected in the stator layer to a third vertical connecting conductor arranged on the first side, wherein the first forward conductor is electroconductively connected to the first connection structure via the third vertical connecting conductor, wherein the first return conductor is electroconductively connected in the stator layer to a fourth vertical connecting conductor arranged on the first side, wherein the first return conductor is electroconductively connected via the fourth vertical connecting conductor to a neutral point of the three-phase system, wherein the second forward conductor is electroconductively connected in the stator layer to a fifth vertical connecting conductor arranged at the second side, wherein the second forward conductor is electroconductively connected to the neutral point via the fifth vertical connecting conductor, wherein the second return conductor is electroconductively connected in the stator layer to a sixth vertical connecting conductor arranged at the second side, and wherein the second return conductor is electroconductively connected to the second connection structure via the sixth vertical connecting conductor.

12. The stator assembly according to claim 11, wherein the first connection structure and the second connection structure are arranged on the first side of the three-phase system, wherein the stator assembly comprises a connecting stator layer, wherein the connecting stator layer comprises a further first forward conductor of the first phase U, a further first return conductor of the first phase U and a further second forward conductor of the second phase V, wherein the first connection structure in the connecting stator layer is electroconductively connected to the further first forward conductor and the second connection structure in the connecting stator layer is electroconductively connected to the further second forward conductor, wherein the further first forward conductor is electroconductively connected to the further first return conductor by a further first horizontal connecting conductor arranged in the connecting stator layer and at the second side of the three-phase system, and wherein the further second forward conductor is electroconductively connected to the sixth vertical connecting conductor at the second side of the three-phase system.

13. The stator assembly according to claim 11,
wherein stator assembly comprises a further second return conductor of the second phase V, wherein the further second return conductor is electroconductively connected to the fifth vertical connecting conductor at the second side of the three-phase system, wherein the further second return conductor is electroconductively connected to the neutral point of the three-phase system at the first side of the three-phase system via a seventh vertical connecting conductor, and wherein the further second return conductor is arranged in the connecting stator layer and is electroconductively connected to the seventh vertical connecting conductor in the connecting stator layer.

14. The stator assembly according to claim 11, wherein the neutral point of the three-phase system is arranged in the neighboring stator layer.

15. A stator assembly for driving a rotor of an electrical planar motor, comprising:
a two-layer carrier plate;
wherein a stator layer is arranged on a first side of the carrier plate and a neighboring stator layer is arranged on a second side of the carrier plate, wherein the stator layer and the neighboring stator layer comprise coil conductors, the coil conductors extending in an elongated manner a first direction and being arranged side by side in a second direction oriented perpendicularly with regard to the first direction, and wherein a first connecting conductor and a second vertical connecting conductor each extends from the first side of the carrier plate to the second side of the carrier plate to connect coil conductors of the stator layer and of the neighboring stator layer.

16. The stator assembly according to claim 15,
wherein the coil conductors are connected on the stator assembly to form a three-phase system having a first phase U, a second phase V and a third phase W, wherein the coil conductors are configured as a first forward conductor and as a first return conductor of the first phase U connected in series with the first forward conductor, as a second forward conductor and as a second return conductor of the second phase V connected in series with the second forward conductor and as a third forward conductor and as a third return conductor of the third phase W connected in series with the third forward conductor, wherein the three-phase system has a first side and a second side opposite to the first side, wherein the first forward conductor and the first return conductor are electroconductively connected in series by a first horizontal connecting conductor arranged in the stator layer and at the second side of the three-phase system, wherein the second forward conductor and the second return conductor are electroconductively connected in series by a second horizontal connecting conductor arranged in the stator layer and at the first side of the three-phase system, wherein the third forward conductor and the third return conductor are electroconductively connected to each other by a third horizontal connecting conductor arranged at the second side of the three-phase system, wherein the third horizontal connecting conductor is arranged in the neighboring stator layer arranged adjacent to the stator layer, wherein the third forward conductor is electroconductively connected to the third horizontal connecting conductor via the first vertical connecting conductor, and wherein the third return conductor is electroconductively connected to the third horizontal connecting conductor via a second vertical connecting conductor.

17. The stator assembly according to claim 15,
wherein the stator assembly comprises a first connection structure for feeding in the first phase U and a second connection structure for feeding in the second phase V, wherein the first forward conductor is electroconductively connected in the stator layer to a third vertical connecting conductor arranged on the first side, wherein the first forward conductor is electroconductively connected to the first connection structure via the third vertical connecting conductor, wherein the first return conductor is electroconductively connected in the stator layer to a fourth vertical connecting conductor arranged on the first side, wherein the first return conductor is electroconductively connected via the fourth vertical connecting conductor to a neutral point of the three-phase system, wherein the second forward conductor is electroconductively connected in the stator layer to a fifth vertical connecting conductor arranged at the second side, wherein the second forward conductor is electroconductively connected to the neutral point via the fifth vertical connecting conductor, wherein the second return conductor is electroconductively connected in the stator layer to a sixth vertical connecting conductor arranged at the second side, and wherein the second return conductor is electroconductively connected to the second connection structure via the sixth vertical connecting conductor.

18. The stator assembly according to claim 17,
wherein the first connection structure and the second connection structure are arranged on the first side of the three-phase system, wherein the stator assembly comprises a connecting stator layer, wherein the connecting stator layer comprises a further first forward conductor of the first phase U, a further first return conductor of the first phase U and a further second forward conductor of the second phase V, wherein the first connection structure in the connecting stator layer is electroconductively connected to the further first forward conductor and the second connection structure in the connecting stator layer is electroconductively connected to the further second forward conductor, wherein the further first forward conductor is electroconductively connected to the further first return conductor by a further first horizontal connecting conductor arranged in the connecting stator layer and at the second side of the three-phase system, and wherein the further second forward conductor is electroconductively connected to the sixth vertical connecting conductor at the second side of the three-phase system.

19. The stator assembly according to claim 17,
wherein stator assembly comprises a further second return conductor of the second phase V,
wherein the further second return conductor is electroconductively connected to the fifth vertical connecting conductor at the second side of the three-phase system,
wherein the further second return conductor is electroconductively connected to the neutral point of the three-phase system at the first side of the three-phase system via a seventh vertical connecting conductor, and
wherein the further second return conductor is arranged in the connecting stator layer and is electroconductively connected to the seventh vertical connecting conductor in the connecting stator layer.

20. The stator assembly according to claim 17, wherein the neutral point of the three-phase system is arranged in the neighboring stator layer.

\* \* \* \* \*